(12) United States Patent
Nitobe

(10) Patent No.: US 10,453,379 B2
(45) Date of Patent: Oct. 22, 2019

(54) DISPLAY APPARATUS

(71) Applicant: Japan Display Inc., Tokyo (JP)

(72) Inventor: Ryutaro Nitobe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/884,570

(22) Filed: Jan. 31, 2018

(65) Prior Publication Data

US 2018/0218665 A1 Aug. 2, 2018

(30) Foreign Application Priority Data

Feb. 1, 2017 (JP) ................................. 2017-016933

(51) Int. Cl.
| | | |
|---|---|---|
| *G09G 3/20* | (2006.01) | |
| *G09G 3/36* | (2006.01) | |
| *G06F 3/041* | (2006.01) | |
| *G06F 3/044* | (2006.01) | |
| *G02F 1/1333* | (2006.01) | |

(52) U.S. Cl.
CPC ............ *G09G 3/2092* (2013.01); *G06F 3/044* (2013.01); *G06F 3/0412* (2013.01); *G06F 3/0416* (2013.01); *G09G 3/3666* (2013.01); *G09G 3/3677* (2013.01); *G09G 3/3688* (2013.01); *G02F 1/13338* (2013.01); *G09G 3/3607* (2013.01); *G09G 2300/0408* (2013.01); *G09G 2300/0452* (2013.01); *G09G 2310/06* (2013.01); *G09G 2330/06* (2013.01); *G09G 2370/08* (2013.01)

(58) Field of Classification Search
CPC .. G09G 3/2092; G09G 3/3666; G09G 3/3688; G09G 3/3677; G09G 2370/08; G09G 2330/06; G09G 2310/06; G09G 2300/0408; G09G 2300/0452; G09G 3/3607; G06F 3/0412; G06F 3/044; G06F 3/0416; G02F 1/13338
See application file for complete search history.

(56) References Cited

U.S. PATENT DOCUMENTS

| | | | | |
|---|---|---|---|---|
| 2004/0227710 A1* | 11/2004 | Shimizu | ............... | G09G 3/3648 345/87 |
| 2014/0240300 A1* | 8/2014 | Katsuta | ................ | G09G 3/3614 345/204 |
| 2016/0217754 A1* | 7/2016 | Bae | ....................... | G09G 3/3614 |

FOREIGN PATENT DOCUMENTS

JP 2000-321595 A 11/2000

* cited by examiner

*Primary Examiner* — Premal R Patel
(74) *Attorney, Agent, or Firm* — K&L Gates LLP

(57) ABSTRACT

A display apparatus includes: a plurality of pixels arranged in a row-column configuration and divided into a plurality of units each including a plurality of rows; a plurality of scanning signal lines configured to select one row from the pixels; a plurality of pixel signal lines configured to supply pixel signals to the one row; a control circuit configured to output an image signal in which the pixel signals are time-division multiplexed and a plurality of separation control signals for separating the pixel signals from the image signal; and a separation circuit including signal lines and configured to separate the pixel signals from the image signal and output the pixel signals to the pixel signal lines based on the separation control signals. The control circuit switches ends to be supplied with the separation control signals between first ends and second ends of the signal lines in each unit.

11 Claims, 24 Drawing Sheets

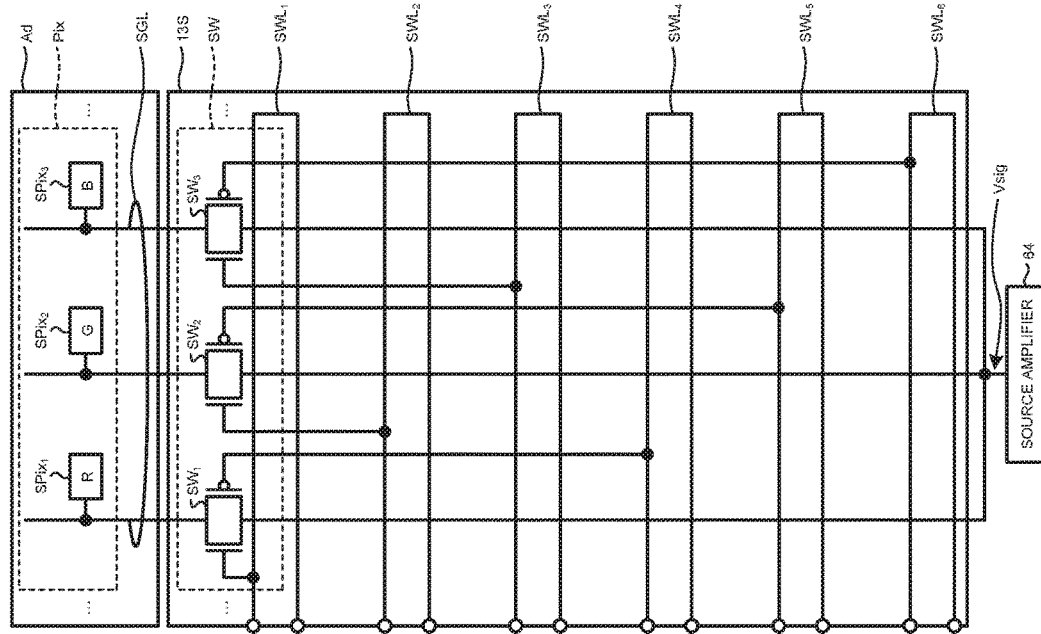
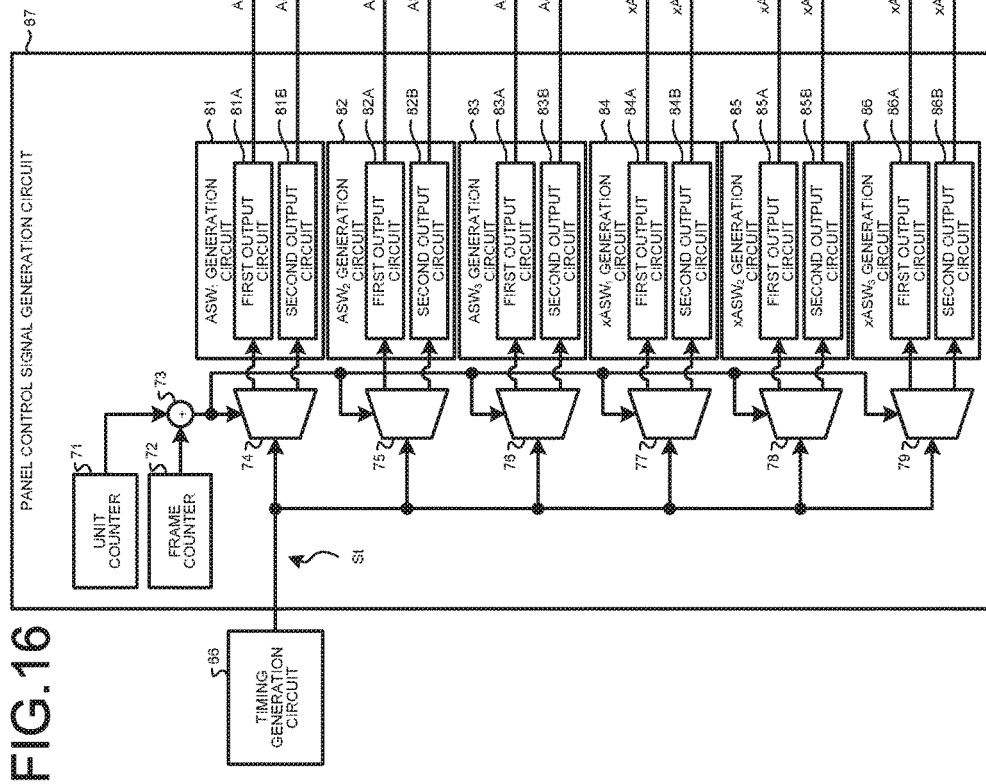
FIG.16

FIG.17

| FRAME NUMBER | N-TH FRAME | N-TH FRAME | (N+1)-TH FRAME | (N+1)-TH FRAME | (N+2)-TH FRAME | (N+2)-TH FRAME | (N+3)-TH FRAME | (N+3)-TH FRAME |
|---|---|---|---|---|---|---|---|---|
| UNIT NUMBER | ODD-NUMBERED UNIT | EVEN-NUMBERED UNIT | ODD-NUMBERED UNIT | EVEN-NUMBERED UNIT | ODD-NUMBERED UNIT | EVEN-NUMBERED UNIT | ODD-NUMBERED UNIT | EVEN-NUMBERED UNIT |
| Vsig POLARITY | + | + | - | - | + | + | - | - |
| ASW | L | R | L | R | R | L | R | L |

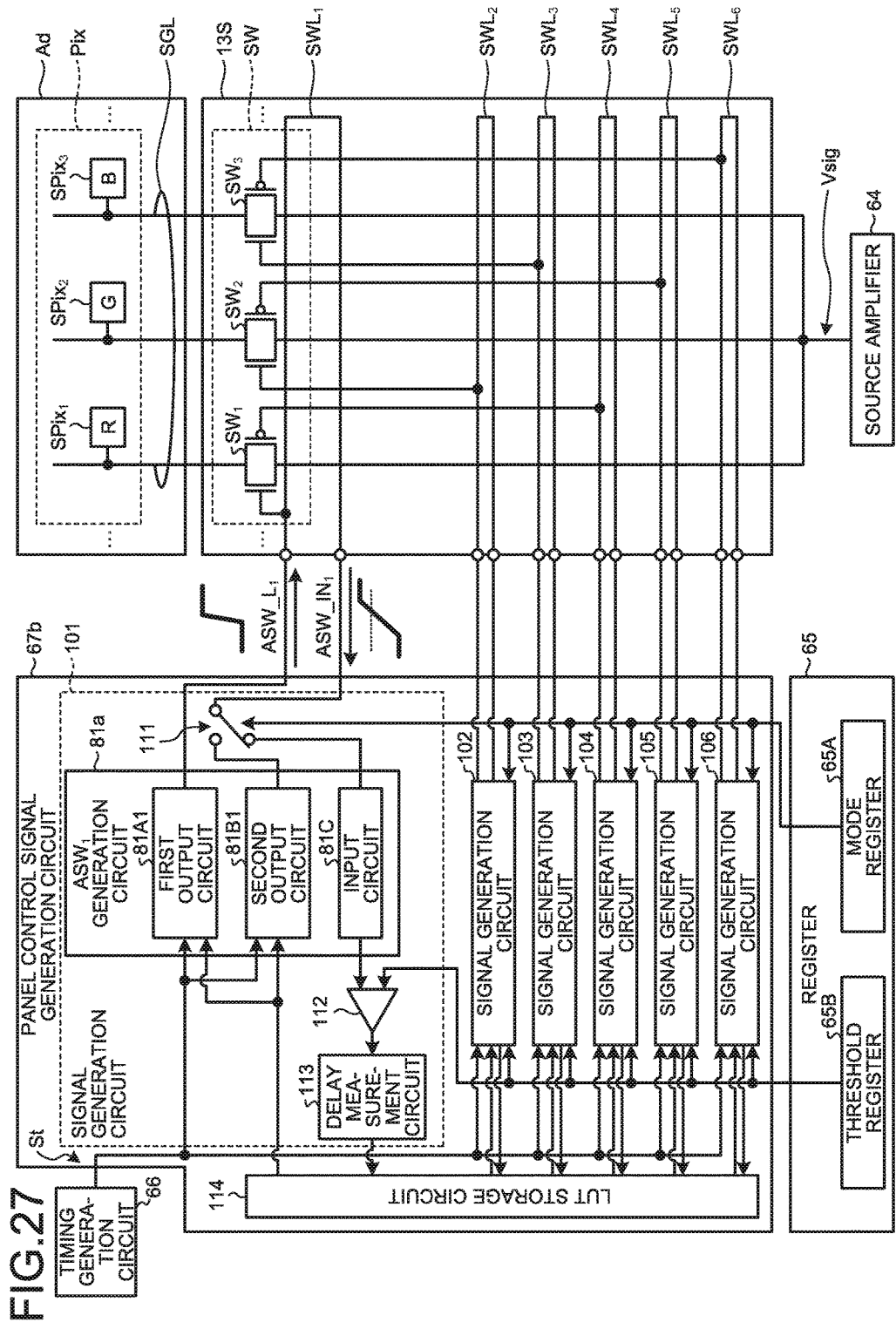

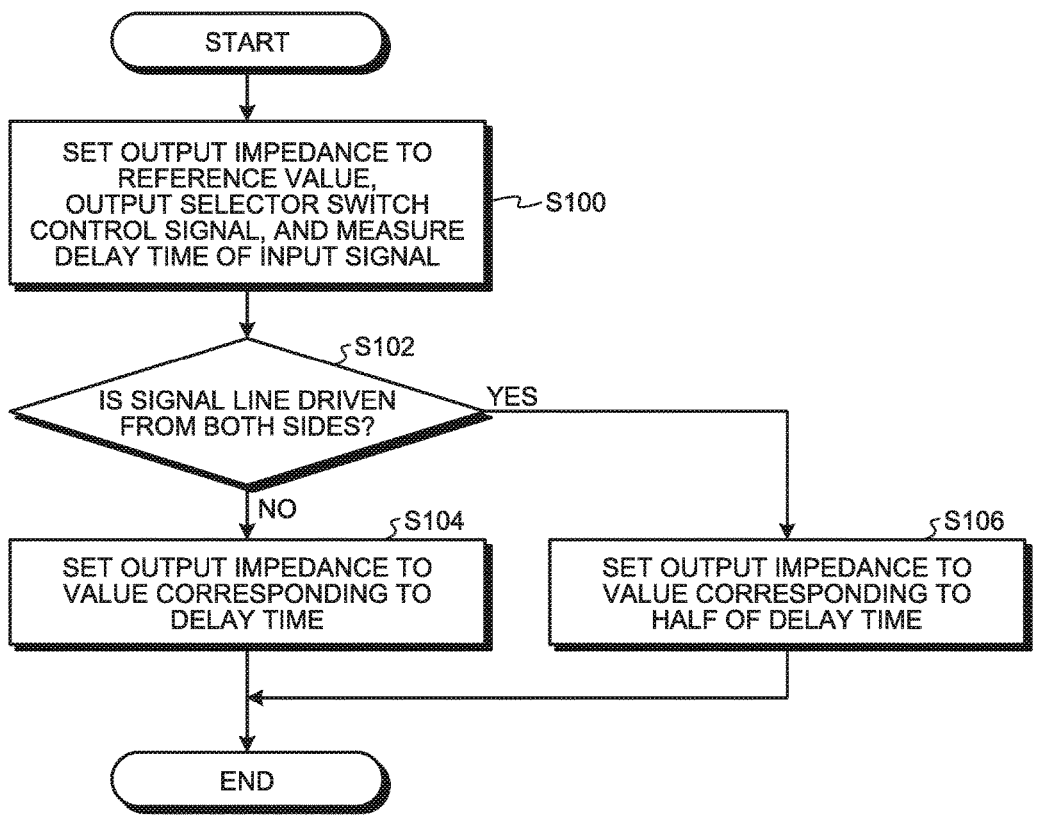

DISPLAY APPARATUS

CROSS-REFERENCE TO RELATED APPLICATIONS

This application claims priority from Japanese Application No. 2017-016933, filed on Feb. 1, 2017, the contents of which are incorporated by reference herein in its entirety.

BACKGROUND

1. Technical Field

The present invention relates to a display apparatus.

2. Description of the Related Art

An Electronic apparatus, such as a smartphone, may have a display apparatus mounted thereon. Radiation noise generated from the display apparatus may possibly interfere with wireless communications performed by the electronic apparatus, thereby reducing the receiving sensitivity of the electronic apparatus.

SUMMARY

According to an aspect, a display apparatus includes: a plurality of pixels arranged in a row-column configuration and divided into a plurality of units each including a plurality of rows; a plurality of scanning signal lines configured to select one row out of the pixels; a plurality of pixel signal lines configured to supply a plurality of pixel signals to the one row; a control circuit configured to output an image signal in which the pixel signals are time-division multiplexed and a plurality of separation control signals for separating the pixel signals from the image signal; and a separation circuit including a plurality of signal lines supplied with the separation control signals and configured to separate the pixel signals from the image signal and output the pixel signals to the pixel signal lines based on the separation control signals. The control circuit switches ends to be supplied with the separation control signals between first ends and second ends of the signal lines in each of the units.

BRIEF DESCRIPTION OF THE DRAWINGS

FIG. 16 is another block diagram of an exemplary configuration of the display apparatus with a touch detection function according to the first embodiment;

FIG. 17 is a diagram for explaining an operation performed by the display apparatus with a touch detection function according to the first embodiment;

FIG. 27 is a block diagram of an exemplary configuration of the display apparatus with a touch detection function according to the third embodiment;

FIG. 28 is a diagram of a look-up table of the display apparatus with a touch detection function according to the third embodiment; and FIG. 29 is a flowchart of an operation performed by a display apparatus with a touch detection function according to a modification of the third embodiment.

DETAILED DESCRIPTION

Figure 1:
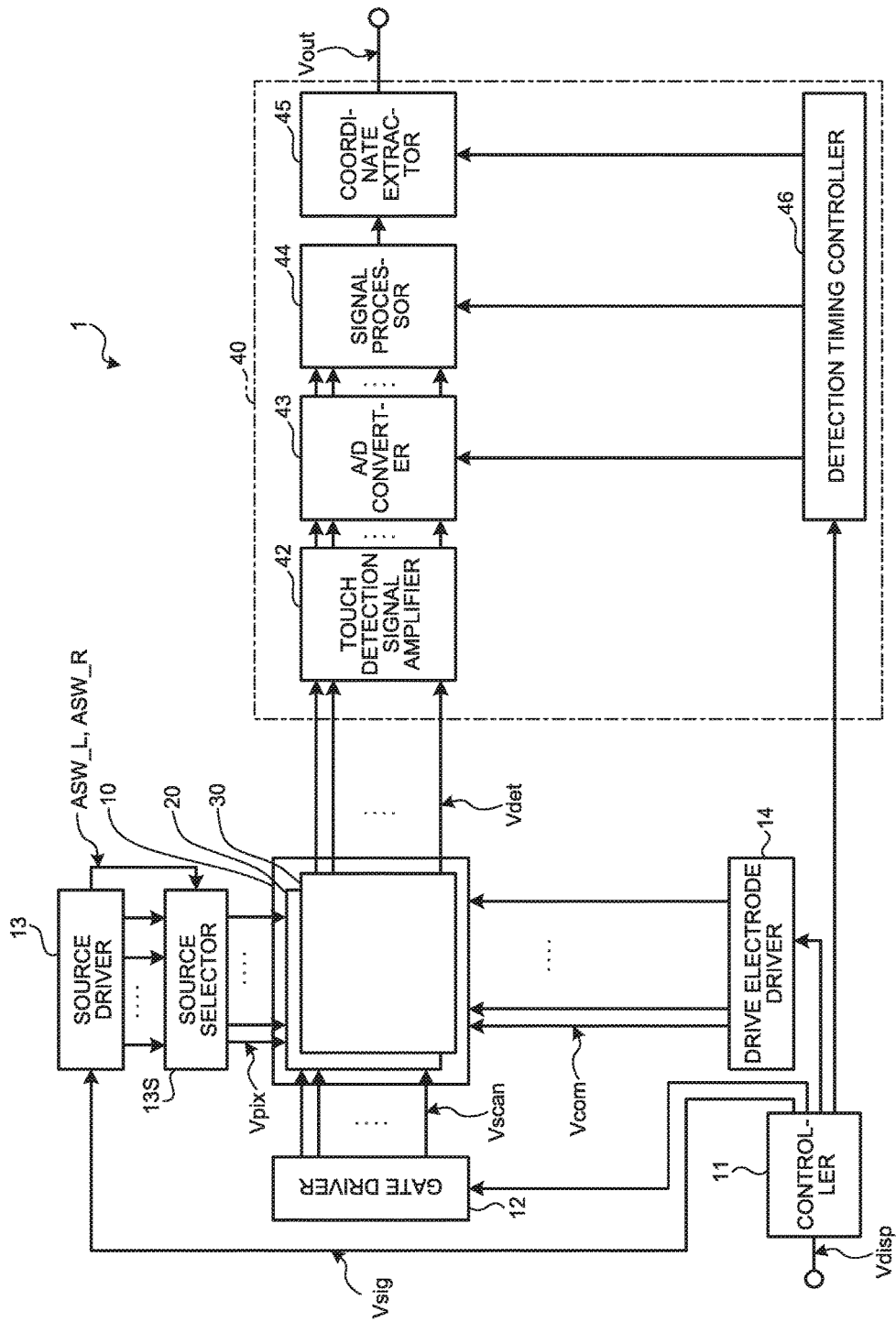
FIG. 1 is a block diagram of an exemplary configuration of a display apparatus with a touch detection function according to a first embodiment of the present invention.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below may be appropriately combined. What is disclosed herein is given by way of example only, and appropriate modifications made without departing from the spirit of the invention and easily conceivable by those skilled in the art naturally fall within the scope of the invention. To simplify the explanation, the drawings may possibly illustrate the width, the thickness, the shape, and other elements of each component more schematically than the actual aspect. These elements, however, are given by way of example only and are not intended to limit interpretation of the invention. In the present specification and the figures, components similar to those previously described with reference to previous figures are denoted by the same reference numerals, and overlapping explanation thereof may be appropriately omitted.

In this disclosure, when an element is described as being "on" another element, the element can be directly on the other element, or there can be one or more elements between the element and the other element.

1. First Embodiment

Japanese Patent Application Laid-open Publication No. 2000-321595 (JP-A-2000-321595) describes a planar display device in which the lengths of digital signal lines that couple a drive control circuit and a D/A conversion circuit are set shorter than 15 centimeters (cm).

The planar display device described in JP-A-2000-321595 can suppress electro-magnetic interference (EMI) noise generated from the digital signal lines.

To suppress reduction in the receiving sensitivity of electronic apparatuses, display apparatuses need to further suppress radiation noise.

For the foregoing reasons, there is a need for a display apparatus that can suppress radiation noise.

1-1. Entire Configuration

FIG. 1 is a block diagram of an exemplary configuration of a display apparatus with a touch detection function according to a first embodiment of the present invention. A display apparatus with a touch detection function 1 includes a display device with a touch detection function 10, a controller 11, a gate driver 12, a source driver 13, a source selector 13S, a drive electrode driver 14, and a touch detector 40.

The display device with a touch detection function 10 is an in-cell or hybrid apparatus in which a capacitive touch detection device 30 is integrated with a liquid crystal display device 20 including liquid crystal display elements serving as display elements. Integrating the capacitive touch detection device 30 with the liquid crystal display device 20 includes a case where part of members, such as substrates and electrodes, for the liquid crystal display device 20 are also used as part of members, such as substrates and electrodes, for the touch detection device 30, for example.

The display apparatus with a touch detection function 1 may include an organic electroluminescence (EL) display device instead of the liquid crystal display device 20.

The display device with a touch detection function 10 may be an on-cell apparatus in which the capacitive touch detection device 30 is provided on the upper side of the liquid crystal display device 20 including liquid crystal display elements serving as display elements. Being provided on the upper side means being provided closer to an operator than the liquid crystal display device 20. In the case of an on-cell apparatus, the touch detection device 30 may be provided on the liquid crystal display device 20 or not on but above the liquid crystal display device 20 with another layer interposed therebetween.

The liquid crystal display device 20 sequentially scans each horizontal line to perform display based on scanning signals Vscan supplied from the gate driver 12, which will be described later.

The controller 11 is a circuit that supplies control signals to the gate driver 12, the source driver 13, the drive electrode driver 14, and the touch detector 40 based on video signals Vdisp supplied from the outside, thereby performing control such that these components operate in synchronization with one another. The controller 11 generates, from the video signal Vdisp of one horizontal line, an image signal Vsig in which pixel signals Vpix for a plurality of sub-pixels SPix of the liquid crystal display device 20 are time-division multiplexed. The controller 11 supplies the image signal Vsig to the source driver 13.

The gate driver 12 has a function to sequentially select one horizontal line to be a target of display drive in the display device with a touch detection function 10 based on the control signals supplied from the controller 11.

The source driver 13 is a circuit that supplies the pixel signals Vpix to pixels Pix (sub-pixels SPix) of the display device with a touch detection function 10 based on the control signals supplied from the controller 11. The source driver 13 is supplied with 6-bit image signals Vsig of red (R), green (G), and blue (B), for example.

The source driver 13 receives the image signals Vsig from the controller 11 and supplies them to the source selector 13S. The source driver 13 generates selector switch control signals ASW_L and ASW_R required to separate the pixel signals Vpix of R, G, and B time-division multiplexed in the image signal Vsig therefrom. The source driver 13 supplies the generated selector switch control signals ASW_L and ASW_R to the source selector 13S together with the image signal Vsig. The image signal Vsig is not limited to a signal in which the pixel signals Vpix of R, G, and B are time-division multiplexed. The image signal Vsig may be generated by integrating and time-division multiplexing a plurality of pixel signals Vpix. With this source selector 13S, the display apparatus with a touch detection function 1 requires fewer wires between the source driver 13 and the controller 11. Part of control by the source driver 13 may be performed by the controller 11. In this case, the source selector 13S alone may be provided.

The drive electrode driver 14 is a circuit that supplies a touch detection drive signal (hereinafter, also referred to as a touch drive signal) VcomAC and a display drive voltage VcomDC serving as a display voltage to drive electrodes COML, which will be described later, in the display device with a touch detection function 10 based on the control signals supplied from the controller 11. The touch drive signal VcomAC and the display drive voltage VcomDC may be hereinafter collectively referred to as a drive signal Vcom.

The touch detection device 30 operates based on the basic principle of mutual capacitance touch detection and outputs touch detection signals Vdet. The following describes the basic principle of touch detection performed by the display apparatus with a touch detection function 1 according to the present embodiment with reference to FIGS. 2 to 4.

Figure 2:
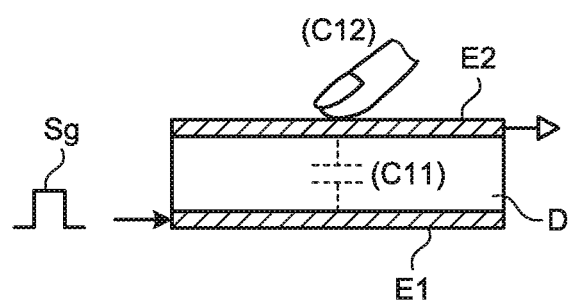
FIG. 2 is a diagram for explaining the basic principle of mutual capacitance touch detection and illustrates a state where an object to be detected is in contact with or in proximity to a touch detection electrode.
Figure 3:
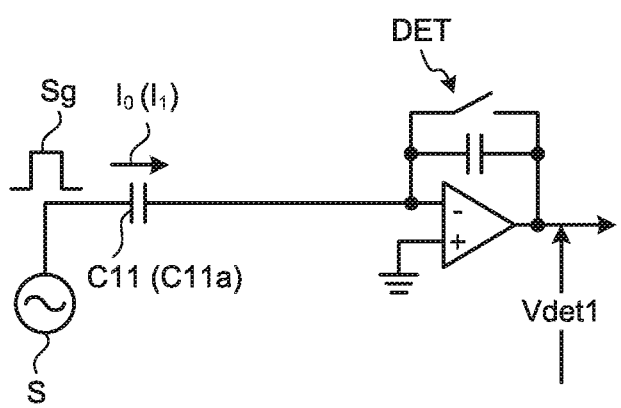
FIG. 3 is a diagram for explaining an example of an equivalent circuit in mutual capacitance touch detection.
Figure 4:
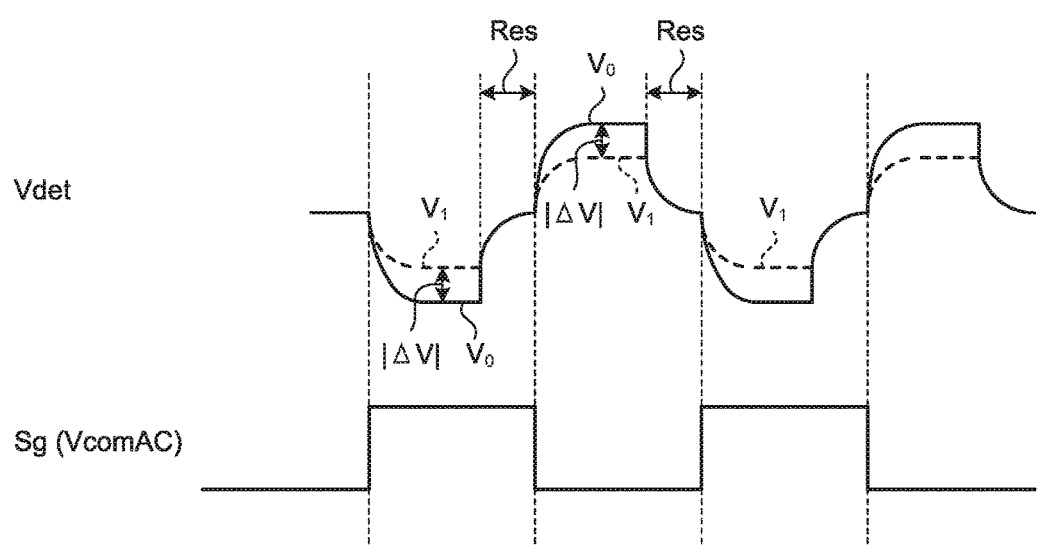
FIG. 4 is a diagram of an example of waveforms of a drive signal and a detection signal in mutual capacitance touch detection.

FIG. 2 is a diagram for explaining the basic principle of mutual capacitance touch detection and illustrates a state where an object to be detected is in contact with or in proximity to a touch detection electrode. FIG. 3 is a diagram for explaining an example of an equivalent circuit in mutual capacitance touch detection. FIG. 4 is a diagram of an example of waveforms of a drive signal and a detection signal in mutual capacitance touch detection. FIG. 3 also illustrates a detection circuit.

As illustrated in FIG. 2, for example, a capacitance element C11 includes a pair of electrodes, that is, a drive electrode E1 and a touch detection electrode E2 facing each other with a dielectric D interposed therebetween. As illustrated in FIG. 3, a first end of the capacitance element C11 is coupled to an alternating-current (AC) signal source (drive signal source) S, and a second end thereof is coupled to a voltage detector (touch detector) DET. The voltage detector DET is an integration circuit included in a touch detection signal amplifier 42 illustrated in FIG. 1, for example.

When the AC signal source S applies an AC rectangular wave Sg at a predetermined frequency (e.g., a frequency on the order of several kilohertz to several hundred kilohertz) to the drive electrode E1 (first end of the capacitance element C11), an output waveform (touch detection signal Vdet) appears via the voltage detector DET coupled to the touch detection electrode E2 (second end of the capacitance element C11). The AC rectangular wave Sg corresponds to the touch drive signal VcomAC.

In a state where an object to be detected is not in contact with (nor in proximity to) the touch detection electrode (non-contact state), an electric current $I_0$ depending on the capacitance value of the capacitance element C11 flows in association with charge and discharge of the capacitance element C11. As illustrated in FIG. 4, the voltage detector DET converts fluctuations in the electric current $I_0$ according to the AC rectangular wave Sg into fluctuations in the voltage (waveform $V_0$ indicated by the solid line).

By contrast, in a state where an object to be detected is in contact with (or in proximity to) the touch detection electrode (contact state), capacitance C12 formed by a finger is in contact with or in proximity to the touch detection electrode E2 as illustrated in FIG. 2. In the contact state, fringe capacitance between the drive electrode E1 and the touch detection electrode E2 is blocked by the finger. As a result, the capacitance element C11 acts as a capacitance element C11a having a capacitance value smaller than that of the capacitance element C11. In the equivalent circuit illustrated in FIG. 3, an electric current $I_1$ flows through the capacitance element C11a.

As illustrated in FIG. 4, the voltage detector DET converts fluctuations in the electric current $I_1$ depending on the AC rectangular wave Sg into fluctuations in the voltage (waveform $V_1$ indicated by the dotted line). In this case, the waveform $V_1$ has amplitude smaller than that of the waveform $V_0$. Consequently, an absolute value $|\Delta V|$ of the voltage difference between the waveform $V_0$ and the waveform $V_1$ varies depending on an effect of the object to be detected. To accurately detect the absolute value $|\Delta V|$ of the voltage difference between the waveform $V_0$ and the waveform $V_1$, the voltage detector DET preferably operates with a period Res for resetting charge and discharge of a capacitor by switching operation in the circuit in accordance with the frequency of the AC rectangular wave Sg.

Referring back to FIG. 1, the touch detection device 30 sequentially scans each detection block based on the touch drive signals VcomAC supplied from the drive electrode driver 14 to output the touch detection signals Vdet.

The touch detector 40 is a circuit that determines whether a touch is made on the touch detection device 30 based on the control signals supplied from the controller 11 and on the touch detection signals Vdet supplied from the touch detection device 30 of the display device with a touch detection function 10. In this disclosure, a touch includes being contact with the touch detection device 30 and/or being in proximity to the touch detection device 30.

If a touch is detected, the touch detector 40 determines the coordinates of the touch in a touch detection area.

The touch detector 40 includes the touch detection signal amplifier 42, an analog/digital (A/D) converter 43, a signal processor 44, a coordinate extractor 45, and a detection timing controller 46.

The touch detection device 30 outputs the touch detection signals Vdet of respective detection blocks from touch detection electrodes TDL, which will be described later, via the voltage detector DET illustrated in FIG. 3. The touch detection device 30 supplies the touch detection signals Vdet to the touch detection signal amplifier 42 of the touch detector 40.

The touch detection signal amplifier 42 amplifies the touch detection signals Vdet supplied from the touch detection device 30. The touch detection signal amplifier 42 may include an analog low-pass filter that removes high-frequency components (noise components) included in the touch detection signals Vdet to extract and output touch components. The touch detector 40 does not necessarily include the touch detection signal amplifier 42. In other words, the touch detection signals Vdet from the touch detection device 30 may be supplied to the A/D converter 43.

The A/D converter 43 samples analog signals output from the touch detection signal amplifier 42 at a timing synchronized with the touch drive signals VcomAC, thereby converting the analog signals into digital signals.

The signal processor 44 includes a digital filter that reduces frequency components (noise components) other than the frequency at which the touch drive signals VcomAC are sampled in the output signals from the A/D converter 43.

The signal processor 44 is a logic circuit that determines whether a touch is made on the touch detection device 30 based on the output signals from the A/D converter 43. The signal processor 44 performs processing of extracting only the voltage difference caused by a finger. The voltage difference caused by a finger corresponds to the absolute value $|\Delta V|$ of the difference between the waveform $V_0$ and the waveform $V_1$.

The signal processor 44 may perform an arithmetic operation for averaging the absolute values $|\Delta V|$ for each detection block, thereby calculating the average of the absolute value $|\Delta V|$. With this operation, the signal processor 44 can reduce an effect of noise.

The signal processor 44 compares the detected voltage difference caused by a finger with a predetermined threshold voltage. If the voltage difference is equal to or higher than the threshold voltage, the signal processor 44 determines that an external proximity object is in the contact state.

By contrast, if the voltage difference is lower than the threshold voltage, the signal processor 44 determines that an external proximity object is in the non-contact state. The touch detector 40 thus can perform touch detection.

The coordinate extractor 45 is a logic circuit that calculates, when a touch is detected by the signal processor 44, the touch panel coordinates of the touch. The detection timing controller 46 performs control such that the A/D converter 43, the signal processor 44, and the coordinate extractor 45 operate in synchronization with one another. The coordinate extractor 45 outputs the touch panel coordinates as an output signal Vout.

Figure 5:
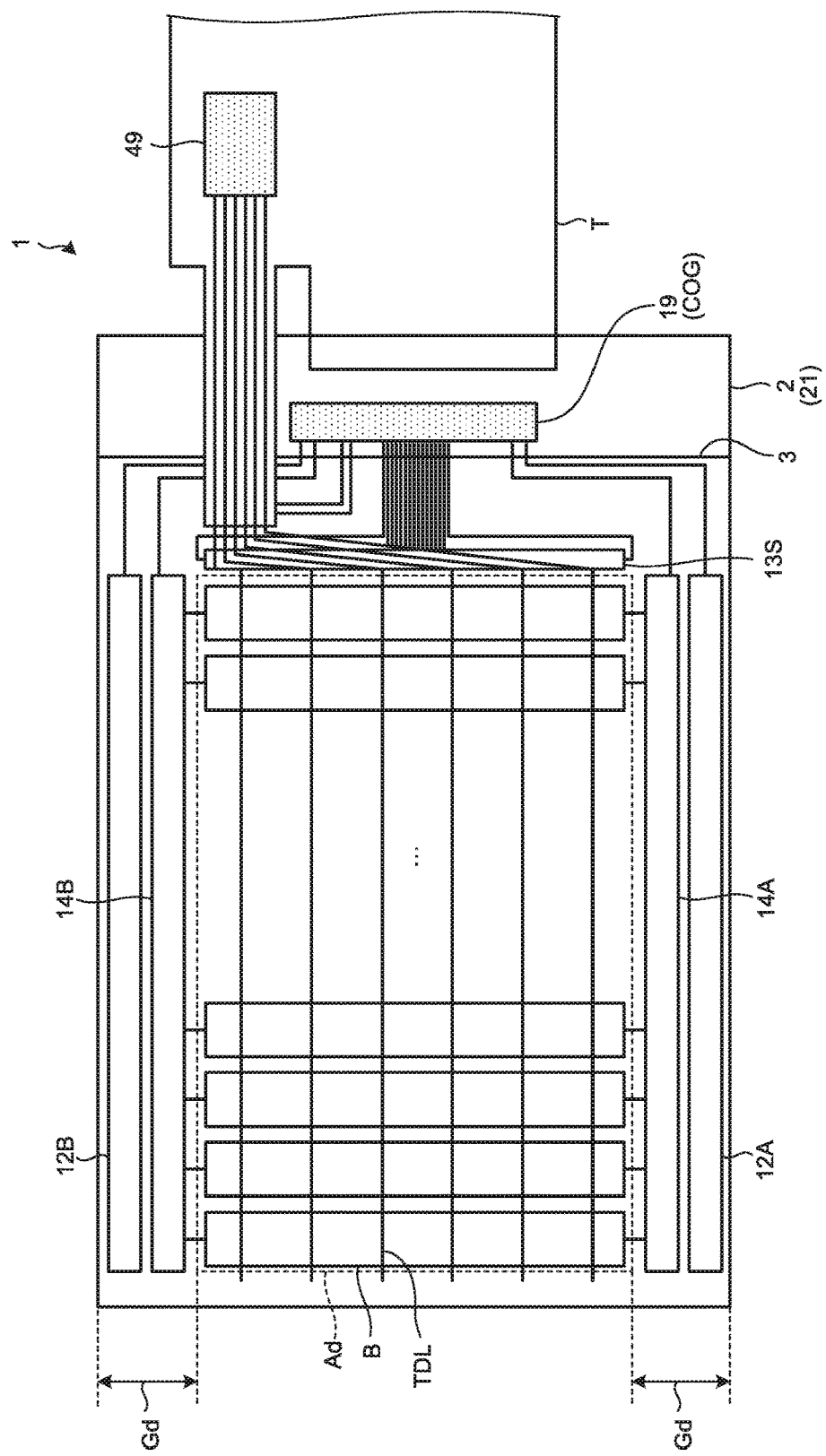
FIG. 5 is a diagram of an example of a module provided with the display apparatus with a touch detection function according to the first embodiment.

FIG. 5 is a diagram of an example of a module provided with the display apparatus with a touch detection function according to the first embodiment. The display apparatus with a touch detection function 1 includes a first substrate (e.g., a pixel substrate 2) and a printed circuit board (e.g., a flexible printed circuit board) T.

The pixel substrate 2 includes a first insulation substrate (e.g., a TFT substrate 21). The TFT substrate 21 is a glass substrate or a film substrate, for example. The TFT substrate 21 is provided with a drive integrated circuit (IC) chip (e.g., a chip on glass (COG) 19). The pixel substrate 2 (TFT substrate 21) has a display area Ad and a frame area (peripheral area) Gd of the liquid crystal display device 20.

The COG 19 is an IC chip of a driver provided on the TFT substrate 21 and is a control device including circuits required for a display operation, such as the controller 11 illustrated in FIG. 1.

In this exemplary configuration, the source selector 13S is provided on the TFT substrate 21, and the source driver 13 is included in the COG 19. The source selector 13S may be in contact or non-contact with the TFT substrate 21. The source driver 13 may be provided on the TFT substrate 21. The source driver 13 may be in contact or non-contact with the TFT substrate 21.

Drive electrode scanners 14A and 14B serving as part of the drive electrode driver 14 are provided on the TFT substrate 21.

The gate driver 12 is provided on the TFT substrate 21 as gate drivers 12A and 12B.

The display apparatus with a touch detection function 1 may include circuits, such as the drive electrode scanners 14A and 14B and the gate driver 12, in the COG 19. The COG 19 is given by way of example of an implementation form, and the configuration is not limited thereto. A component having the same functions as those of the COG 19, for example, may be installed on the flexible printed circuit board T as a chip on film or a chip on flexible (COF).

As illustrated in FIG. 5, drive electrode blocks B of the drive electrodes COML intersect the touch detection electrodes TDL in a grade separated manner in a direction perpendicular to the surface of the TFT substrate 21.

The drive electrodes COML are divided into a plurality of stripe electrode patterns extending in one direction. To perform a touch detection operation, the drive electrode driver 14 sequentially supplies the touch drive signals VcomAC to the electrode patterns. The drive electrode block B illustrated in FIG. 5 corresponds to a plurality of stripe electrode patterns of the drive electrodes COML simultaneously supplied with the touch drive signals VcomAC.

The drive electrode blocks B (drive electrodes COML) extend in a direction parallel to a first side of the display device with a touch detection function 10, for example. The touch detection electrodes TDL, which will be described later, extend in a direction intersecting the extending direction of the drive electrode blocks B. The touch detection electrodes TDL extend in a direction parallel to a second side of the display device with a touch detection function 10 intersecting the first side, for example.

The touch detection electrodes TDL are coupled to a touch IC 49 provided on the flexible printed circuit board T coupled to the first side of the display device with a touch detection function 10. The touch IC 49 is an IC chip of a driver installed on the flexible printed circuit board T and is a control device including circuits required for a touch detection operation, such as the touch detector 40 illustrated in FIG. 1. As described above, the touch IC 49 is installed on the flexible printed circuit board T and coupled to the touch detection electrodes TDL arranged parallel to one another. The flexible printed circuit board T simply needs to have a terminal and is not limited to a substrate. In this case, the touch IC 49 is provided outside the module. The touch IC 49 does not necessarily disposed on the flexible printed circuit board T and may be disposed on the TFT substrate 21 or a second insulation substrate 31.

While the touch IC 49 in this exemplary configuration is a control device serving as the touch detector 40, part of the functions of the touch detector 40 may be provided as functions of another micro-processing unit (MPU).

Specifically, part of functions (e.g., noise removal) out of various functions, such as A/D conversion and noise removal, that can be provided as the functions of an IC chip serving as a touch driver may be performed by a circuit, such as an MPU, provided independently of the IC chip serving as the touch driver. In a case where one IC chip serving as a driver is provided (one-chip configuration), detection signals may be transmitted to the IC chip serving as the touch driver provided on an array substrate via wiring of the flexible printed circuit board T, for example.

The source selector 13S includes TFT elements and is provided near the display area Ad on the TFT substrate 21. A plurality of pixels Pix, which will be described later, are arranged in a matrix (row-column configuration) in the display area Ad. The frame area (peripheral area) Gd is an area in which no pixel Pix is disposed when viewed in the direction perpendicular to the surface of the TFT substrate 21. The gate driver 12 and the drive electrode scanners 14A and 14B of the drive electrode driver 14 are disposed in the frame area (peripheral area) Gd.

The gate driver 12 includes the gate drivers 12A and 12B, for example. The gate driver 12 includes TFT elements and is provided on the TFT substrate 21. The gate drivers 12A and 12B sandwich the display area Ad provided with the sub-pixels SPix (pixels), which will be described later, arranged in a matrix (row-column configuration) and can drive them from both sides. Scanning signal lines are provided between the gate drivers 12A and 12B. In other words, the scanning signal lines extend in a direction parallel to the extending direction of the drive electrodes COML when viewed in the direction perpendicular to the surface of the TFT substrate 21.

While this exemplary configuration includes two circuits, that is, the gate drivers 12A and 12B as the gate driver 12, this is given by way of example of a specific configuration of the gate driver 12, and the configuration is not limited thereto. The gate driver 12 may be one circuit provided at only one end of the scanning signal lines.

The drive electrode driver 14 includes the drive electrode scanners 14A and 14B, for example. The drive electrode driver 14 includes TFT elements and is provided on the TFT substrate 21. The drive electrode scanners 14A and 14B are supplied with the display drive voltage VcomDC and the touch drive signals VcomAC from the COG 19. The drive electrode scanners 14A and 14B can drive, from both sides, the drive electrode blocks B arranged parallel to one another.

While this exemplary configuration includes two circuits, that is, the drive electrode scanners 14A and 14B as the drive electrode driver 14, this is given by way of example of a specific configuration of the drive electrode driver 14, and the configuration is not limited thereto. The drive electrode driver 14 may be one circuit provided at only one end of the drive electrode blocks B.

The display apparatus with a touch detection function 1 outputs the touch detection signals Vdet from the short side of the display device with a touch detection function 10. With this configuration, the display apparatus with a touch detection function 1 facilitates routing of wiring to couple the display device with a touch detection function 10 to the touch detector 40 via the flexible printed circuit board T serving as a terminal.

Figure 6:
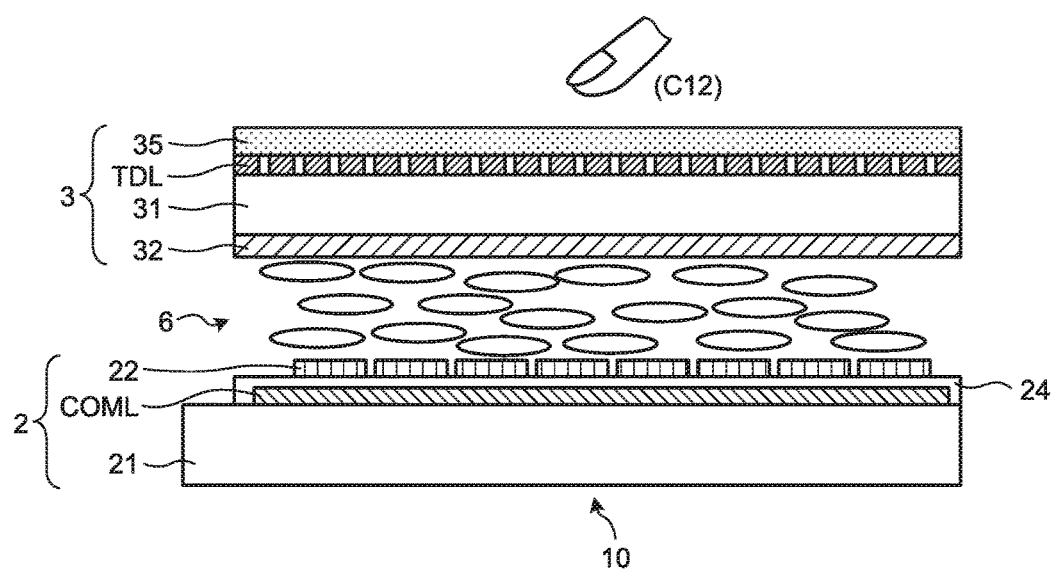
FIG. 6 is a sectional view of a schematic structure of the display apparatus with a touch detection function according to the first embodiment.
Figure 7:
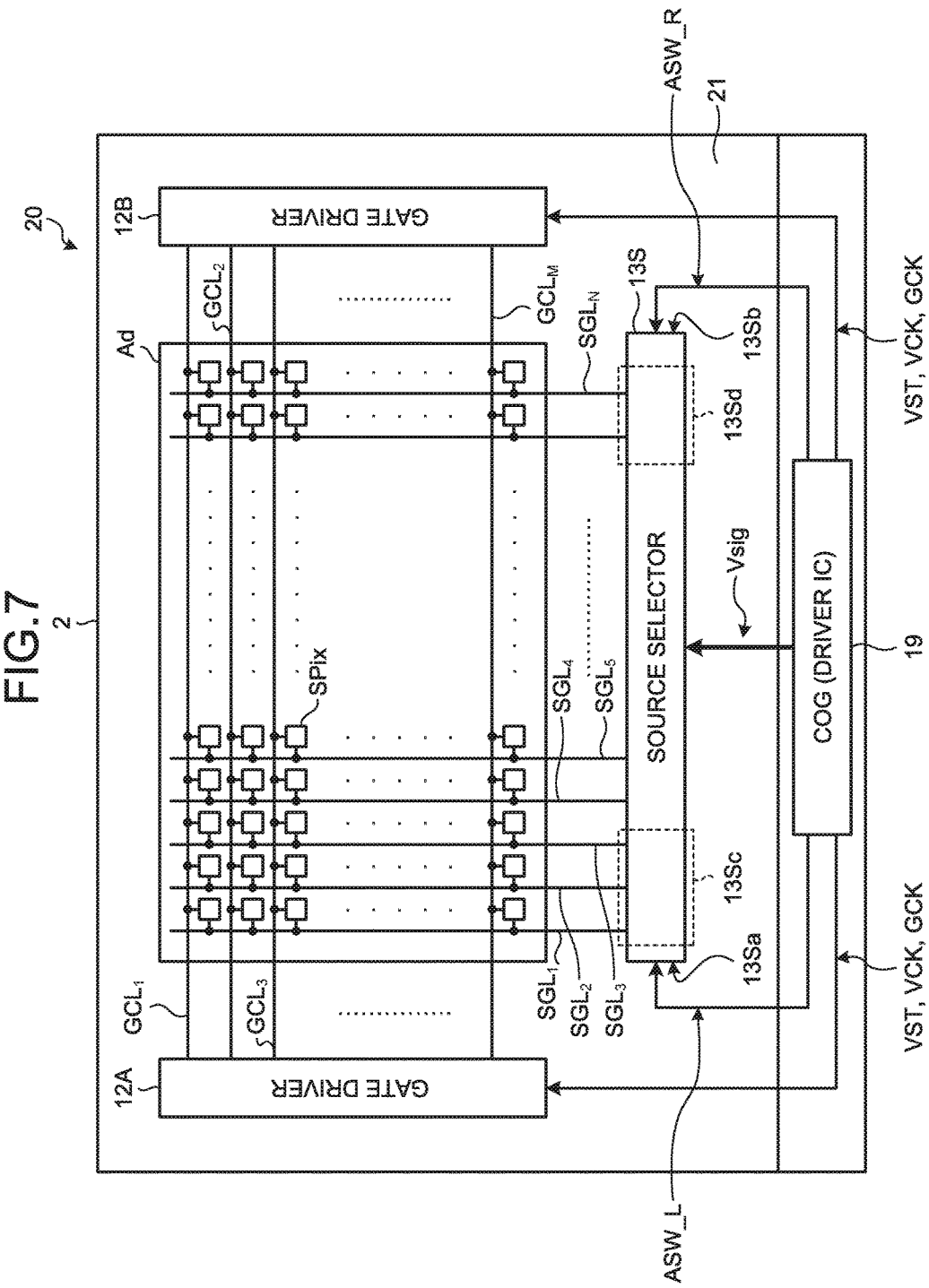
FIG. 7 is a diagram schematically illustrating the configuration of the display apparatus with a touch detection function according to the first embodiment.
Figure 8:
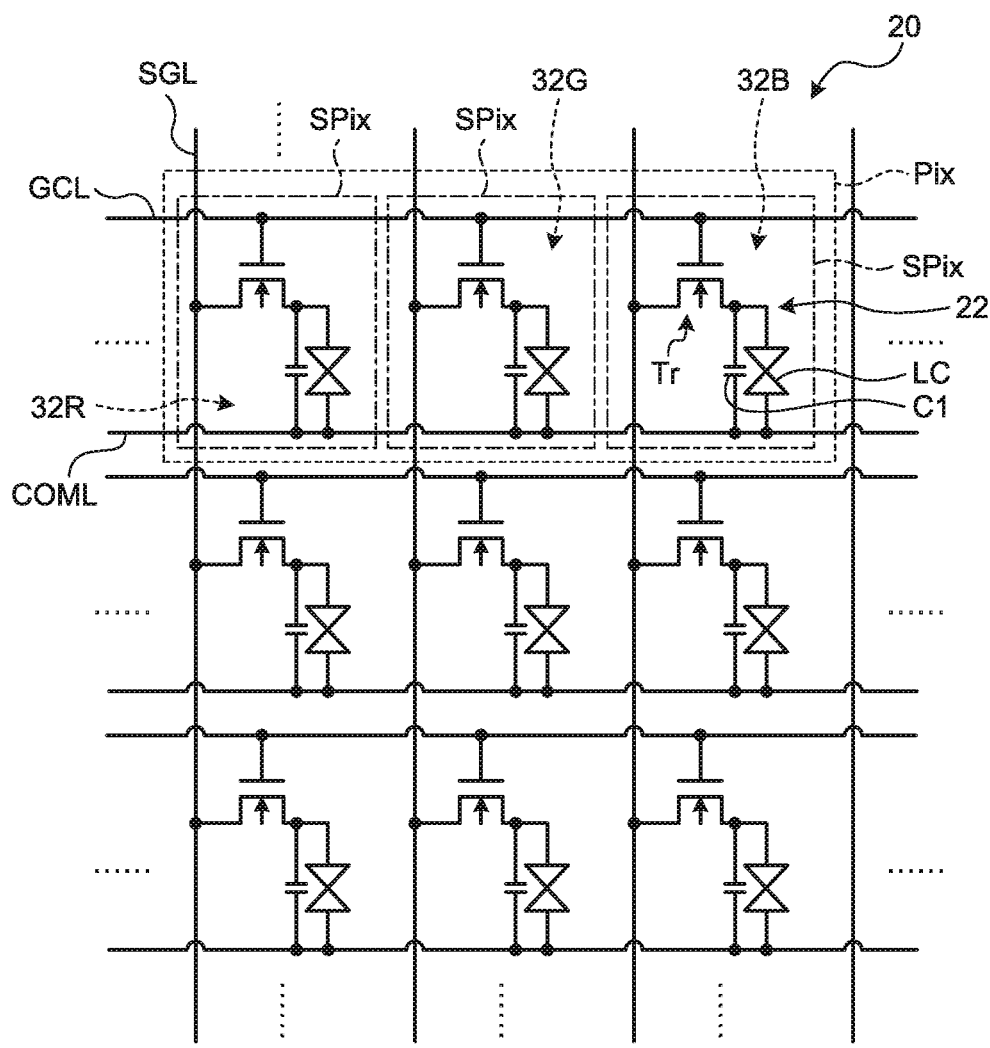
FIG. 8 is a circuit diagram of a pixel array in the display apparatus with a touch detection function according to the first embodiment.

FIG. 6 is a sectional view of a schematic structure of the display apparatus with a touch detection function according to the first embodiment. FIG. 7 is a diagram schematically illustrating the configuration of the display apparatus with a touch detection function according to the first embodiment. FIG. 8 is a circuit diagram of a pixel array in the display apparatus with a touch detection function according to the first embodiment.

As illustrated in FIG. 6, the display device with a touch detection function 10 includes the pixel substrate 2, a second substrate (e.g., a counter substrate 3), and a display functional layer (e.g., a liquid crystal layer 6). The counter substrate 3 is arranged facing the pixel substrate 2 in the direction perpendicular to the surface of the pixel substrate 2. The liquid crystal layer 6 is interposed between the pixel substrate 2 and the counter substrate 3.

The pixel substrate 2 includes the TFT substrate 21, a plurality of pixel electrodes 22, the drive electrodes COML, and an insulation layer 24. The TFT substrate 21 serves as a circuit board. The pixel electrodes 22 are arranged in a matrix (row-column configuration) on the TFT substrate 21. The drive electrodes COML are provided between the TFT substrate 21 and the pixel electrodes 22. The insulation layer 24 insulates the pixel electrodes 22 from the drive electrodes COML.

The TFT substrate 21 is provided with thin-film transistor (TFT) elements Tr of respective sub-pixels SPix illustrated in FIG. 8 and wiring, such as pixel signal lines SGL and scanning signal lines GCL illustrated in FIG. 8. The pixel signal lines SGL supply the pixel signals Vpix to the respective pixel electrodes 22. The scanning signal lines GCL drive the TFT elements Tr. The pixel signal lines SGL extend on a plane parallel to the surface of the TFT substrate 21 and supply the pixel signals Vpix for displaying an image to the sub-pixels SPix. The sub-pixel SPix is a constitutional unit controlled by the pixel signal Vpix. The sub-pixel SPix is an area surrounded by the pixel signal lines SGL and the scanning signal lines GCL and is a constitutional unit controlled by the TFT element Tr.

As illustrated in FIG. 8, the liquid crystal display device 20 includes a plurality of sub-pixels SPix arranged in a matrix (row-column configuration). The sub-pixels SPix each include the TFT element Tr, a liquid crystal element LC, and a holding capacitance C1. The TFT element Tr is a thin-film transistor and is an n-channel metal oxide semiconductor (MOS) TFT in this example.

One of the source and the drain of the TFT element Tr is coupled to the pixel signal line SGL, the gate thereof is coupled to the scanning signal line GCL, and the other of the source and the drain thereof is coupled to a first end of the liquid crystal element LC. The first end of the liquid crystal element LC is coupled to the drain of the TFT element Tr, and a second end thereof is coupled to the drive electrode COML, for example. The holding capacitance C1 is provided in parallel with the liquid crystal element LC and holds the voltage between the source or the drain of the TFT element Tr and the drive electrode COML.

While the pixel electrodes 22, the insulation layer 24, and the drive electrodes COML are stacked in this order on the TFT substrate 21 in FIG. 6, the configuration is not limited thereto. Alternatively, the drive electrodes COML, the insulation layer 24, and the pixel electrodes 22 may be stacked in this order on the TFT substrate 21. Still alternatively, the drive electrodes COML and the pixel electrodes 22 may be provided in the same layer with the insulation layer 24 interposed therebetween.

The sub-pixel SPix is coupled to the other sub-pixels SPix belonging to the same row in the liquid crystal display device 20 by the scanning signal line GCL. The scanning signal lines GCL are coupled to the gate driver 12 and supplied with the scanning signals Vscan from the gate driver 12.

The sub-pixel SPix is coupled to the other sub-pixels SPix belonging to the same column in the liquid crystal display device 20 by the pixel signal line SGL. The pixel signal lines SGL are coupled to the source selector 13S and supplied with the pixel signals Vpix from the source selector 13S.

The sub-pixel SPix is also coupled to the other sub-pixels SPix belonging to the same row in the liquid crystal display device 20 by the drive electrode COML. The drive electrodes COML are coupled to the drive electrode driver 14 illustrated in FIG. 1 and supplied with the drive signals Vcom from the drive electrode driver 14. In other words, one drive electrode COML is shared by a plurality of sub-pixels SPix belonging to the same row in this example.

While the extending direction of the drive electrodes COML in this exemplary configuration is parallel to the extending direction of the scanning signal lines GCL, it is not limited thereto. The extending direction of the drive electrodes COML may be parallel to the extending direction of the pixel signal lines SGL, for example. The extending direction of the touch detection electrodes TDL is not limited to the extending direction of the pixel signal lines SGL. The extending direction of the touch detection electrodes TDL may be parallel to the extending direction of the scanning signal lines GCL.

The gate driver 12 illustrated in FIG. 1 applies the scanning signals Vscan to the gates of the TFT elements Tr of the pixels Pix via the scanning signal lines GCL illustrated in FIG. 8. The gate driver 12 thus sequentially selects one row (one horizontal line) out of the sub-pixels SPix arranged in a matrix (row-column configuration) in the liquid crystal display device 20 as a target of display drive.

The source driver 13 illustrated in FIG. 1 supplies the pixel signals Vpix to the respective sub-pixels SPix constituting one horizontal line sequentially selected by the gate driver 12 via the pixel signal lines SGL illustrated in FIG. 8. These sub-pixels SPix allow display of one horizontal line based on the supplied pixel signals Vpix.

The drive electrode driver 14 illustrated in FIG. 1 applies the drive signal Vcom to each block that includes a predetermined number of drive electrodes COML to drive the drive electrodes COML in units of blocks.

As described above, the gate driver 12 drives to sequentially linearly scan the scanning signal lines GCL in the liquid crystal display device 20 in a time-division manner, thereby sequentially selecting one horizontal line. The source driver 13 supplies the pixel signals Vpix to the sub-pixels SPix belonging to one horizontal line in the liquid crystal display device 20, thereby performing display on each horizontal line. To perform the display operation, the drive electrode driver 14 applies the display drive voltage VcomDC to the block including one or more drive electrodes COML corresponding to the horizontal line.

The liquid crystal layer 6 modulates light passing therethrough according to conditions of the electric field. When the drive electrode COML is driven, a voltage according to the pixel signal Vpix supplied to the pixel electrode 22 is applied to the liquid crystal layer 6, thereby generating the electric field. The liquid crystals of the liquid crystal layer 6 are oriented according to the electric field, thereby modulating the light passing through the liquid crystal layer 6.

As described above, the pixel electrodes 22 and the drive electrodes COML serve as a pair of electrodes that generates an electric field in the liquid crystal layer 6. In other words, the liquid crystal display device 20 serves as a display device that changes the display output image according to an electric charge supplied to the pair of electrodes. One of the pixel electrodes 22 is disposed in at least every pixel Pix or sub-pixel SPix. One of the drive electrodes COML is disposed in at least every plurality of pixels Pix or sub-pixels SPix.

This exemplary configuration, for example, employs a liquid crystal display device including liquid crystals in a lateral electric-field mode, such as the in-plane switching (IPS) mode including the fringe field switching (FFS) mode, as the liquid crystal display device 20. An orientation film may be provided between the liquid crystal layer 6 and the pixel substrate 2 and between the liquid crystal layer 6 and the counter substrate 3 illustrated in FIG. 6.

While the liquid crystal display device 20 has a configuration for a lateral electric-field mode, it may have a configuration for another display mode. The liquid crystal display device 20, for example, may have a configuration for a mode using a vertical electric field generated mainly between the substrate main surfaces, such as the twisted nematic (TN), the optically compensated bend (OCB), and the vertical alignment (VA) modes. For the display mode using a vertical electric field, the pixel substrate 2 may include the pixel electrodes 22, and the counter substrate 3 may include the drive electrodes COML, for example.

The counter substrate 3 includes the second insulation substrate 31 and a color filter 32 provided on one surface of the second insulation substrate 31. The touch detection electrodes TDL serving as the detection electrodes of the touch detection device 30 are provided on the other surface of the second insulation substrate 31. A polarization plate 35 is provided on the touch detection electrodes TDL.

The method for mounting the color filter 32 may be a color-filter on array (COA) method of arranging the color filter 32 on the pixel substrate 2 serving as an array substrate.

In the color filter 32 illustrated in FIG. 6, color areas of the color filter in three colors of red (R), green (G), and blue (B), for example, are periodically arranged. Color areas 32R, 32G, and 32B in the three colors of R, G, and B are arranged corresponding to the respective sub-pixels SPix. A set of the color areas 32R, 32G, and 32B constitute one pixel Pix.

The pixels Pix are arranged in a matrix (row-column configuration) in the direction parallel to the scanning signal lines GCL and the direction parallel to the pixel signal lines SGL, thereby forming the display area Ad, which will be described later. The color filter 32 faces the liquid crystal layer 6 in the direction perpendicular to the TFT substrate 21. Each sub-pixel SPix thus can display a single color.

The color filter 32 may have a combination of other colors as long as they are different colors. The color filter 32 is not necessarily provided. Specifically, an area where no color filter 32 is provided, that is, a non-colored sub-pixel SPix may be present. The number of sub-pixels SPix included in one pixel Pix may be four or more.

As illustrated in FIG. 7, the pixel substrate 2 includes the display area Ad, the COG 19, the gate drivers (vertical drive circuits) 12A and 12B, and the source selector (horizontal drive circuit) 13S on the TFT substrate 21. The COG 19 has a function as an interface (I/F) and a timing generator. The flexible printed circuit board T illustrated in FIG. 5 transmits, to the COG 19, external signals and driving power for driving the COG 19.

The display area Ad is provided on the surface of the TFT substrate 21 serving as a transparent insulation substrate (e.g., a glass substrate). The display area Ad has a plurality of sub-pixels (pixels) each including a liquid crystal element and arranged in a matrix (row-column configuration). The gate drivers 12A and 12B are arranged in a manner sandwiching the display area Ad.

The display area Ad has a matrix (row-column) configuration in which the sub-pixels SPix each including a liquid crystal element are arranged in M-rows and N-columns. In the present specification, a row means a pixel row including N sub-pixels SPix arrayed in a direction. A column means a pixel column including M sub-pixels SPix arrayed in a direction orthogonal to the direction in which the sub-pixels SPix are arrayed in the row. M and N are determined based on the display resolution in the vertical direction and that in the horizontal direction, respectively.

In the display area Ad including M×N sub-pixels SPix, scanning signal lines $GCL_1$, $GCL_2$, $GCL_3$, . . . , and $GCL_M$ are disposed in respective rows, and pixel signal lines $SGL_1$, $SGL_2$, $SGL_3$, $SGL_4$, $SGL_5$, . . . , and $SGL_N$ are disposed in respective columns. In the embodiment, the scanning signal lines $GCL_1$, $GCL_2$, $GCL_3$, . . . may be hereinafter collectively referred to as the scanning signal lines GCL. The pixel signal lines $SGL_1$, $SGL_2$, $SGL_3$, $SGL_4$, $SGL_5$, . . . may be collectively referred to as the pixel signal lines SGL. In the embodiment, certain three scanning signal lines out of the scanning signal lines $GCL_1$, $GCL_2$, . . . , and $GCL_M$ may be referred to as scanning signal lines $GCL_m$, $GCL_{m+1}$, and $GCL_{m+2}$ (m is a natural number satisfying m≤M−2). Certain three pixel signal lines out of the pixel signal lines $SGL_1$, $SGL_2$, . . . , and $SGL_N$ may be referred to as pixel signal lines $SGL_n$, $SGL_{n+1}$, and $SGL_{n+2}$ (n is a natural number satisfying n≤N−2).

The pixel substrate 2 receives master clocks, horizontal synchronization signals, and vertical synchronization signals serving as external signals from the outside and supplies them to the COG 19. The COG 19 converts the level (raises the voltage) of the master clocks, the horizontal synchronization signals, and the vertical synchronization signals having a voltage amplitude of an external power supply such that they have a voltage amplitude of an internal power supply required for driving the liquid crystals. The COG 19 supplies the signals resulting from the conversion to the timing generator as the master clocks, the horizontal synchronization signals, and the vertical synchronization signals. The COG 19 thus generates vertical start pulses VST, vertical clock pulses VCK, switch control signals GCK, and the selector switch control signals ASW_L and ASW_R. The selector switch control signals ASW_L and ASW_R are the same signal. In other words, the selector switch control signals ASW_L and ASW_R have the same phase and the same amplitude.

The COG 19 outputs the vertical start pulses VST, the vertical clock pulses VCK, and the switch control signals GCK to the gate drivers 12A and 12B. The COG 19 also outputs the selector switch control signals ASW_L and ASW_R to the source selector 13S.

The gate drivers 12A and 12B generate vertical scanning pulses from the vertical start pulses VST and the vertical clock pulses VCK and supply them to the scanning signal lines GCL. The gate drivers 12A and 12B thus sequentially select the sub-pixels SPix row by row. The gate drivers 12A and 12B are arranged in a manner sandwiching the scanning signal lines GCL in the extending direction of the scanning signal lines GCL. The gate drivers 12A and 12B output the vertical scanning pulses in order from the upper part of the display area Ad, that is, from the start side in the vertical scanning direction to the lower part of the display area Ad, that is, to the end side in the vertical scanning direction. The gate drivers 12A and 12B apply the vertical scanning pulses in the direction (scanning direction) in which the scanning signal lines GCL are arrayed, thereby selecting the sub-pixels SPix in the display area Ad row by row. The gate drivers 12A and 12B are disposed at the respective ends of the scanning signal lines GCL in the longitudinal direction. The gate drivers 12A and 12B apply the vertical scanning pulses to the scanning signal lines GCL, thereby selecting the pixels in the display area Ad row by row.

The source selector 13S is provided on the TFT substrate 21 with one long side (upper side in FIG. 7) facing the display area Ad. The other long side (lower side in FIG. 7) of the source selector 13S is supplied with the image signals Vsig from the COG 19. A side 13Sa (left side in FIG. 7) serving as one short side of the source selector 13S is supplied with the selector switch control signals ASW_L from the COG 19. A side 13Sb (right side in FIG. 7) serving as the other short side of the source selector 13S is supplied with the selector switch control signals ASW_R from the COG 19.

The source selector 13S separates the pixel signals Vpix of red (R), green (G), and blue (B) from the image signals Vsig obtained by time-division multiplexing the pixel signals Vpix of R, G, and B, based on the selector switch control signals ASW_L and ASW_R. The source selector 13S writes the pixel signals Vpix to the respective sub-pixels SPix in the row selected by vertical scanning performed by the gate drivers 12A and 12B in units of a pixel, in units of a plurality of pixels, or in one unit of all the pixels via the pixel signal lines SGL.

The gate drivers 12A and 12B illustrated in FIG. 7 apply the vertical scanning pulses to the gates of the TFT elements Tr in the respective sub-pixels SPix via the scanning signal lines GCL illustrated in FIG. 8. The gate drivers 12A and 12B thus sequentially select one row (one horizontal line) as a target of display drive out of the sub-pixels SPix arranged in a matrix (row-column configuration) in the display area Ad. The source selector 13S outputs the pixel signals Vpix to the respective sub-pixels SPix included in one horizontal line sequentially selected by the gate drivers 12A and 12B via the pixel signal lines SGL. With these sub-pixels SPix, the display of one horizontal line is performed based on the supplied pixel signals Vpix. The drive electrode driver 14 illustrated in FIG. 1 applies the display drive voltage VcomDC to the drive electrodes COML (drive electrode blocks B illustrated in FIG. 5), thereby driving the drive electrodes COML (drive electrode blocks B illustrated in FIG. 5).

As described above, the gate drivers 12A and 12B in the display apparatus with a touch detection function 1 drive the scanning signal lines $GCL_m$, $GCL_{m+1}$, and $GCL_{m+2}$ so as to sequentially scan the scanning signal lines $GCL_m$, $GCL_{m+1}$, and $GCL_{m+2}$, thereby sequentially selecting one horizontal line. The source selector 13S in the display apparatus with a touch detection function 1 supplies the pixel signals Vpix to the sub-pixels SPix belonging to one horizontal line, thereby performing display on each horizontal line. To perform the display operation, the drive electrode driver 14 applies the display drive voltage VcomDC to the drive electrode COML corresponding to the one horizontal line.

In the color filter 32 illustrated in FIG. 6, the color areas of the color filter in three colors of red (R), green (G), and blue (B), for example, are periodically arrayed. The color areas 32R, 32G, and 32B (refer to FIG. 8) in the three colors of R, G, and B are disposed corresponding to the respective sub-pixels SPix illustrated in FIG. 8 such that a set of the color areas 32R, 32G, and 32B constitute one pixel Pix. The color filter 32 faces the liquid crystal layer 6 in the direction perpendicular to the TFT substrate 21. Each sub-pixel SPix thus can display a single color.

The color filter 32 may have another combination of colors as long as they are different colors. The color filter 32 is not necessarily provided. Specifically, an area where no color filter 32 is provided, that is, a transparent sub-pixel SPix may be present. The number of sub-pixels SPix included in one pixel Pix may be four or more.

Figure 9:
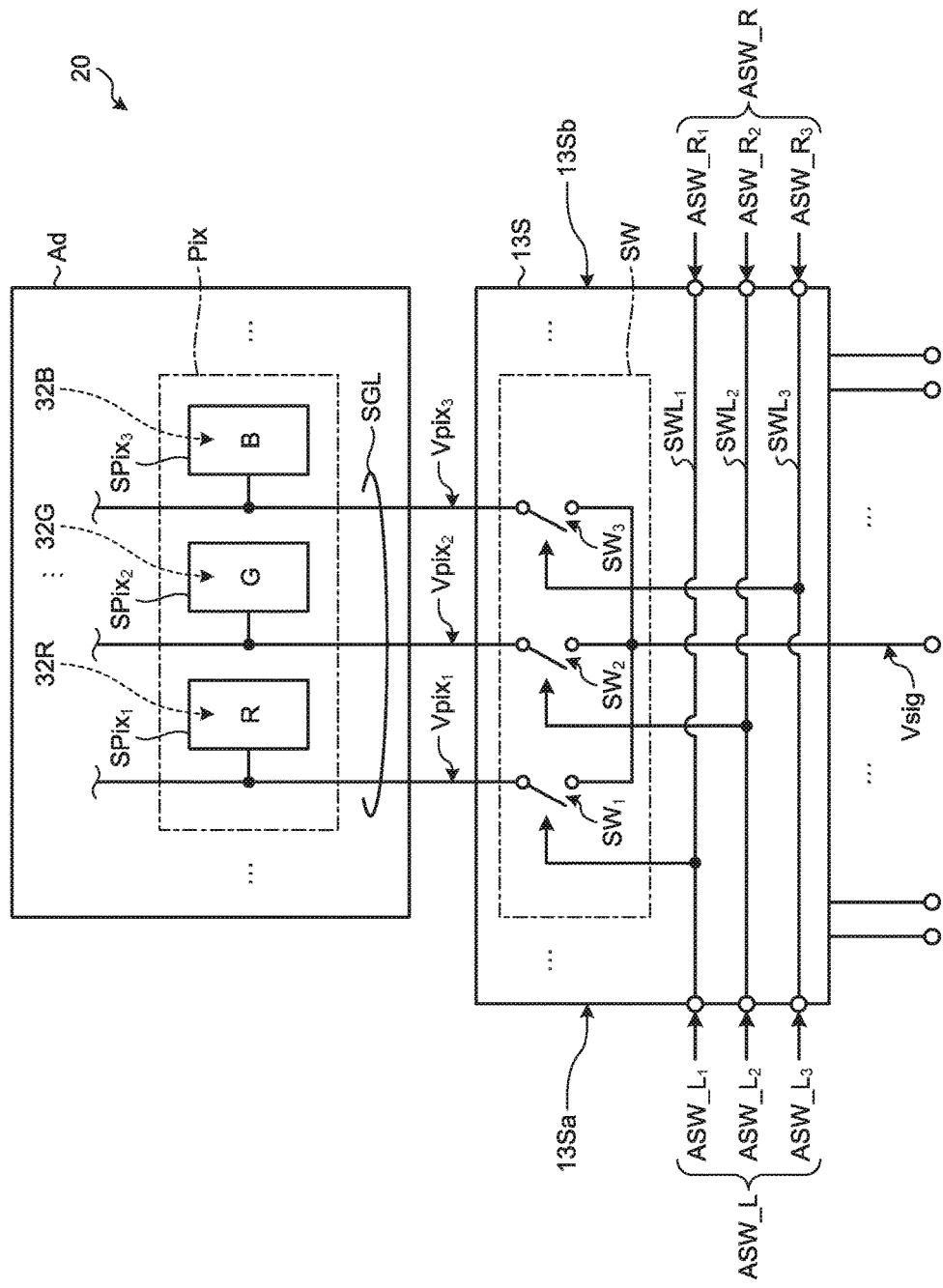
FIG. 9 is a diagram schematically illustrating the relation between a source selector and signals in the display apparatus with a touch detection function according to the first embodiment.

FIG. 9 is a diagram schematically illustrating the configuration of the source selector in the display apparatus with a touch detection function according to the first embodiment. As illustrated in FIG. 9, the pixel signal lines SGL are coupled to the source driver 13 included in the COG 19 via the source selector 13S. The source selector 13S performs opening and closing operations based on the selector switch control signals ASW_L and ASW_R.

The source driver 13 generates, from the image signals Vsig for one horizontal line, pixel signals (image signals Vsig) by time-division multiplexing the pixel signals Vpix for a plurality of (three in the present embodiment, that is, red (R), green (G), and blue (B)) sub-pixels SPix in the liquid crystal display device 20 of the display device with a touch detection function 10. The source driver 13 supplies the pixel signals (image signals Vsig) resulting from multiplexing to the source selector 13S. The source driver 13 also generates the selector switch control signals ASW_L ($ASW\_L_1$, $ASW\_L_2$, and $ASW\_L_3$ in the present embodiment) and ASW_R ($ASW\_R_1$, $ASW\_R_2$, and $ASW\_R_3$ in the present embodiment) required to separate the pixel signals Vpix of R, G, and B from the image signals Vsig in which the pixel signals Vpix of R, G, and B are time-division multiplexed. The source driver 13 supplies the selector switch control signals ASW_L and ASW_R to the source selector 13S together with the image signals Vsig. With the multiplexing operation, the display apparatus with a touch detection function 1 requires fewer wires between the source driver 13 and the source selector 13S.

The source selector 13S separates the pixel signals Vpix of R, G, and B from the image signals Vsig in which the pixel signals Vpix of R, G, and B are time-division multiplexed based on the image signals Vsig and the selector switch control signals ASW_L and ASW_R supplied from the source driver 13. The source selector 13S supplies the pixel signals Vpix of R, G, and B to the liquid crystal display device 20 of the display device with a touch detection function 10.

The source selector 13S includes one switch group SW per three pixel signal lines SGL, for example. The switch group SW includes three switches $SW_1$, $SW_2$, and $SW_3$, for example. First ends of the three switches $SW_1$, $SW_2$, and $SW_3$ are coupled to one another and supplied with the image signals Vsig from the source driver 13. Second ends of the three switches $SW_1$, $SW_2$, and $SW_3$ are coupled to a sub-pixel $SPix_1$ of R, a sub-pixel $SPix_2$ of G, and a sub-pixel $SPix_3$ of B via the three pixel signal lines $SGL_1$, $SGL_2$, and $SGL_3$, respectively, in the liquid crystal display device 20 of the display device with a touch detection function 10.

The source selector 13S includes three signal lines $SWL_1$, $SWL_2$, and $SWL_3$ extending in the longitudinal direction of the source selector 13S, for example. A first end (end on the side 13Sa in FIG. 9) of the signal line $SWL_1$ is supplied with the selector switch control signal $ASW\_L_1$ from the source driver 13. A second end (end on the side 13Sb in FIG. 9) of the signal line $SWL_1$ is supplied with the selector switch control signal $ASW\_R_1$ from the source driver 13. In other words, the signal line $SWL_1$ is supplied with the same signal from both ends. The signal line $SWL_1$ is coupled to the control input end of the switch $SW_1$. Consequently, when the selector switch control signals $ASW\_L_1$ and $ASW\_R_1$ are at a high level, the switch $SW_1$ is turned on.

A first end (end on the side 13Sa in FIG. 9) of the signal line $SWL_2$ is supplied with the selector switch control signal $ASW\_L_2$ from the source driver 13. A second end (end on the side 13Sb in FIG. 9) of the signal line $SWL_2$ is supplied with the selector switch control signal $ASW\_R_2$ from the source driver 13. In other words, the signal line $SWL_2$ is supplied with the same signal from both ends. The signal line $SWL_2$ is coupled to the control input end of the switch $SW_2$. Consequently, when the selector switch control signals $ASW\_L_2$ and $ASW\_R_2$ are at a high level, the switch $SW_2$ is turned on.

A first end (end on the side 13Sa in FIG. 9) of the signal line $SWL_3$ is supplied with the selector switch control signal $ASW\_L_3$ from the source driver 13. A second end (end on the side 13Sb in FIG. 9) of the signal line $SWL_3$ is supplied with the selector switch control signal $ASW\_R_3$ from the source driver 13. In other words, the signal line $SWL_3$ is supplied with the same signal from both ends. The signal line $SWL_3$ is coupled to the control input end of the switch $SW_3$. Consequently, when the selector switch control signals $ASW\_L_3$ and $ASW\_R_3$ are at a high level, the switch $SW_3$ is turned on.

With this configuration, the source selector 13S can sequentially switch and turn on the switches $SW_1$, $SW_2$, and $SW_3$ in a time-division manner according to the selector switch control signals ASW_L ($ASW\_L_1$, $ASW\_L_2$, and $ASW\_L_3$) and ASW_R ($ASW\_R_1$, $ASW\_R_2$, and $ASW\_R_3$). The source selector 13S thus separates a pixel signal $Vpix_1$ of red (R), a pixel signal $Vpix_2$ of green (G), and a pixel signal $Vpix_3$ of blue (B) from the image signals Vsig in which the pixel signals Vpix of R, G, and B are time-division multiplexed. The source selector 13S supplies the separated three pixel signals Vpix to the respective three sub-pixels SPix.

The color areas 32R, 32G, and 32B in the three colors of R, G, and B are disposed corresponding to the sub-pixels $SPix_1$, $SPix_2$, and $SPix_3$, respectively. The sub-pixel $SPix_1$ of R corresponding to the color area 32R is supplied with the pixel signal $Vpix_1$ of R. The sub-pixel $SPix_2$ of G corresponding to the color area 32G is supplied with the pixel signal $Vpix_2$ of G. The sub-pixel $SPix_3$ of B corresponding to the color area 32B is supplied with the pixel signal $Vpix_3$ of B.

The sub-pixel SPix is coupled to the other sub-pixels SPix belonging to the same row in the liquid crystal display device 20 by the drive electrode COML. The drive electrode COML is coupled to the drive electrode driver 14 and supplied with the display drive voltage VcomDC from the drive electrode driver 14. In this example, one drive electrode COML is shared by a plurality of sub-pixels SPix belonging to the same row.

The gate driver 12 illustrated in FIG. 1 applies the scanning signal Vscan to the gates of the TFT elements Tr of the respective sub-pixels SPix via the scanning signal line GCL illustrated in FIG. 8. The gate driver 12 thus sequentially selects one row (one horizontal line) as a target of display drive out of the sub-pixels SPix arranged in a matrix (row-column configuration) in the liquid crystal display device 20. The source selector 13S illustrated in FIG. 1 supplies the pixel signals Vpix to the respective sub-pixels SPix constituting one horizontal line sequentially selected by the gate driver 12 via the pixel signal lines SGL illustrated in FIG. 8. With these sub-pixels SPix, the display of one horizontal line is performed based on the supplied pixel signals Vpix. The drive electrode driver 14 illustrated in FIG. 1 applies the display drive voltage VcomDC to the drive electrodes COML, thereby driving the drive electrodes COML in units of the drive electrode blocks B, each block B including a predetermined number of drive electrodes COML illustrated in FIG. 5. The drive electrode block B may include one drive electrode COML or a plurality of drive electrodes COML.

As described above, the gate driver 12 drives the scanning signal lines GCL to sequentially scan the scanning signal lines GCL in the liquid crystal display device 20 in a time-division manner, thereby sequentially selecting one horizontal line. The source selector 13S supplies the pixel signals Vpix to the sub-pixels SPix belonging to the one horizontal line in the liquid crystal display device 20, thereby performing display on each horizontal line. To perform the display operation, the drive electrode driver 14 applies the display drive voltage VcomDC to the drive electrode block B including the drive electrode COML corresponding to the horizontal line.

Figure 10:
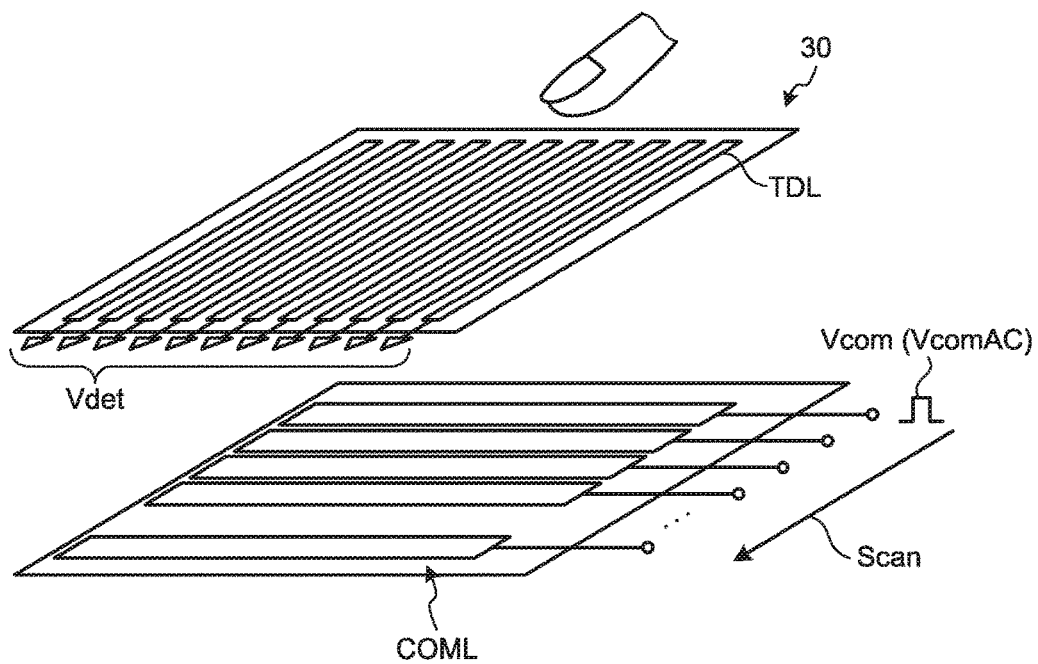
FIG. 10 is a perspective view of an exemplary configuration of drive electrodes and touch detection electrodes in the display apparatus with a touch detection function according to the first embodiment.

FIG. 10 is a perspective view of an exemplary configuration of the drive electrodes and the touch detection electrodes in the display apparatus with a touch detection function according to the first embodiment. The drive electrodes COML according to this exemplary configuration serve not only as drive electrodes of the liquid crystal display device 20 but also as drive electrodes of the touch detection device 30.

The drive electrodes COML face the pixel electrodes 22 in the direction perpendicular to the surface of the TFT substrate 21. The touch detection device 30 includes the drive electrodes COML provided at the pixel substrate 2 and the touch detection electrodes TDL provided at the counter substrate 3.

The touch detection electrodes TDL have stripe electrode patterns extending in a direction intersecting the extending direction of the electrode patterns of the drive electrodes COML. The touch detection electrodes TDL face the drive electrodes COML in the direction perpendicular to the surface of the TFT substrate 21. The electrode patterns of the touch detection electrodes TDL are coupled to respective input terminals of the touch detection signal amplifier 42 of the touch detector 40.

The electrode patterns of the drive electrodes COML and those of the touch detection electrodes TDL intersecting each other form capacitance at the intersections. In the touch detection device 30, the drive electrode driver 14 applies the touch drive signals VcomAC to the drive electrodes COML. As a result, the touch detection electrodes TDL output the touch detection signals Vdet to perform touch detection.

In other words, the drive electrode COML corresponds to the drive electrode E1 in the basic principle of mutual capacitance touch detection illustrated in FIGS. 2 to 4, and the touch detection electrode TDL corresponds to the touch detection electrode E2. The touch detection device 30 detects a touch based on the basic principle.

As described above, the touch detection device 30 includes the touch detection electrodes TDL that generate capacitance with one of the pixel electrodes 22 and the drive electrodes COML (e.g., the drive electrodes COML). Based on a change in the mutual capacitance, the touch detection device 30 performs touch detection.

The electrode patterns of the drive electrodes COML and those of the touch detection electrodes TDL intersecting each other serve as a mutual capacitive touch sensor formed in a matrix (row-column configuration). The touch detector 40 scans the entire input surface IS of the touch detection device 30, thereby detecting the position and the contact area where an object to be detected OBJ is in contact with or in proximity to the input surface IS.

Specifically, to perform a touch detection operation, the drive electrode driver 14 drives the drive electrode blocks B to sequentially linearly scan each drive electrode block B illustrated in FIG. 5 in a time-division manner in the touch detection device 30. As a result, each drive electrode block B (one detection block) of the drive electrodes COML is sequentially selected in a scanning direction Scan. The touch detection device 30 outputs the touch detection signals Vdet from the touch detection electrodes TDL. The touch detection device 30 thus performs touch detection of one detection block.

While the relation between the number of detection blocks and the number of lines in display output may be optionally determined, a touch detection area corresponding to the display area Ad of two lines is defined as one detection block according to the present embodiment. In other words, the relation between the detection blocks and any one of the pixel electrodes, the scanning signal lines, and the pixel signal lines facing the detection blocks is optionally determined. One drive electrode COML according to the present embodiment faces two pixel electrodes or two scanning signal lines.

The touch detection electrodes TDL or the drive electrodes COML (drive electrode blocks B) do not necessarily have a shape divided into a plurality of stripe patterns. The touch detection electrodes TDL or the drive electrodes COML (drive electrode blocks B) may have a comb shape, for example. The touch detection electrodes TDL or the drive electrodes COML (drive electrode blocks B) simply need to have a shape divided into a plurality of parts. The shape of slits separating the drive electrodes COML from one another may be a straight line or a curved line.

In an example of an operating method employed by the display apparatus with a touch detection function 1, the display apparatus with a touch detection function 1 performs a touch detection operation (touch detection period) and a display operation (display operation period) in a time-division manner. The display apparatus with a touch detection function 1 may perform the touch detection operation and the display operation in any division manner.

Figure 11:
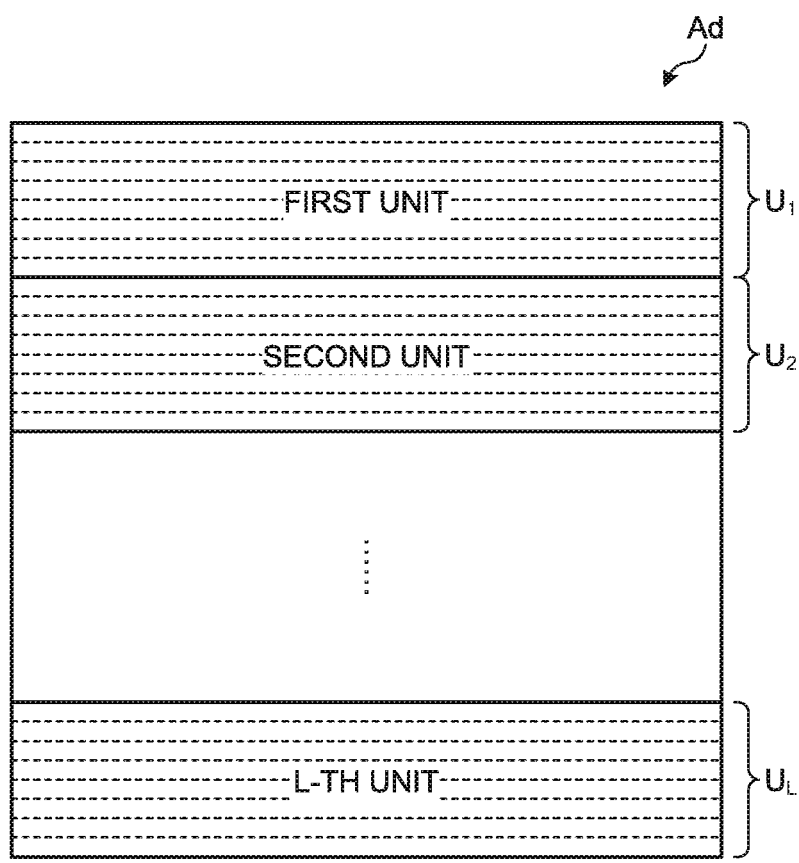
FIG. 11 is a diagram of a display area in the display apparatus with a touch detection function according to the first embodiment.

FIG. 11 is a diagram of the display area in the display apparatus with a touch detection function according to the first embodiment. The display apparatus with a touch detection function 1 divides the pixels of M rows into L units and performs image display and touch detection in each unit.

M horizontal lines in the display area Ad are divided into L units from the first unit $U_1$ to the L-th (L is an integer of 2 or larger) unit $U_L$. The first unit $U_1$ to the L-th unit $U_L$ each include (M/L) horizontal lines. In a case where the display area Ad has 480 horizontal lines and is divided into ten units, for example, the ten units each include 48 horizontal lines.

Figure 12:
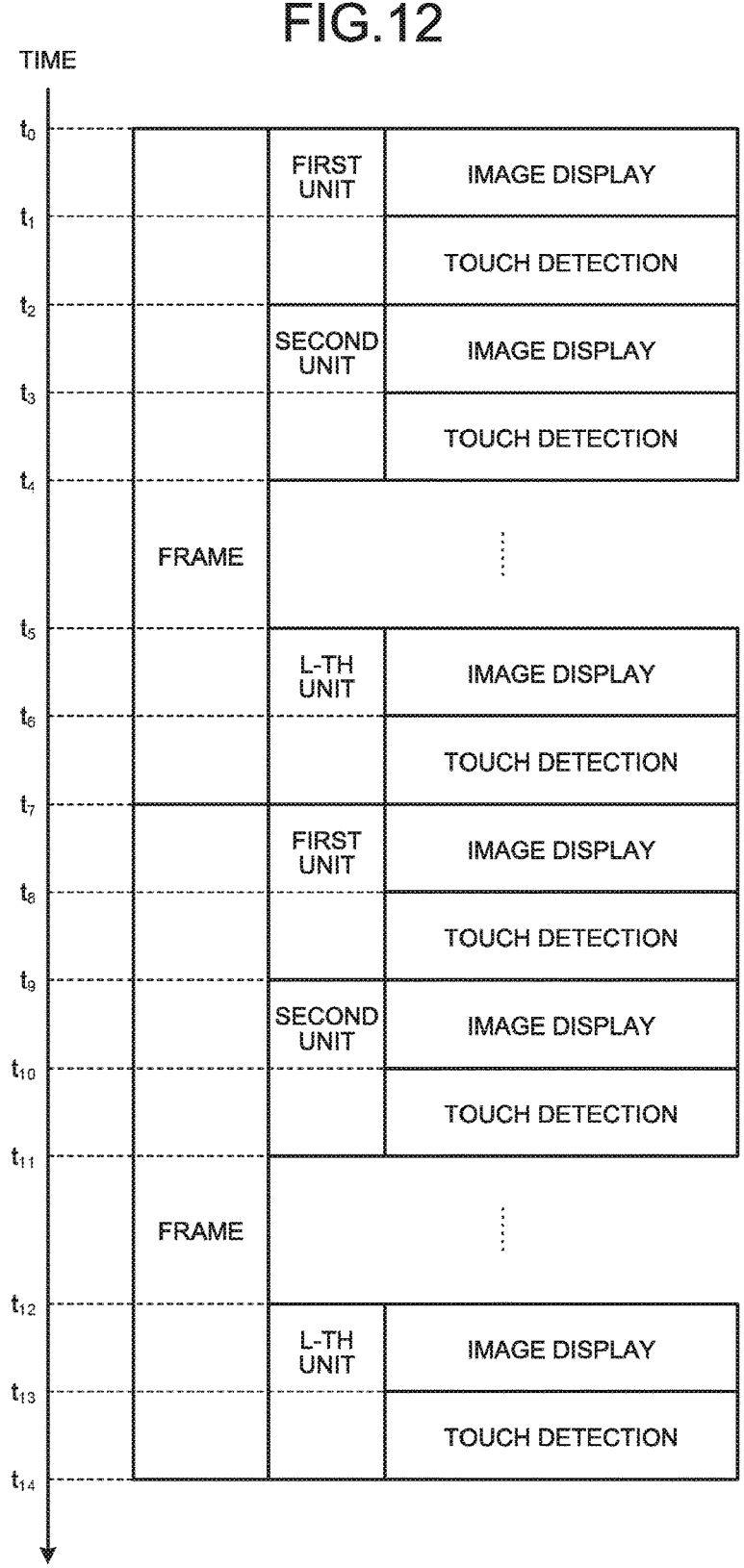
FIG. 12 is a diagram of an operating sequence performed by the display apparatus with a touch detection function according to the first embodiment.

FIG. 12 is a diagram of an operating sequence performed by the display apparatus with a touch detection function according to the first embodiment. FIG. 12 illustrates an operating sequence performed by the display apparatus with a touch detection function 1 on two frames. As illustrated in FIG. 12, the display apparatus with a touch detection function 1 sequentially performs control on the L units from the first unit $U_1$ to the L-th unit $U_L$.

From timing $t_0$ to timing $t_1$, the display apparatus with a touch detection function 1 performs image display of the first frame on the (M/L) horizontal lines included in the first unit $U_1$. From timing $t_1$ to timing $t_2$, the display apparatus with a touch detection function 1 performs touch detection on the (M/L) horizontal lines included in the first unit $U_1$.

From timing $t_2$ to timing $t_3$, the display apparatus with a touch detection function 1 performs image display of the first frame on the (M/L) horizontal lines included in the second unit $U_2$. From timing $t_3$ to timing $t_4$, the display apparatus with a touch detection function 1 performs touch detection on the (M/L) horizontal lines included in the second unit $U_2$.

From timing $t_5$ to timing $t_6$, the display apparatus with a touch detection function 1 performs image display of the first frame on the (M/L) horizontal lines included in the L-th unit $U_L$. From timing $t_6$ to timing $t_7$, the display apparatus with a touch detection function 1 performs touch detection on the (M/L) horizontal lines included in the L-th unit $U_L$.

From timing $t_7$ to timing $t_8$, the display apparatus with a touch detection function 1 performs image display of the second frame on the (M/L) horizontal lines included in the first unit $U_1$. From timing $i_8$ to timing $t_9$, the display apparatus with a touch detection function 1 performs touch detection on the (M/L) horizontal lines included in the first unit $U_1$.

From timing $t_9$ to timing $t_{10}$, the display apparatus with a touch detection function 1 performs image display of the second frame on the (M/L) horizontal lines included in the second unit $U_2$. From timing $t_{10}$ to timing $t_{11}$, the display apparatus with a touch detection function 1 performs touch detection on the (M/L) horizontal lines included in the second unit $U_2$.

From timing $t_{12}$ to timing $t_{13}$, the display apparatus with a touch detection function 1 performs image display of the second frame on the (M/L) horizontal lines included in the L-th unit $U_L$. From timing $t_{13}$ to timing $t_{14}$, the display apparatus with a touch detection function 1 performs touch detection on the (M/L) horizontal lines included in the L-th unit $U_L$.

1-2. Comparative Example

Figure 13:
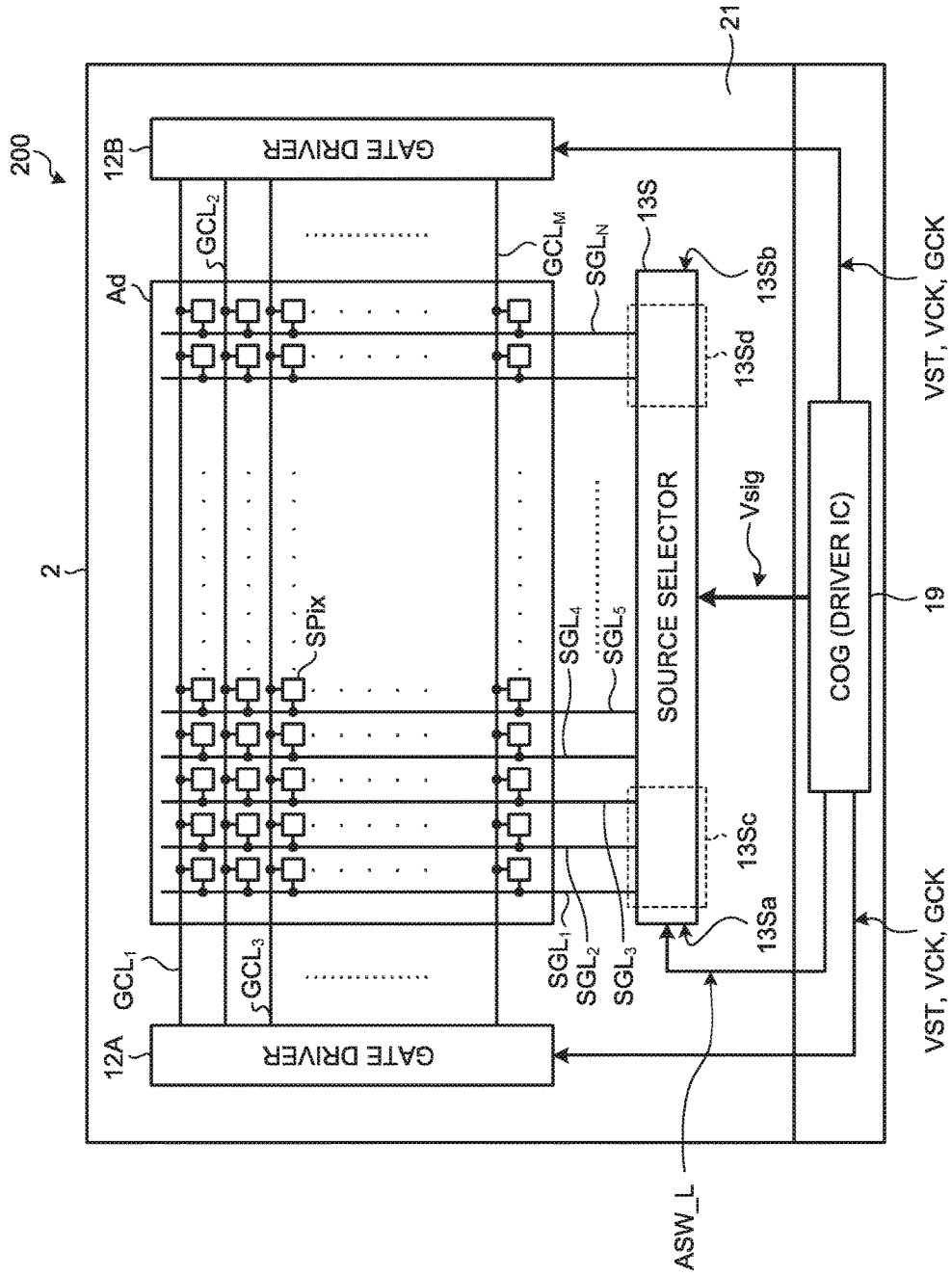
FIG. 13 is a diagram schematically illustrating a configuration of a display apparatus with a touch detection function according to a comparative example.

FIG. 13 is a diagram schematically illustrating a configuration of a display apparatus with a touch detection function according to a comparative example. In a display device with a touch detection function 200 according to the comparative example, the COG 19 outputs the selector switch control signals ASW_L to the side 13Sa of the source selector 13S but outputs no selector switch control signal ASW_R to the side 13Sb of the source selector 13S.

Figure 14:
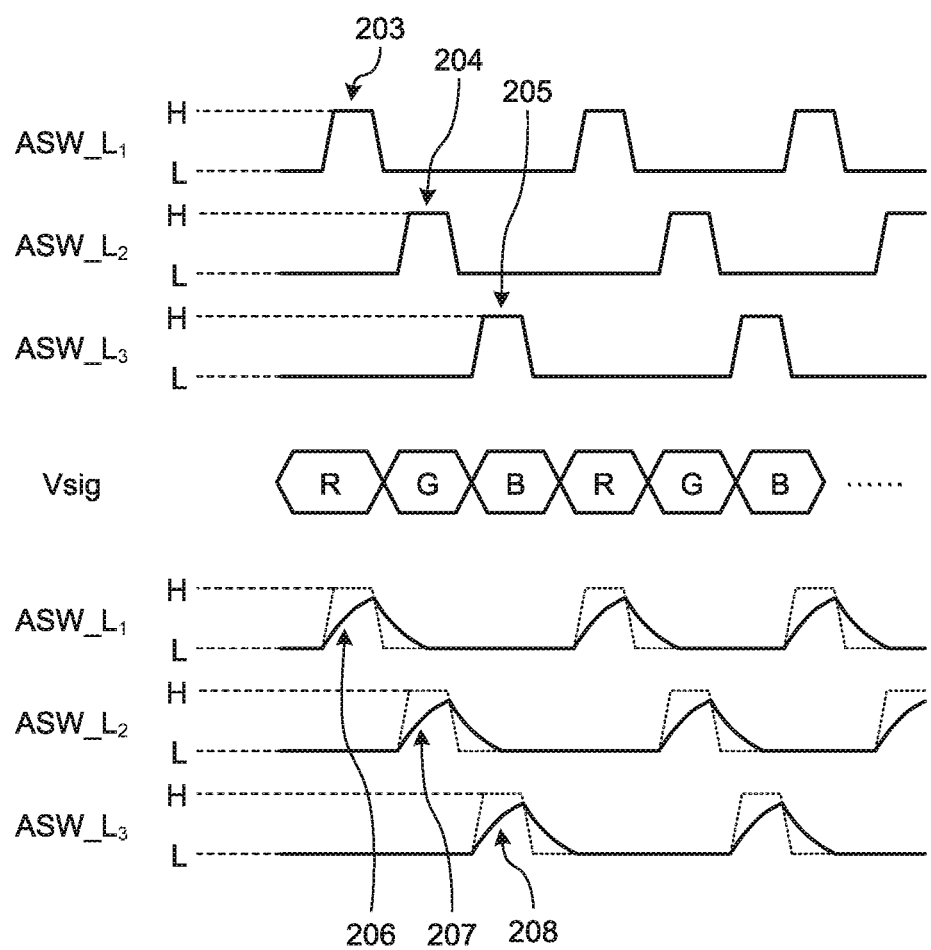
FIG. 14 is a waveform chart of the display apparatus with a touch detection function according to the comparative example.

FIG. 14 is a waveform chart of an operation performed by the display apparatus with a touch detection function according to the comparative example. A waveform 203 is a waveform of the selector switch control signal ASW_$L_1$ in an end portion 13Sc (refer to FIG. 13) on the side 13Sa of the source selector 13S. When the selector switch control signal ASW_$L_1$ is at a high level, the switch $SW_1$ illustrated in FIG. 9 is turned on and outputs the pixel signal Vpix$_1$ of red (R) time-division multiplexed in the image signal Vsig to the sub-pixel SPix$_1$ of R.

A waveform 204 is a waveform of the selector switch control signal ASW_$L_2$ in the end portion 13Sc of the source selector 13S. When the selector switch control signal ASW_$L_2$ is at a high level, the switch $SW_2$ illustrated in FIG. 9 is turned on and outputs the pixel signal Vpix$_2$ of green (G) time-division multiplexed in the image signal Vsig to the sub-pixel SPix$_2$ of G.

A waveform 205 is a waveform of the selector switch control signal ASW_$L_3$ in the end portion 13Sc of the source selector 13S. When the selector switch control signal ASW_$L_3$ is at a high level, the switch $SW_3$ illustrated in FIG. 9 is turned on and outputs the pixel signal Vpix$_3$ of blue (B) time-division multiplexed in the image signal Vsig to the sub-pixel SPix$_3$ of B.

In the end portion 13Sc of the source selector 13S, a large amount of radiation noise is generated. The reason for this is described below. As indicated by the waveforms 203 to 205 in FIG. 14, the rising edge and the falling edge of each of the selector switch control signals ASW_$L_1$ to ASW_$L_3$ steeply rises and falls, which means the time constant thereof is short and the amount of high-frequency components therein is large. As a result, a large amount of harmonics are generated by the high-frequency components in the selector switch control signals ASW_$L_1$ to ASW_$L_3$ in the end portion 13Sc of the source selector 13S. Consequently, a large amount of radiation noise mainly caused by the harmonics of the selector switch control signals ASW_$L_1$ to ASW_$L_3$ is generated in the end portion 13Sc of the source selector 13S.

A waveform 206 is a waveform of the selector switch control signal ASW_$L_1$ in an end portion 13Sd (refer to FIG. 13) on the side 13Sb of the source selector 13S. The selector switch control signal ASW_$L_1$ supplied to the side 13Sa of the source selector 13S travels through the signal line SWL$_1$ illustrated in FIG. 9 and reaches the end portion 13Sd of the source selector 13S. When the selector switch control signal ASW_$L_1$ travels through the signal line SWL$_1$, the time constant of the rising edge and the falling edge of the selector switch control signal ASW_$L_1$ increases by a time constant RC, which is the product of resistance R of the signal line SWL$_1$ and parasitic capacitance C of the signal line SWL$_1$. In the following description, to increase the time constant of a signal may be referred to as "to make the waveform dull".

A waveform 207 is a waveform of the selector switch control signal ASW_$L_2$ in the end portion 13Sd of the source selector 13S. The selector switch control signal ASW_$L_2$ supplied to the side 13Sa of the source selector 13S travels through the signal line SWL$_2$ illustrated in FIG. 9 and reaches the end portion 13Sd of the source selector 13S. When the selector switch control signal ASW_$L_2$ travels through the signal line SWL$_2$, the time constant of the rising edge and the falling edge of the selector switch control signal ASW_$L_2$ increases by the time constant RC, which is the product of the resistance R of the signal line SWL$_2$ and the parasitic capacitance C of the signal line SWL$_2$.

A waveform 208 is a waveform of the selector switch control signal ASW_$L_3$ in the end portion 13Sd of the source selector 13S. The selector switch control signal ASW_$L_3$ supplied to the side 13Sa of the source selector 13S travels through the signal line SWL$_3$ illustrated in FIG. 9 and reaches the end portion 13Sd of the source selector 13S. When the selector switch control signal ASW_$L_3$ travels through the signal line SWL$_3$, the time constant of the rising edge and the falling edge of the selector switch control signal ASW_$L_3$ increases by the time constant RC, which is the product of the resistance R of the signal line SWL$_3$ and the parasitic capacitance C of the signal line SWL$_3$.

In the end portion 13Sd of the source selector 13S, radiation noise is reduced. The reason for this is described below. As indicated by the waveforms 206 to 208 in FIG. 14, the rising edge and the falling edge of each of the selector switch control signals ASW_$L_1$ to ASW_$L_3$ gently rises and falls, which means the time constant thereof is long and the amount of high-frequency components therein is small. As a result, a small amount of harmonics are generated by the high-frequency components in the selector switch control signals ASW_$L_1$ to ASW_$L_3$ in the end portion 13Sd of the source selector 13S. Consequently, radiation noise mainly caused by the harmonics of the selector switch control signals ASW_$L_1$ to ASW_$L_3$ can be reduced in the end portion 13Sd of the source selector 13S.

In the end portion 13Sd of the source selector 13S, a desired image may possibly fail to be displayed. The reason for this is described below. As indicated by the waveforms 206 to 208 in FIG. 14, each of the selector switch control signals ASW_$L_1$ to ASW_$L_3$ gently rises and falls. As a result, the time in which the selector switch control signals ASW_$L_1$ to ASW_$L_3$ are at a high level, that is, the time in which each of the switches $SW_1$ to $SW_3$ is in an on state may possibly be insufficient. In this case, the pixel signals Vpix$_1$ to Vpix$_3$ may possibly fail to be sufficiently supplied to the sub-pixels SPix$_1$ to SPix$_3$, respectively. As a result, a desired image may possibly fail to be displayed on the right side of the display area Ad.

1-3. Configuration of the First Embodiment

Figure 15:
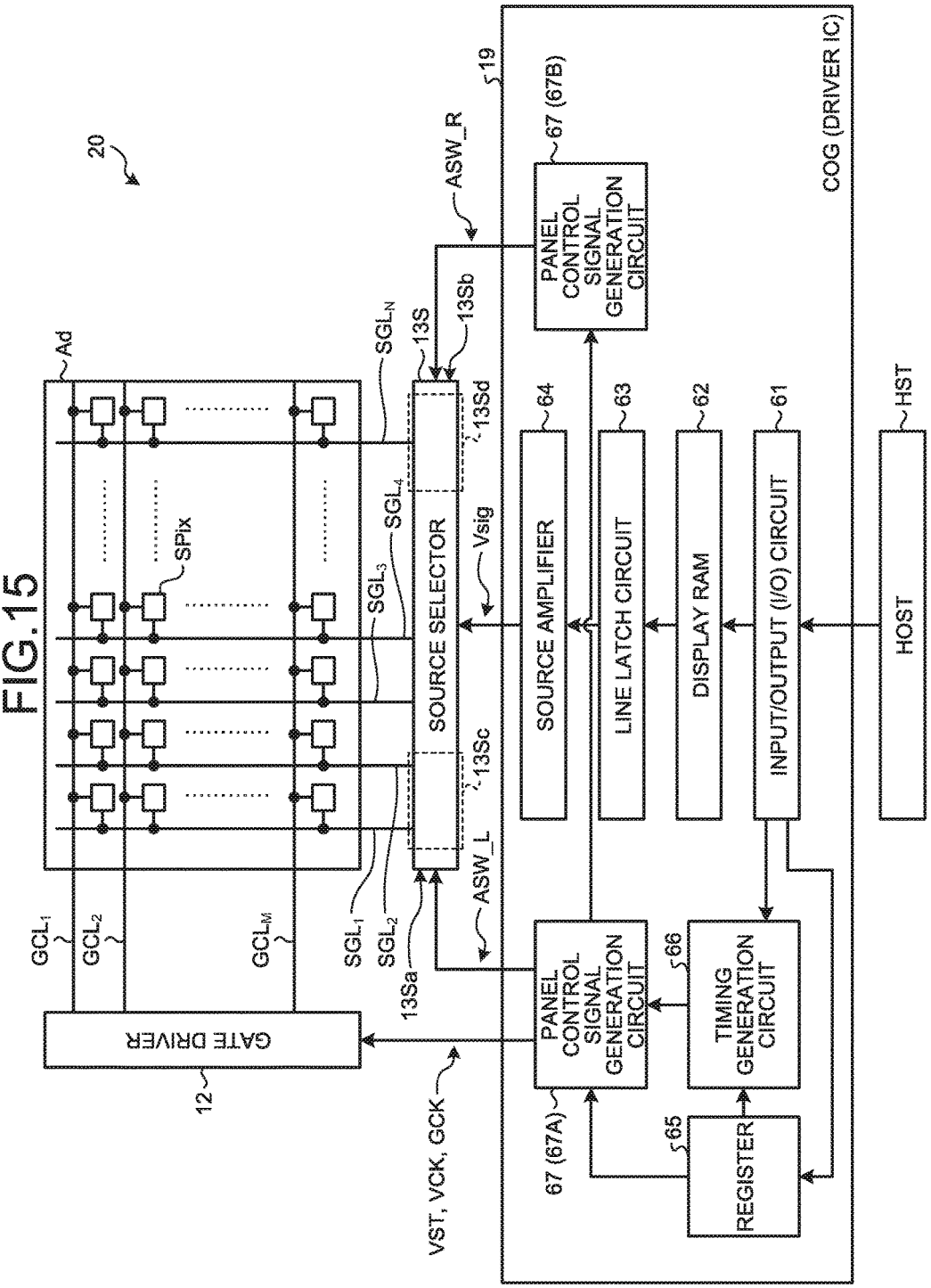
FIG. 15 is a block diagram of an exemplary configuration of the display apparatus with a touch detection function according to the first embodiment.

FIG. 15 is a block diagram of an exemplary configuration of the display apparatus with a touch detection function according to the first embodiment. FIG. 15 is a block diagram of the internal configuration of the COG 19. The COG 19 includes an input/output (I/O) circuit 61, a display random access memory (RAM) 62, a line latch circuit 63, a source amplifier 64, a register 65, a timing generation circuit 66, and a panel control signal generation circuit 67. The panel control signal generation circuit 67 is included in the COG 19 as panel control signal generation circuits 67A and 67B.

While this exemplary configuration includes two circuits, that is, the panel control signal generation circuits 67A and 67B as the panel control signal generation circuit 67, this is given by way of example of a specific configuration of the panel control signal generation circuit 67, and the configuration is not limited thereto.

The I/O circuit 61 is supplied with the video signals Vdisp and control signals from a host HST. The I/O circuit 61 outputs the video signals Vdisp to the display RAM 62. The display RAM 62 has storage capacity of one unit, for example, and stores therein the video signals Vdisp of one unit. The display RAM 62 may have storage capacity of a plurality of units or one frame. The line latch circuit 63 latches the video signals Vdisp of one horizontal line out of the video signals Vdisp of one unit stored in the display RAM 62.

The source amplifier 64 generates, from the video signals Vdisp of one horizontal line latched in the line latch circuit 63, the image signals Vsig each of which is obtained by time-division multiplexing the pixel signals Vpix for a plurality of sub-pixels SPix. The source amplifier 64 outputs the image signals Vsig to the source selector 13S. The source amplifier 64 according to the present embodiment performs frame inversion control of switching the polarity of the image signals Vsig in each frame.

The register 65 is a memory that stores therein various kinds of setting information, such as timing generation information and voltage information in the COG 19, supplied from the host HST via the I/O circuit 61.

The timing generation circuit 66 controls a signal generation timing of the panel control signal generation circuit 67 based on the setting information stored in the register 65 and the control signals supplied from the host HST via the I/O circuit 61.

The panel control signal generation circuit 67 outputs the selector switch control signals ASW_L and ASW_R to the source selector 13S and outputs the vertical start pulses VST, the vertical clock pulses VCK, and the switch control signals GCK to the gate driver 12 under the control of the timing generation circuit 66.

FIG. 16 is another block diagram of an exemplary configuration of the display apparatus with a touch detection function according to the first embodiment. FIG. 16 is a block diagram of the internal configuration of the panel control signal generation circuit 67. The panel control signal generation circuit 67 includes a unit counter 71, a frame counter 72, an adder 73, multiplexers 74 to 79, an $ASW_1$ generation circuit 81, an $ASW_2$ generation circuit 82, an $ASW_3$ generation circuit 83, an $xASW_1$ generation circuit 84, an $xASW_2$ generation circuit 85, and an $xAS W_3$ generation circuit 86.

The exemplary configuration illustrated in FIG. 16 uses a transfer gate for the switches $SW_1$ to $SW_3$ in the source selector 13S. Besides the signal lines $SWL_1$ to $SWL_3$, the source selector 13S also includes a signal line $SWL_4$. The signal line $SWL_4$ is supplied with selector switch control signals $xASW\_L_1$ and $xASW R_1$ serving as logical inversion signals of the selector switch control signals $ASW\_L_1$ and $ASW\_R_1$. The source selector 13S also includes a signal line $SWL_5$ supplied with selector switch control signals $xASW\_L_2$ and $xASW R_2$ serving as logical inversion signals of the selector switch control signals $ASW\_L_2$ and $ASW\_R_2$. The source selector 13S also includes a signal line $SWL_6$ supplied with selector switch control signals $xASW\_L_3$ and $xASW R_3$ serving as logical inversion signals of the selector switch control signals $ASW\_L_3$ and $ASW\_R_3$.

The $ASW_1$ generation circuit 81 includes a first output circuit 81A and a second output circuit 81B. The first output circuit 81A outputs the selector switch control signal $ASW\_L_1$ to the first end of the signal line $SWL_1$. The second output circuit 81B outputs the selector switch control signal $ASW\_R_1$ to the second end of the signal line $SWL_1$. The first output circuit 81A may be included in the panel control signal generation circuit 67A. The second output circuit 81B may be included in the panel control signal generation circuit 67B.

The $ASW_2$ generation circuit 82 includes a first output circuit 82A and a second output circuit 82B. The first output circuit 82A outputs the selector switch control signal $ASW\_L_2$ to the first end of the signal line $SWL_2$. The second output circuit 82B outputs the selector switch control signal $ASW\_R_2$ to the second end of the signal line $SWL_2$. The first output circuit 82A may be included in the panel control signal generation circuit 67A. The second output circuit 82B may be included in the panel control signal generation circuit 67B.

The $ASW_3$ generation circuit 83 includes a first output circuit 83A and a second output circuit 83B. The first output circuit 83A outputs the selector switch control signal $ASW\_L_3$ to the first end of the signal line $SWL_3$. The second output circuit 83B outputs the selector switch control signal $ASW\_R_3$ to the second end of the signal line $SWL_3$. The first output circuit 83A may be included in the panel control signal generation circuit 67A. The second output circuit 83B may be included in the panel control signal generation circuit 67B.

The $xASW_1$ generation circuit 84 includes a first output circuit 84A and a second output circuit 84B. The first output circuit 84A outputs the selector switch control signal $xASW\_L_1$ to the first end of the signal line $SWL_4$. The second output circuit 84B outputs the selector switch control signal $xASW R_1$ to the second end of the signal line $SWL_4$. The first output circuit 84A may be included in the panel control signal generation circuit 67A. The second output circuit 84B may be included in the panel control signal generation circuit 67B.

The $xASW_2$ generation circuit 85 includes a first output circuit 85A and a second output circuit 85B. The first output circuit 85A outputs the selector switch control signal $xASW\_L_2$ to the first end of the signal line $SWL_5$. The second output circuit 85B outputs the selector switch control signal $xASW R_2$ to the second end of the signal line $SWL_5$. The first output circuit 85A may be included in the panel control signal generation circuit 67A. The second output circuit 85B may be included in the panel control signal generation circuit 67B.

The $xASW_3$ generation circuit 86 includes a first output circuit 86A and a second output circuit 86B. The first output circuit 86A outputs the selector switch control signal $xASW\_L_3$ to the first end of the signal line $SWL_6$. The second output circuit 86B outputs the selector switch control signal $xASW R_3$ to the second end of the signal line $SWL_6$. The first output circuit 86A may be included in the panel control signal generation circuit 67A. The second output circuit 86B may be included in the panel control signal generation circuit 67B.

The unit counter 71 counts the number of the unit to be subjected to display processing. The unit counter 71 outputs the least significant bit (LSB) of the number of the unit to be subjected to current display processing to the adder 73.

The frame counter 72 counts the number of the frame to be subjected to display processing. The frame counter 72 outputs the second to least significant bit of the number of the frame to be subjected to current display processing to the adder 73.

The adder 73 is a 1-bit adder that adds the LSB of the number of the unit to be subjected to current display processing, which is supplied from the unit counter 71, and the second to least significant bit of the number of the frame to be subjected to the current display processing, which is supplied from the frame counter 72. The adder 73 outputs the result of addition to the multiplexers 74 to 79.

Receiving "1" from the adder 73, the multiplexer 74 outputs, to the first output circuit 81A, a timing generation signal St supplied from the timing generation circuit 66. The first output circuit 81A outputs the selector switch control signal ASW_$L_1$ to the first end of the signal line SWL$_1$ at a timing based on the timing generation signal St. At this time, output from the second output circuit 81B is in a high-impedance state.

Receiving "0" from the adder 73, the multiplexer 74 outputs, to the second output circuit 81B, the timing generation signal St supplied from the timing generation circuit 66. The second output circuit 81B outputs the selector switch control signal ASW_$R_1$ to the second end of the signal line SWL$_1$ at a timing based on the timing generation signal St. At this time, output from the first output circuit 81A is in a high-impedance state.

Receiving "1" from the adder 73, the multiplexer 75 outputs, to the first output circuit 82A, a timing generation signal St supplied from the timing generation circuit 66. The first output circuit 82A outputs the selector switch control signal ASW_$L_2$ to the first end of the signal line SWL$_2$ at a timing based on the timing generation signal St. At this time, output from the second output circuit 82B is in a high-impedance state.

Receiving "0" from the adder 73, the multiplexer 75 outputs, to the second output circuit 82B, the timing generation signal St supplied from the timing generation circuit 66. The second output circuit 82B outputs the selector switch control signal ASW_$R_2$ to the second end of the signal line SWL$_2$ at a timing based on the timing generation signal St. At this time, output from the first output circuit 82A is in a high-impedance state.

Receiving "1" from the adder 73, the multiplexer 76 outputs, to the first output circuit 83A, a timing generation signal St supplied from the timing generation circuit 66. The first output circuit 83A outputs the selector switch control signal ASW_$L_3$ to the first end of the signal line SWL$_3$ at a timing based on the timing generation signal St. At this time, output from the second output circuit 83B is in a high-impedance state.

Receiving "0" from the adder 73, the multiplexer 76 outputs, to the second output circuit 83B, the timing generation signal St supplied from the timing generation circuit 66. The second output circuit 83B outputs the selector switch control signal ASW_$R_3$ to the second end of the signal line SWL$_3$ at a timing based on the timing generation signal St. At this time, output from the first output circuit 83A is in a high-impedance state.

Receiving "1" from the adder 73, the multiplexer 77 outputs, to the first output circuit 84A, the timing generation signal St supplied from the timing generation circuit 66. The first output circuit 84A outputs the selector switch control signal xASW_$L_1$ to the first end of the signal line SWL$_4$ at a timing based on the timing generation signal St. At this time, output from the second output circuit 84B is in a high-impedance state.

Receiving "0" from the adder 73, the multiplexer 77 outputs, to the second output circuit 84B, the timing generation signal St supplied from the timing generation circuit 66. The second output circuit 84B outputs the selector switch control signal xASW $R_1$ to the second end of the signal line SWL$_4$ at a timing based on the timing generation signal St. At this time, output from the first output circuit 84A is in a high-impedance state.

Receiving "1" from the adder 73, the multiplexer 78 outputs, to the first output circuit 85A, the timing generation signal St supplied from the timing generation circuit 66. The first output circuit 85A outputs the selector switch control signal xASW_$L_2$ to the first end of the signal line SWL$_5$ at a timing based on the timing generation signal St. At this time, output from the second output circuit 85B is in a high-impedance state.

Receiving "0" from the adder 73, the multiplexer 78 outputs, to the second output circuit 85B, the timing generation signal St supplied from the timing generation circuit 66. The second output circuit 85B outputs the selector switch control signal xASW $R_2$ to the second end of the signal line SWL$_5$ at a timing based on the timing generation signal St. At this time, output from the first output circuit 85A is in a high-impedance state.

Receiving "1" from the adder 73, the multiplexer 79 outputs, to the first output circuit 86A, the timing generation signal St supplied from the timing generation circuit 66. The first output circuit 86A outputs the selector switch control signal xASW_$L_3$ to the first end of the signal line SWL$_6$ at a timing based on the timing generation signal St. At this time, output from the second output circuit 86B is in a high-impedance state.

Receiving "0" from the adder 73, the multiplexer 79 outputs, to the second output circuit 86B, the timing generation signal St supplied from the timing generation circuit 66. The second output circuit 86B outputs the selector switch control signal xASW $R_3$ to the second end of the signal line SWL$_6$ at a timing based on the timing generation signal St. At this time, output from the first output circuit 86A is in a high-impedance state.

The pixels Pix or the sub-pixels SPix correspond to a specific example of "pixels" according to the present disclosure. The units U correspond to a specific example of "units" according to the present disclosure. The scanning signal lines GCL correspond to a specific example of "scanning signal lines" according to the present disclosure. The pixel signal lines SGL correspond to a specific example of "pixel signal lines" according to the present disclosure. The source selector 13S corresponds to a specific example of a "separation circuit" according to the present disclosure. The COG 19 corresponds to a specific example of a "control circuit" according to the present disclosure. The selector switch control signals ASW_$L_1$ to ASW_$L_3$ and xASW_$L_1$ to xASW_$L_3$ correspond to a specific example of "separation control signals" according to the present disclosure. The image signal Vsig corresponds to a specific example of an "image signal" according to the present disclosure.

FIG. 17 is a diagram for explaining an operation performed by the display apparatus with a touch detection function according to the first embodiment. FIG. 17 is a diagram for explaining an operation performed by the panel control signal generation circuit 67.

If the frame to be subjected to current display processing is the N-th frame, and the unit to be subjected to the current display processing is an odd-numbered unit as indicated by the first column in a table 90 in FIG. 17, the first output circuits 81A to 86A output the selector switch control signals ASW_$L_1$ to ASW_$L_3$ and xASW_$L_1$ to xASW_$L_3$ to the first ends of the signal lines SWL$_1$ to SWL$_6$, respectively.

When N=0 (0b0 . . . 000) is satisfied, for example, the frame counter 72 outputs "0" to the adder 73. The unit counter 71 outputs "1" to the adder 73 because the unit to be subjected to the current display processing is an odd-numbered unit. The adder 73 outputs "1" corresponding to the result of addition of "0" and "1" to the multiplexers 74 to 79.

If the adder 73 outputs "1" to the multiplexers 74 to 79, the first output circuit 81A outputs the selector switch control signal ASW_$L_1$ to the first end of the signal line SWL$_1$ at a timing based on the timing generation signal St.

The first output circuit 82A outputs the selector switch control signal ASW_$L_2$ to the first end of the signal line SWL$_2$ at a timing based on the timing generation signal St. The first output circuit 83A outputs the selector switch control signal ASW_$L_3$ to the first end of the signal line SWL$_3$ at a timing based on the timing generation signal St.

If the adder 73 outputs "1" to the multiplexers 74 to 79, the first output circuit 84A outputs the selector switch control signal xASW_$L_1$ to the first end of the signal line SWL$_4$ at a timing based on the timing generation signal St. The first output circuit 85A outputs the selector switch control signal xASW_$L_2$ to the first end of the signal line SWL$_5$ at a timing based on the timing generation signal St. The first output circuit 86A outputs the selector switch control signal xASW_$L_3$ to the first end of the signal line SWL$_6$ at a timing based on the timing generation signal St.

If the frame to be subjected to current display processing is the N-th frame, and the unit to be subjected to the current display processing is an even-numbered unit as indicated by the second column in the table 90 in FIG. 17, the second output circuits 81B to 86B output the selector switch control signals ASW_$R_1$ to ASW_$R_3$ and xASW_$R_1$ to xASW_$R_3$ to the second ends of the signal lines SWL$_1$ to SWL$_6$, respectively.

When N=0 (0b0 . . . 000) is satisfied, for example, the frame counter 72 outputs "0" to the adder 73. The unit counter 71 outputs "0" to the adder 73 because the unit to be subjected to the current display processing is an even-numbered unit. The adder 73 outputs "0" corresponding to the result of addition of "0" and "0" to the multiplexers 74 to 79.

If the adder 73 outputs "0" to the multiplexers 74 to 79, the second output circuit 81B outputs the selector switch control signal ASW_$R_1$ to the second end of the signal line SWL$_1$ at a timing based on the timing generation signal St. The second output circuit 82B outputs the selector switch control signal ASW_$R_2$ to the second end of the signal line SWL$_2$ at a timing based on the timing generation signal St. The second output circuit 83B outputs the selector switch control signal ASW_$R_3$ to the second end of the signal line SWL$_3$ at a timing based on the timing generation signal St.

If the adder 73 outputs "0" to the multiplexers 74 to 79, the second output circuit 84B outputs the selector switch control signal xASW_$R_1$ to the second end of the signal line SWL$_4$ at a timing based on the timing generation signal St. The second output circuit 85B outputs the selector switch control signal xASW_$R_2$ to the second end of the signal line SWL$_5$ at a timing based on the timing generation signal St. The second output circuit 86B outputs the selector switch control signal xASW_$R_3$ to the second end of the signal line SWL$_6$ at a timing based on the timing generation signal St.

If the frame to be subjected to current display processing is the (N+1)-th frame, and the unit to be subjected to the current display processing is an odd-numbered unit as indicated by the third column in the table 90 in FIG. 17, the first output circuits 81A to 86A output the selector switch control signals ASW_$L_1$ to ASW_$L_3$ and xASW_$L_1$ to xASW_$L_3$ to the first ends of the signal lines SWL$_1$ to SWL$_6$, respectively.

When (N+1)=1 (0b0 . . . 001) is satisfied, for example, the frame counter 72 outputs "0" to the adder 73. The unit counter 71 outputs "1" to the adder 73 because the unit to be subjected to the current display processing is an odd-numbered unit. The adder 73 outputs "1" corresponding to the result of addition of "0" and "1" to the multiplexers 74 to 79.

If the adder 73 outputs "1" to the multiplexers 74 to 79, the first output circuit 81A outputs the selector switch control signal ASW_$L_1$ to the first end of the signal line SWL$_1$ at a timing based on the timing generation signal St. The first output circuit 82A outputs the selector switch control signal ASW_$L_2$ to the first end of the signal line SWL$_2$ at a timing based on the timing generation signal St. The first output circuit 83A outputs the selector switch control signal ASW_$L_3$ to the first end of the signal line SWL$_3$ at a timing based on the timing generation signal St.

If the adder 73 outputs "1" to the multiplexers 74 to 79, the first output circuit 84A outputs the selector switch control signal xASW_$L_1$ to the first end of the signal line SWL$_4$ at a timing based on the timing generation signal St. The first output circuit 85A outputs the selector switch control signal xASW_$L_2$ to the first end of the signal line SWL$_5$ at a timing based on the timing generation signal St. The first output circuit 86A outputs the selector switch control signal xASW_$L_3$ to the first end of the signal line SWL$_6$ at a timing based on the timing generation signal St.

If the frame to be subjected to current display processing is the (N+1)-th frame, and the unit to be subjected to the current display processing is an even-numbered unit as indicated by the fourth column in the table 90 in FIG. 17, the second output circuits 81B to 86B output the selector switch control signals ASW_$R_1$ to ASW_$R_3$ and xASW_$R_1$ to xASW_$R_3$ to the second ends of the signal lines SWL$_1$ to SWL$_6$, respectively.

When (N+1)=1 (0b0 . . . 001) is satisfied, for example, the frame counter 72 outputs "0" to the adder 73. The unit counter 71 outputs "0" to the adder 73 because the unit to be subjected to the current display processing is an even-numbered unit. The adder 73 outputs "0" corresponding to the result of addition of "0" and "0" to the multiplexers 74 to 79.

If the adder 73 outputs "0" to the multiplexers 74 to 79, the second output circuit 81B outputs the selector switch control signal ASW_$R_1$ to the second end of the signal line SWL$_1$ at a timing based on the timing generation signal St. The second output circuit 82B outputs the selector switch control signal ASW_$R_2$ to the second end of the signal line SWL$_2$ at a timing based on the timing generation signal St. The second output circuit 83B outputs the selector switch control signal ASW_$R_3$ to the second end of the signal line SWL$_3$ at a timing based on the timing generation signal St.

If the adder 73 outputs "0" to the multiplexers 74 to 79, the second output circuit 84B outputs the selector switch control signal xASW_$R_1$ to the second end of the signal line SWL$_4$ at a timing based on the timing generation signal St. The second output circuit 85B outputs the selector switch control signal xASW_$R_2$ to the second end of the signal line SWL$_5$ at a timing based on the timing generation signal St. The second output circuit 86B outputs the selector switch control signal xASW_$R_3$ to the second end of the signal line SWL$_6$ at a timing based on the timing generation signal St.

If the frame to be subjected to current display processing is the (N+2)-th frame, and the unit to be subjected to the current display processing is an odd-numbered unit as indicated by the fifth column in the table 90 in FIG. 17, the second output circuits 81B to 86B output the selector switch control signals ASW_$R_1$ to ASW_$R_3$ and xASW_$R_1$ to xASW_$R_3$ to the second ends of the signal lines SWL$_1$ to SWL$_6$, respectively.

When (N+2)=2 (0b0 . . . 010) is satisfied, for example, the frame counter 72 outputs "1" to the adder 73. The unit counter 71 outputs "1" to the adder 73 because the unit to be subjected to the current display processing is an odd-numbered unit. The adder 73 outputs "0" corresponding to the result of addition of "1" and "1" to the multiplexers 74 to 79.

If the adder 73 outputs "0" to the multiplexers 74 to 79, the second output circuit 81B outputs the selector switch control signal $ASW\_R_1$ to the second end of the signal line $SWL_1$ at a timing based on the timing generation signal St. The second output circuit 82B outputs the selector switch control signal $ASW\_R_2$ to the second end of the signal line $SWL_2$ at a timing based on the timing generation signal St. The second output circuit 83B outputs the selector switch control signal $ASW\_R_3$ to the second end of the signal line $SWL_3$ at a timing based on the timing generation signal St.

If the adder 73 outputs "0" to the multiplexers 74 to 79, the second output circuit 84B outputs the selector switch control signal $xASW\_R_1$ to the second end of the signal line $SWL_4$ at a timing based on the timing generation signal St. The second output circuit 85B outputs the selector switch control signal $xASW\_R_2$ to the second end of the signal line $SWL_5$ at a timing based on the timing generation signal St. The second output circuit 86B outputs the selector switch control signal $xASW\_R_3$ to the second end of the signal line $SWL_6$ at a timing based on the timing generation signal St.

If the frame to be subjected to current display processing is the (N+2)-th frame, and the unit to be subjected to the current display processing is an even-numbered unit as indicated by the sixth column in the table 90 in FIG. 17, the first output circuits 81A to 86A output the selector switch control signals $ASW\_L_1$ to $ASW\_L_3$ and $xASW\_L_1$ to $xASW\_L_3$ to the first ends of the signal lines $SWL_1$ to $SWL_6$, respectively.

When (N+2)=2 (0b0 . . . 010) is satisfied, for example, the frame counter 72 outputs "1" to the adder 73. The unit counter 71 outputs "0" to the adder 73 because the unit to be subjected to the current display processing is an even-numbered unit. The adder 73 outputs "1" corresponding to the result of addition of "1" and "0" to the multiplexers 74 to 79.

If the adder 73 outputs "1" to the multiplexers 74 to 79, the first output circuit 81A outputs the selector switch control signal $ASW\_L_1$ to the first end of the signal line $SWL_1$ at a timing based on the timing generation signal St. The first output circuit 82A outputs the selector switch control signal $ASW\_L_2$ to the first end of the signal line $SWL_2$ at a timing based on the timing generation signal St. The first output circuit 83A outputs the selector switch control signal $ASW\_L_3$ to the first end of the signal line $SWL_3$ at a timing based on the timing generation signal St.

If the adder 73 outputs "1" to the multiplexers 74 to 79, the first output circuit 84A outputs the selector switch control signal $xASW\_L_1$ to the first end of the signal line $SWL_4$ at a timing based on the timing generation signal St. The first output circuit 85A outputs the selector switch control signal $xASW\_L_2$ to the first end of the signal line $SWL_5$ at a timing based on the timing generation signal St. The first output circuit 86A outputs the selector switch control signal $xASW\_L_3$ to the first end of the signal line $SWL_6$ at a timing based on the timing generation signal St.

If the frame to be subjected to current display processing is the (N+3)-th frame, and the unit to be subjected to the current display processing is an odd-numbered unit as indicated by the seventh column in the table 90 in FIG. 17, the second output circuits 81B to 86B output the selector switch control signals $ASW\_R_1$ to $ASW\_R_3$ and $xASW\_R_1$ to $xASW\_R_3$ to the second ends of the signal lines $SWL_1$ to $SWL_6$, respectively.

When (N+3)=3 (0b0 . . . 011) is satisfied, for example, the frame counter 72 outputs "1" to the adder 73. The unit counter 71 outputs "1" to the adder 73 because the unit to be subjected to the current display processing is an odd-numbered unit. The adder 73 outputs "0" corresponding to the result of addition of "1" and "1" to the multiplexers 74 to 79.

If the adder 73 outputs "0" to the multiplexers 74 to 79, the second output circuit 81B outputs the selector switch control signal $ASW\_R_1$ to the second end of the signal line $SWL_1$ at a timing based on the timing generation signal St. The second output circuit 82B outputs the selector switch control signal $ASW\_R_2$ to the second end of the signal line $SWL_2$ at a timing based on the timing generation signal St. The second output circuit 83B outputs the selector switch control signal $ASW\_R_3$ to the second end of the signal line $SWL_3$ at a timing based on the timing generation signal St.

If the adder 73 outputs "0" to the multiplexers 74 to 79, the second output circuit 84B outputs the selector switch control signal $xASW\_R_1$ to the second end of the signal line $SWL_4$ at a timing based on the timing generation signal St. The second output circuit 85B outputs the selector switch control signal $xASW\_R_2$ to the second end of the signal line $SWL_5$ at a timing based on the timing generation signal St. The second output circuit 86B outputs the selector switch control signal $xASW\_R_3$ to the second end of the signal line $SWL_6$ at a timing based on the timing generation signal St.

If the frame to be subjected to current display processing is the (N+3)-th frame, and the unit to be subjected to the current display processing is an even-numbered unit as indicated by the eighth column in the table 90 in FIG. 17, the first output circuits 81A to 86A output the selector switch control signals $ASW\_L_1$ to $ASW\_L_3$ and $xASW\_L_1$ to $xASW\_L_3$ to the first ends of the signal lines $SWL_1$ to $SWL_6$, respectively.

When (N+3)=3 (0b0 . . . 011) is satisfied, for example, the frame counter 72 outputs "1" to the adder 73. The unit counter 71 outputs "0" to the adder 73 because the unit to be subjected to the current display processing is an even-numbered unit. The adder 73 outputs "1" corresponding to the result of addition of "1" and "0" to the multiplexers 74 to 79.

If the adder 73 outputs "1" to the multiplexers 74 to 79, the first output circuit 81A outputs the selector switch control signal $ASW\_L_1$ to the first end of the signal line $SWL_1$ at a timing based on the timing generation signal St. The first output circuit 82A outputs the selector switch control signal $ASW\_L_2$ to the first end of the signal line $SWL_2$ at a timing based on the timing generation signal St. The first output circuit 83A outputs the selector switch control signal $ASW\_L_3$ to the first end of the signal line $SWL_3$ at a timing based on the timing generation signal St.

If the adder 73 outputs "1" to the multiplexers 74 to 79, the first output circuit 84A outputs the selector switch control signal $xASW\_L_1$ to the first end of the signal line $SWL_4$ at a timing based on the timing generation signal St. The first output circuit 85A outputs the selector switch control signal $xASW\_L_2$ to the first end of the signal line $SWL_5$ at a timing based on the timing generation signal St. The first output circuit 86A outputs the selector switch control signal $xASW\_L_3$ to the first end of the signal line $SWL_6$ at a timing based on the timing generation signal St.

The source amplifier 64 according to the embodiment performs frame inversion control of switching the polarity of the image signals Vsig in each frame. As indicated by the first column and the second column in the table 90 in FIG. 17, the source amplifier 64 outputs the image signals Vsig having a positive (+) polarity in the N-th frame. As indicated by the third column and the fourth column in the table 90 in FIG. 17, the source amplifier 64 outputs the image signals Vsig having a negative (−) polarity in the (N+1)-th frame. As indicated by the fifth column and the sixth column in the table 90 in FIG. 17, the source amplifier 64 outputs the image signals Vsig having a positive (+) polarity in the (N+2)-th frame. As indicated by the seventh column and the eighth column in the table 90 in FIG. 17, the source amplifier 64 outputs the image signals Vsig having a negative (−) polarity in the (N+3)-th frame.

Figure 18:
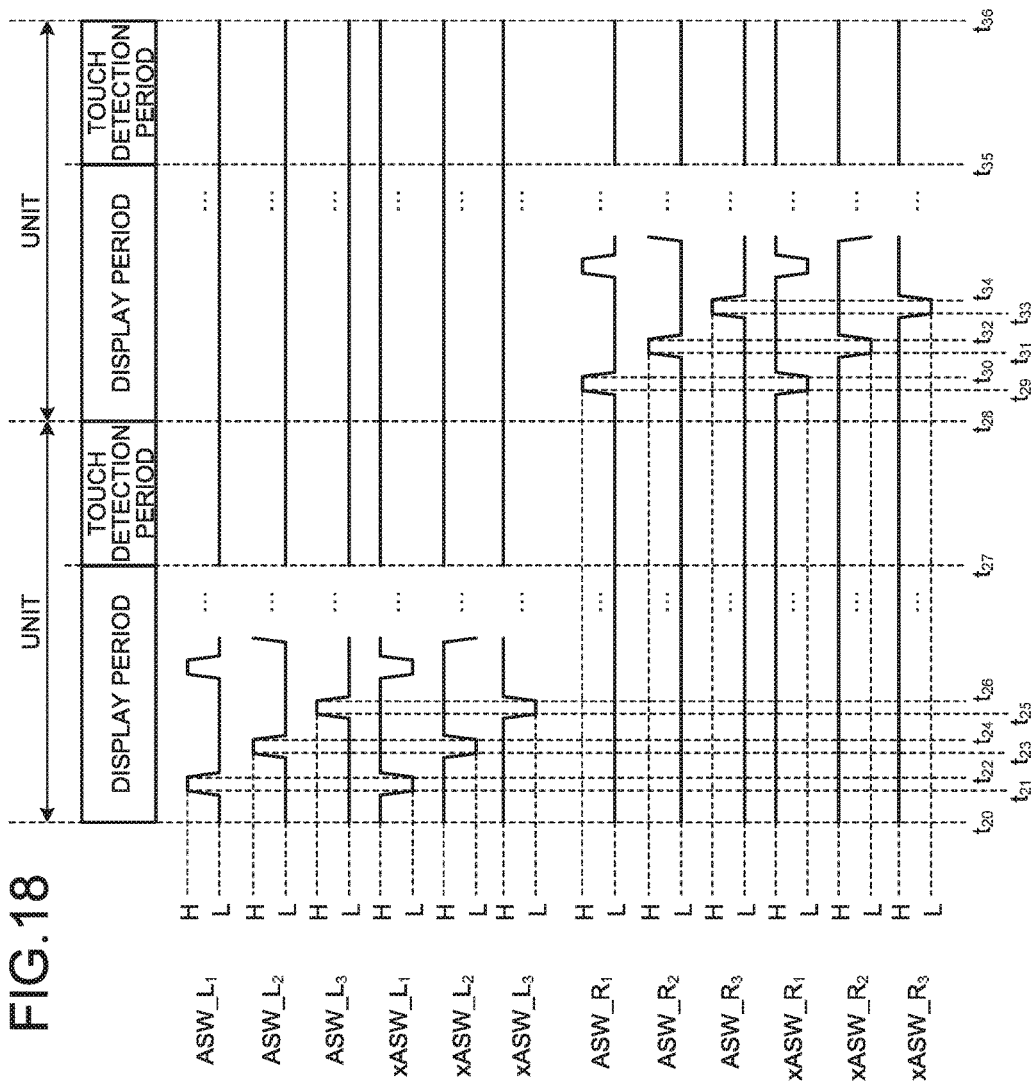
FIG. 18 is a diagram of an operating timing of the display apparatus with a touch detection function according to the first embodiment.

FIG. 18 is a diagram of an operating timing of the display apparatus with a touch detection function according to the first embodiment. The period from timing $t_{20}$ to timing $t_{28}$ corresponds to a period for image display and touch detection of the first unit. The period from timing $t_{20}$ to timing $t_{27}$ corresponds to a period for image display of the first unit. The period from timing $t_{27}$ to timing $t_{28}$ corresponds to a period for touch detection of the first unit. The period from timing $t_{28}$ to timing $t_{36}$ corresponds to a period for image display and touch detection of the second unit. The period from timing $t_{28}$ to timing $t_{35}$ corresponds to a period for image display of the second unit. The period from timing $t_{35}$ to timing $t_{36}$ corresponds to a period for touch detection of the second unit.

In the period from timing $t_{21}$ to timing $t_{22}$, the first output circuit 81A outputs the selector switch control signal ASW_$L_1$ at a high level to the first end of the signal line SWL$_1$. The first output circuit 84A outputs the selector switch control signal xASW_$L_1$ at a low level to the first end of the signal line SWL$_4$. The selector switch control signal ASW_$L_1$ at a high level and the selector switch control signal xASW_$L_1$ at a low level turn on the switch SW$_1$.

In the period from timing $t_{23}$ to timing $t_{24}$, the first output circuit 82A outputs the selector switch control signal ASW_$L_2$ at a high level to the first end of the signal line SWL$_2$. The first output circuit 85A outputs the selector switch control signal xASW_$L_2$ at a low level to the first end of the signal line SWL$_5$. The selector switch control signal ASW_$L_2$ at a high level and the selector switch control signal xASW_$L_2$ at a low level turn on the switch SW$_2$.

In the period from timing $t_{25}$ to timing $t_{26}$, the first output circuit 83A outputs the selector switch control signal ASW_$L_3$ at a high level to the first end of the signal line SWL$_3$. The first output circuit 86A outputs the selector switch control signal xASW_$L_3$ at a low level to the first end of the signal line SWL$_6$. The selector switch control signal ASW_$L_3$ at a high level and the selector switch control signal xASW_$L_3$ at a low level turn on the switch SW$_3$.

In the period from timing $t_{26}$ to timing $t_{27}$, similarly to the period from timing $t_{21}$ to timing $t_{26}$, the first output circuits 81A to 86A output the selector switch control signals ASW_$L_1$ to ASW_$L_3$ and xASW_$L_1$ to xASW_$L_3$ to the first ends of the signal lines SWL$_1$ to SWL$_6$, respectively.

In the period from timing $t_{20}$ to timing $t_{27}$, the second output circuits 81B to 86B do not output the selector switch control signals ASW_$R_1$ to ASW_$R_3$ and xASW_$R_1$ to xASW_$R_3$ to the second ends of the signal lines SWL$_1$ to SWL$_6$, respectively.

Because the period from timing $t_{27}$ to timing $t_{28}$ is a touch detection period, the first output circuits 81A to 86A do not output the selector switch control signals ASW_$L_1$ to ASW_$L_3$ and xASW_$L_1$ to xASW_$L_3$ to the signal lines SWL$_1$ to SWL$_6$, respectively. At the same time, the second output circuits 81B to 86B do not output the selector switch control signals ASW_$R_1$ to ASW_$R_3$ and xASW_$R_1$ to xASW_$R_3$ to the signal lines SWL$_1$ to SWL$_6$, respectively. That is, the switches SW$_1$ to SW$_3$ are turned off.

In the period from timing $t_{29}$ to timing $t_{30}$, the second output circuit 81B outputs the selector switch control signal ASW_$R_1$ at a high level to the second end of the signal line SWL$_1$. The second output circuit 84B outputs the selector switch control signal xASW_$R_1$ at a low level to the second end of the signal line SWL$_4$. The selector switch control signal ASW_$R_1$ at a high level and the selector switch control signal xASW_$R_1$ at a low level turn on the switch SW$_1$.

In the period from timing $t_{31}$ to timing $t_{32}$, the second output circuit 82B outputs the selector switch control signal ASW_$R_2$ at a high level to the second end of the signal line SWL$_2$. The second output circuit 85B outputs the selector switch control signal xASW_$R_2$ at a low level to the second end of the signal line SWL$_5$. The selector switch control signal ASW_$R_2$ at a high level and the selector switch control signal xASW_$R_2$ at a low level turn on the switch SW$_2$.

In the period from timing $t_{33}$ to timing $t_{34}$, the second output circuit 83B outputs the selector switch control signal ASW_$R_3$ at a high level to the second end of the signal line SWL$_3$. The second output circuit 86B outputs the selector switch control signal xASW_$R_3$ at a low level to the second end of the signal line SWL$_6$. The selector switch control signal ASW_$R_3$ at a high level and the selector switch control signal xASW_$R_3$ at a low level turn on the switch SW$_3$.

In the period from timing $t_{34}$ to timing $t_{35}$, similarly to the period from timing $t_{29}$ to timing $t_{34}$, the second output circuits 81B to 86B output the selector switch control signals ASW_$R_1$ to ASW_$R_3$ and xASW_$R_1$ to xASW_$R_3$ to the second ends of the signal lines SWL$_1$ to SWL$_6$, respectively.

In the period from timing $t_{28}$ to timing $t_{35}$, the first output circuits 81A to 86A do not output the selector switch control signals ASW_$L_1$ to ASW_$L_3$ and xASW_$L_1$ to xASW_$L_3$ to the first ends of the signal lines SWL$_1$ to SWL$_6$, respectively.

Because the period from timing $t_{35}$ to timing $t_{36}$ is a touch detection period, the first output circuits 81A to 86A do not output the selector switch control signals ASW_$L_1$ to ASW_$L_3$ and xASW_$L_1$ to xASW_$L_3$ to the signal lines SWL$_1$ to SWL$_6$, respectively. At the same time, the second output circuits 81B to 86B do not output the selector switch control signals ASW_$R_1$ to ASW_$R_3$ and xASW_$R_1$ to xASW_$R_3$ to the signal lines SWL$_1$ to SWL$_6$, respectively. That is, the switches SW$_1$ to SW$_3$ are turned off.

The COG 19 outputs the selector switch control signals ASW_$L_1$ to ASW_$L_3$ and xASW_$L_1$ to xASW_$L_3$ to either the first ends or the second ends of the signal lines SWL$_1$ to SWL$_6$ in the display period for one unit. As a result, the display apparatus with a touch detection function 1 can suppress radiation noise mainly caused by harmonics in the end portions not supplied with the selector switch control signals ASW_$L_1$ to ASW_$L_3$ and xASW_$L_1$ to xASW_$L_3$ out of the end portions 13Sc and 13Sd (refer to FIGS. 7 and 15) of the source selector 13S in the display periods for all the units. Consequently, the display apparatus with a touch detection function 1 can suppress interference with wireless communications performed by electronic apparatuses.

The COG 19 performs control to switch between a first mode and a second mode in each unit. The first mode is a mode in which the selector switch control signals ASW_$L_1$ to ASW_$L_3$ and xASW_$L_1$ to xASW_$L_3$ are supplied to the first ends of the signal lines SWL$_1$ to SWL$_6$, and the second mode is a mode in which the selector switch control signals ASW_$R_1$ to ASW_$R_3$ and xASW_$R_1$ to xASW_$R_3$ are supplied to the second ends of the signal lines $SWL_1$ to $SWL_6$. As a result, the display apparatus with a touch detection function 1 can switch the side on which the pixel signals Vpix may possibly fail to be sufficiently supplied to the sub-pixels SPix between the right side and the left side of the display area Ad. Consequently, the display apparatus with a touch detection function 1 can reduce the possibility that a desired image may fail to be displayed on only one of the right side and the left side of the display area Ad.

The COG 19 further performs control to switch between the first mode and the second mode in every predetermined number of frames (every two frames in the example illustrated in FIG. 17).

Assume that the COG 19 does not perform control to switch between the first mode and the second mode in every predetermined number of frames. In a certain unit, the selector switch control signals $ASW\_L_1$ to $ASW\_L_3$ and $xASW\_L_1$ to $xASW\_L_3$ are supplied to only the first ends of the signal lines $SWL_1$ to $SWL_6$ in all the frames. In another certain unit, the selector switch control signals $ASW\_R_1$ to $ASW\_R_3$ and $xASW\_R_1$ to $xASW\_R_3$ are supplied to only the second ends of the signal lines $SWL_1$ to $SWL_6$ in all the frames. This leads to fixing of the position where a desired image may possibly fail to be displayed in the display area Ad. As a result, a user may possibly visually recognize the position where a desired image fails to be displayed.

To address this, the COG 19 further performs control to switch between the first mode and the second mode in every predetermined number of frames. As a result, the display apparatus with a touch detection function 1 can prevent fixing of the position where a desired image may possibly fail to be displayed in the display area Ad. Consequently, the display apparatus with a touch detection function 1 can reduce the possibility that the user may visually recognize the position where a desired image fails to be displayed.

While the COG 19 performs control to change the ends to be supplied with the selector switch control signals $ASW\_L_1$ to $ASW\_L_3$ and $xASW\_L_1$ to $xASW\_L_3$ (the selector switch control signals $ASW\_R_1$ to $ASW\_R_3$ and $xASW\_R_1$ to $xASW\_R_3$) between the first ends and the second ends of the signal lines $SWL_1$ to $SWL_6$ in every two frames in the example illustrated in FIG. 17, the configuration is not limited thereto. The COG 19 may perform control to change the ends to be supplied with the selector switch control signals $ASW\_L_1$ to $ASW\_L_3$ and $xASW\_L_1$ to $xASW\_L_3$ (the selector switch control signals $ASW\_R_1$ to $ASW\_R_3$ and $xASW\_R_1$ to $xASW\_R_3$) between the first ends and the second ends of the signal lines $SWL_1$ to $SWL_6$ in every one frame or every three or more frames, for example.

While the present invention is applied to the display apparatus with a touch detection function according to the embodiment, for example, it is not limited thereto. The present invention is also applicable to a display apparatus with no touch detection function.

2. Second Embodiment

A second embodiment of the present invention is described below. In the second embodiment and embodiments subsequent thereto, illustration and description of items common with the first embodiment are appropriately omitted.

2-1. Configuration of the Second Embodiment

Figure 19:
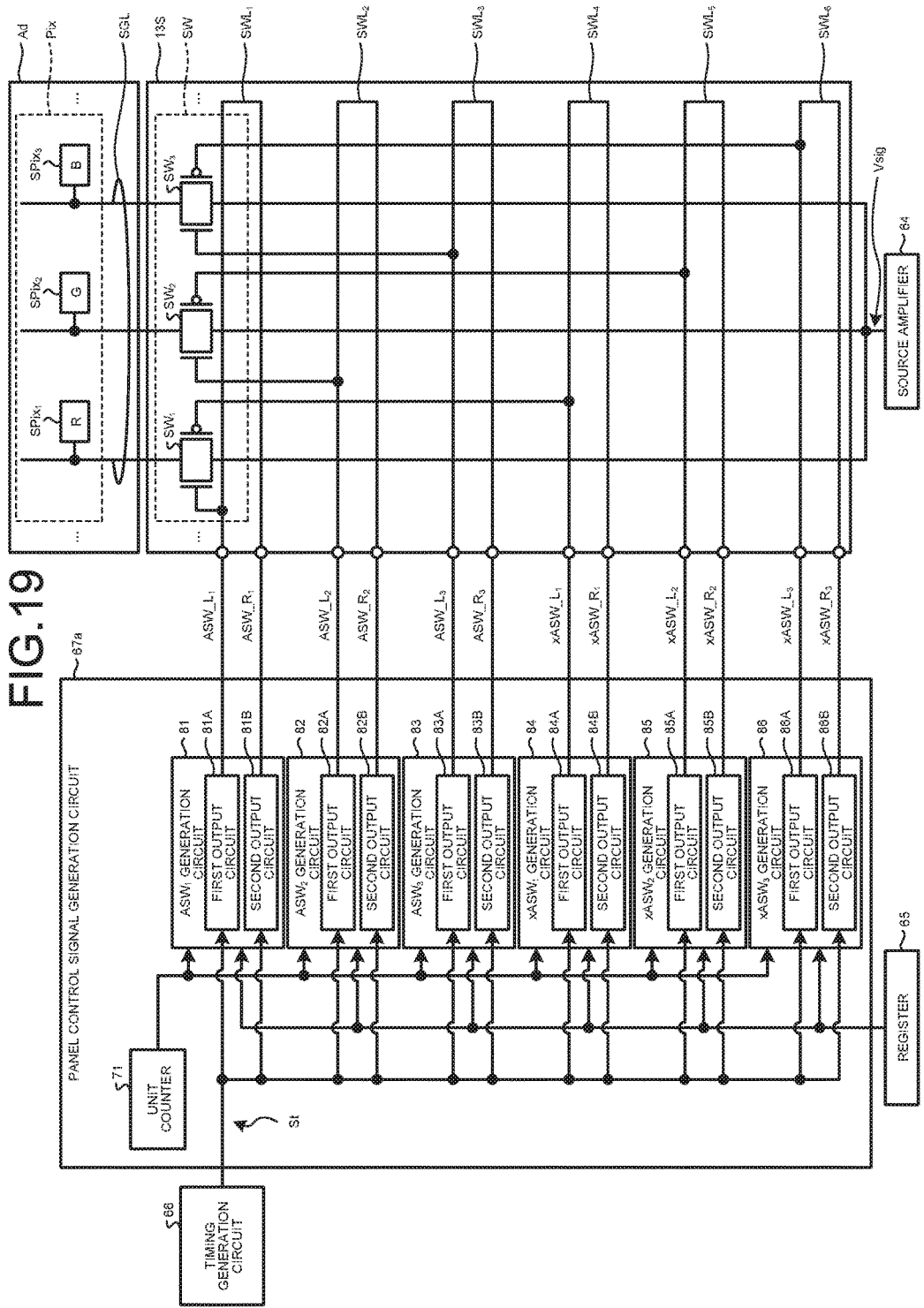
FIG. 19 is a block diagram of an exemplary configuration of a display apparatus with a touch detection function according to a second embodiment of the present invention.

FIG. 19 is a block diagram of an exemplary configuration of a display apparatus with a touch detection function according to the second embodiment. FIG. 19 is a block diagram of the internal configuration of a panel control signal generation circuit 67a. The panel control signal generation circuit 67a includes the unit counter 71, the $ASW_1$ generation circuit 81, the $ASW_2$ generation circuit 82, the $ASW_3$ generation circuit 83, the $xASW_1$ generation circuit 84, the $xASW_2$ generation circuit 85, and the $xASW_3$ generation circuit 86.

The unit counter 71 counts the number of the unit to be subjected to display processing. The unit counter 71 outputs the LSB of the number of the unit to be subjected to current display processing to the first output circuits 81A to 86A and the second output circuits 81B to 86B.

Unlike the first embodiment (refer to FIG. 16), the second embodiment supplies the timing generation signals St to the first output circuits 81A to 86A and the second output circuits 81B to 86B in the display periods for all the units. With this configuration, the second output circuit 81B outputs the selector switch control signal $ASW\_R_1$ to the second end of the signal line $SWL_1$ at the same timing as the timing when the first output circuit 81A outputs the selector switch control signal $ASW\_L_1$ to the first end of the signal line $SWL_1$.

The second output circuit 82B outputs the selector switch control signal $ASW\_R_2$ to the second end of the signal line $SWL_2$ at the same timing as the timing when the first output circuit 82A outputs the selector switch control signal $ASW\_L_2$ to the first end of the signal line $SWL_2$. The second output circuit 83B outputs the selector switch control signal $ASW\_R_3$ to the second end of the signal line $SWL_3$ at the same timing as the timing when the first output circuit 83A outputs the selector switch control signal $ASW\_L_3$ to the first end of the signal line $SWL_3$.

The second output circuit 84B outputs the selector switch control signal $xASW\_R_1$ to the second end of the signal line $SWL_4$ at the same timing as the timing when the first output circuit 84A outputs the selector switch control signal $xASW\_L_1$ to the first end of the signal line $SWL_4$. The second output circuit 85B outputs the selector switch control signal $xASW\_R_2$ to the second end of the signal line $SWL_5$ at the same timing as the timing when the first output circuit 85A outputs the selector switch control signal $xASW\_L_2$ to the first end of the signal line $SWL_5$. The second output circuit 86B outputs the selector switch control signal $xASW\_R_3$ to the second end of the signal line $SWL_6$ at the same timing as the timing when the first output circuit 86A outputs the selector switch control signal $xASW\_L_3$ to the first end of the signal line $SWL_6$.

The first output circuits 81A to 86A and the second output circuits 81B to 86B output the selector switch control signals $ASW\_L_1$ to $ASW\_L_3$, $xASW\_L_1$ to $xASW\_L_3$, $ASW\_R_1$ to $ASW\_R_3$, and $xASW\_R_1$ to $xASW\_R_3$ to the signal lines $SWL_1$ to $SWL_6$, respectively. In outputting those signals, the first output circuits 81A to 86A and the second output circuits 81B to 86B change the waveforms of the selector switch control signals $ASW\_L_1$ to $ASW\_L_3$, $xASW\_L_1$ to $xASW\_L_3$, $ASW\_R_1$ to $ASW\_R_3$, and $xASW\_R_1$ to $xASW\_R_3$, respectively, according to the LSB of the number of the unit to be subjected to current display processing, which is supplied from the unit counter 71. Specifically, the first output circuits 81A to 86A and the second output circuits 81B to 86B respectively cause the inclinations or the time constants of the rising edges and the falling edges of the selector switch control signals $ASW\_L_1$ to $ASW\_L_3$, $xASW\_L_1$ to $xASW\_L_3$, $ASW\_R_1$ to $ASW\_R_3$, and $xASW\_R_1$ to $xASW\_R_3$ to be different when the LSB is "1" from when it is "0".

Figure 20:
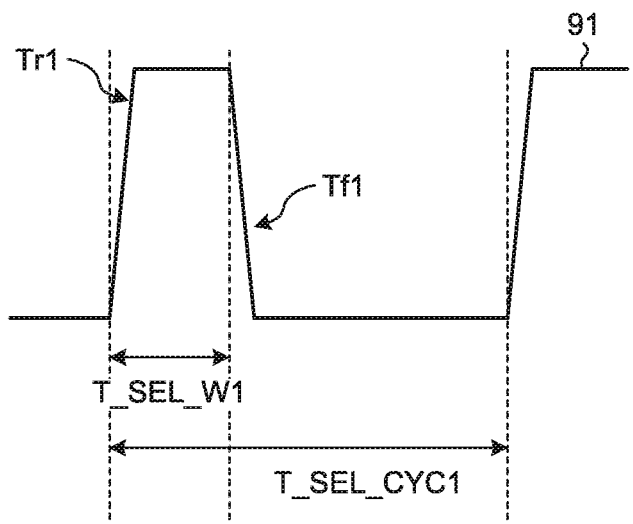
FIG. 20 is a diagram for explaining an operation performed by the display apparatus with a touch detection function according to the second embodiment.

FIG. 20 is a diagram for explaining an operation performed by the display apparatus with a touch detection function according to the second embodiment. FIG. 20 is a diagram of a waveform 91 of each of the selector switch control signals ASW_L$_1$ to ASW_L$_3$ in a case where the LSB of the number of the unit to be subjected to current display processing, which is supplied from the unit counter 71, is "1".

Tr1 indicates the inclination or the time constant of rising of the waveform 91. Tf1 indicates the inclination or the time constant of falling of the waveform 91. T_SEL_W1 indicates the time from the start of rising to the start of falling of the waveform 91. T_SEL_CYC1 indicates the cycle of the waveform 91. Tr1, Tf1, T_SEL_W1, and T_SEL_CYC1 are stored in the register 65 (refer to FIGS. 15 and 19).

Figure 21:
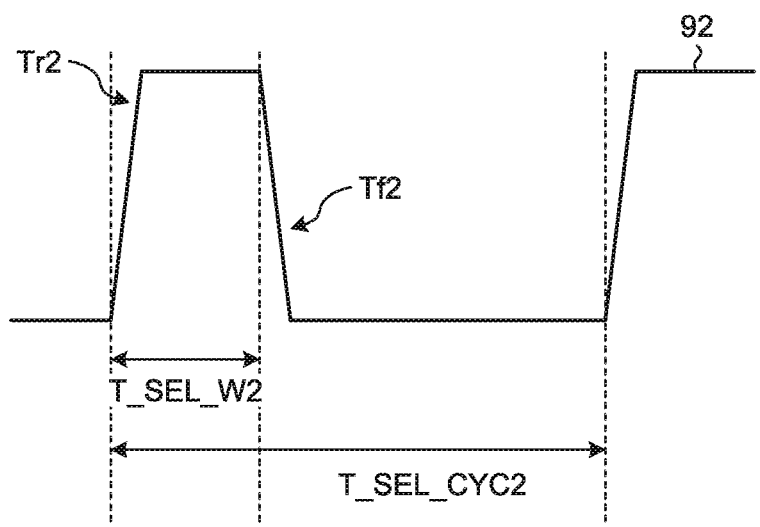
FIG. 21 is another diagram for explaining an operation performed by the display apparatus with a touch detection function according to the second embodiment.

FIG. 21 is a diagram for explaining an operation performed by the display apparatus with a touch detection function according to the second embodiment. FIG. 21 is a diagram of a waveform 92 of each of the selector switch control signals ASW_L$_1$ to ASW_L$_3$ in a case where the LSB of the number of the unit to be subjected to current display processing, which is supplied from the unit counter 71, is "0".

Tr2 indicates the inclination or the time constant of rising of the waveform 92. Tf2 indicates the inclination or the time constant of falling of the waveform 92. T_SEL_W2 indicates the time from the start of rising to the start of falling of the waveform 92. T_SEL_CYC2 indicates the cycle of the waveform 92. Tr2, Tf2, T_SEL_W2, and T_SEL_CYC2 are stored in the register 65.

If the LSB of the number of the unit to be subjected to current display processing, which is supplied from the unit counter 71, is "1", the first output circuits 81A to 83A and the second output circuits 81B to 83B output the selector switch control signals ASW_L$_1$ to ASW_L$_3$ and ASW_R$_1$ to ASW_R$_3$ represented by the waveform 91 to the signal lines SWL$_1$ to SWL$_3$, respectively, based on Tr1, Tf1, T_SEL_W1, and T_SEL_CYC1 stored in the register 65.

If the LSB of the number of the unit to be subjected to current display processing, which is supplied from the unit counter 71, is "1", the first output circuits 84A to 86A and the second output circuits 84B to 86B output the selector switch control signals xASW_L$_1$ to xASW_L$_3$ and xASW_R$_1$ to xASW_R$_3$ resulting from logical inversion of the waveform 91 to the signal lines SWL$_4$ to SWL$_6$, respectively, based on Tr1, Tf1, T_SEL_W1, and T_SEL_CYC1 stored in the register 65.

If the LSB of the number of the unit to be subjected to current display processing, which is supplied from the unit counter 71, is "0", the first output circuits 81A to 83A and the second output circuits 81B to 83B output the selector switch control signals ASW_L$_1$ to ASW_L$_3$ and ASW_R$_1$ to ASW_R$_3$ represented by the waveform 92 to the signal lines SWL$_1$ to SWL$_3$, respectively, based on Tr2, Tf2, T_SEL_W2, and T_SEL_CYC2 stored in the register 65.

If the LSB of the number of the unit to be subjected to current display processing, which is supplied from the unit counter 71, is "0", the first output circuits 84A to 86A and the second output circuits 84B to 86B output the selector switch control signals xASW_L$_1$ to xASW_L$_3$ and xASW_R$_1$ to xASW_R$_3$ resulting from logical inversion of the waveform 92 to the signal lines SWL$_4$ to SWL$_6$, respectively, based on Tr2, Tf2, T_SEL_W2, and T_SEL_CYC2 stored in the register 65.

Figure 22:
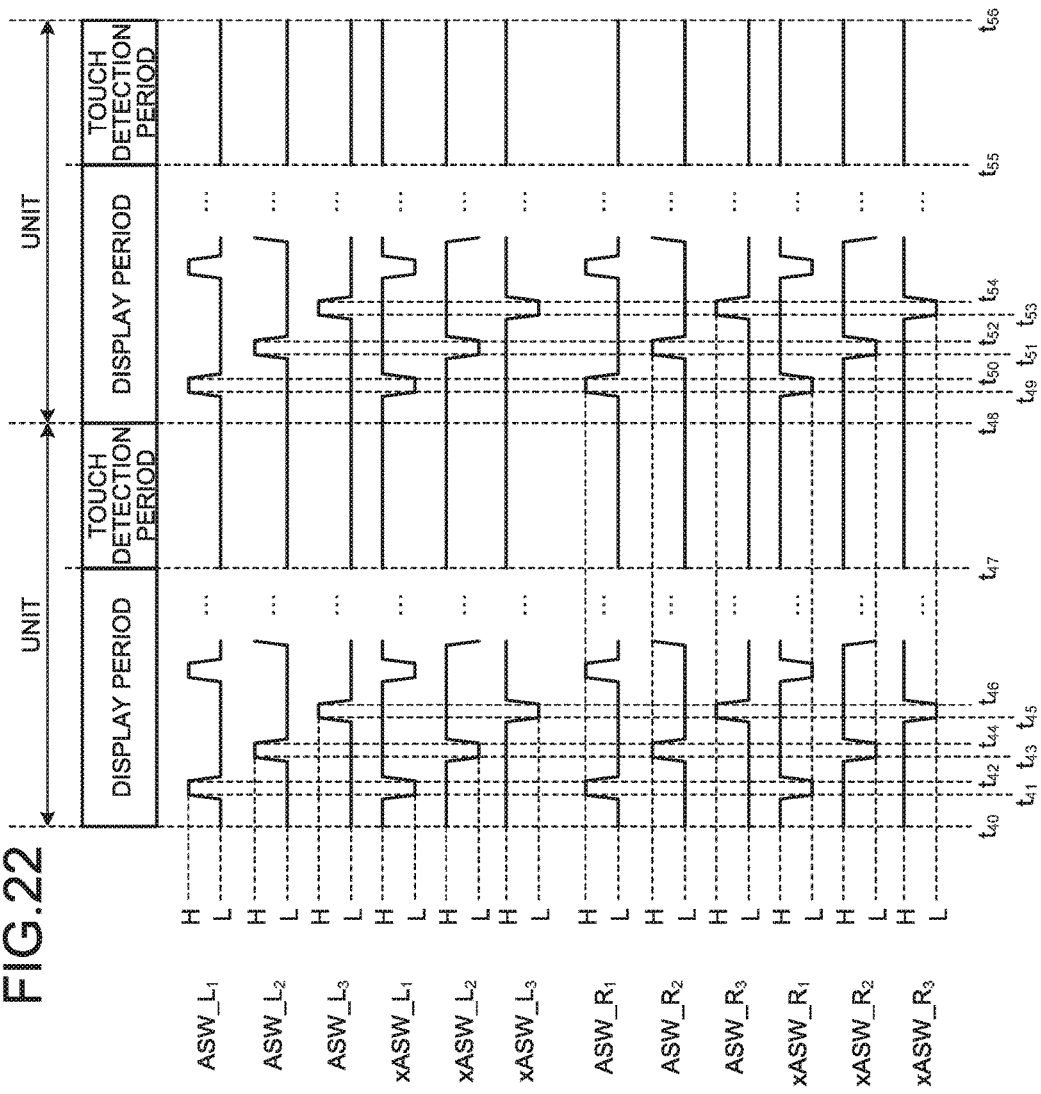
FIG. 22 is a diagram of an operating timing of the display apparatus with a touch detection function according to the second embodiment.

FIG. 22 is a diagram of an operating timing of the display apparatus with a touch detection function according to the second embodiment. The period from timing $t_{40}$ to timing $t_{48}$ corresponds to a period for image display and touch detection of the first unit. The period from timing $t_{40}$ to timing $t_{47}$ corresponds to a period for image display of the first unit. The period from timing $t_{47}$ to timing $t_{48}$ corresponds to a period for touch detection of the first unit. The period from timing $t_{48}$ to timing $t_{56}$ corresponds to a period for image display and touch detection of the second unit. The period from timing $t_{48}$ to timing $t_{55}$ corresponds to a period for image display of the second unit. The period from timing $t_{55}$ to timing $t_{56}$ corresponds to a period for touch detection of the second unit.

In the period from timing $t_{41}$ to timing $t_{42}$, the first output circuit 81A outputs the selector switch control signal ASW_L$_1$ represented by the waveform 91 to the first end of the signal line SWL$_1$ based on Tr1, Tf1, T_SEL_W1, and T_SEL_CYC1 stored in the register 65. The first output circuit 84A outputs the selector switch control signal xASW_L$_1$ at a low level resulting from logical inversion of the waveform 91 to the first end of the signal line SWL$_4$ based on Tr1, Tf1, T_SEL_W1, and T_SEL_CYC1 stored in the register 65. The second output circuit 81B outputs the selector switch control signal ASW_R$_1$ represented by the waveform 91 to the second end of the signal line SWL$_1$ based on Tr1, Tf1, T_SEL_W1, and T_SEL_CYC1 stored in the register 65. The second output circuit 84B outputs the selector switch control signal xASW_R$_1$ at a low level resulting from logical inversion of the waveform 91 to the second end of the signal line SWL$_4$ based on Tr1, Tf1, T_SEL_W1, and T_SEL_CYC1 stored in the register 65.

In the period from timing $t_{43}$ to timing $t_{44}$, the first output circuit 82A outputs the selector switch control signal ASW_L$_2$ represented by the waveform 91 to the first end of the signal line SWL$_2$ based on Tr1, Tf1, T_SEL_W1, and T_SEL_CYC1 stored in the register 65. The first output circuit 85A outputs the selector switch control signal xASW_L$_2$ at a low level resulting from logical inversion of the waveform 91 to the first end of the signal line SWL$_5$ based on Tr1, Tf1, T_SEL_W1, and T_SEL_CYC1 stored in the register 65. The second output circuit 82B outputs the selector switch control signal ASW_R$_2$ represented by the waveform 91 to the second end of the signal line SWL$_2$ based on Tr1, Tf1, T_SEL_W1, and T_SEL_CYC1 stored in the register 65. The second output circuit 85B outputs the selector switch control signal xASW_R$_2$ at a low level resulting from logical inversion of the waveform 91 to the second end of the signal line SWL$_5$ based on Tr1, Tf1, T_SEL_W1, and T_SEL_CYC1 stored in the register 65.

In the period from timing $t_{45}$ to timing $t_{46}$, the first output circuit 83A outputs the selector switch control signal ASW_L$_3$ represented by the waveform 91 to the first end of the signal line SWL$_3$ based on Tr1, Tf1, T_SEL_W1, and T_SEL_CYC1 stored in the register 65. The first output circuit 86A outputs the selector switch control signal xASW_L$_3$ at a low level resulting from logical inversion of the waveform 91 to the first end of the signal line SWL$_6$ based on Tr1, Tf1, T_SEL_W1, and T_SEL_CYC1 stored in the register 65. The second output circuit 83B outputs the selector switch control signal ASW_R$_3$ represented by the waveform 91 to the second end of the signal line SWL$_3$ based on Tr1, Tf1, T_SEL_W1, and T_SEL_CYC1 stored in the register 65. The second output circuit 86B outputs the selector switch control signal xASW_R$_3$ at a low level resulting from logical inversion of the waveform 91 to the second end of the signal line SWL$_6$ based on Tr1, Tf1, T_SEL_W1, and T_SEL_CYC1 stored in the register 65.

In the period from timing $t_{46}$ to timing $t_{47}$, similarly to the period from timing $t_{41}$ to timing $t_{46}$, the first output circuits 81A to 86A and the second output circuits 81B to 86B output the selector switch control signals ASW_L$_1$ to ASW_L$_3$, xASW_L$_1$ to xASW_L$_3$, ASW_R$_1$ to ASW_R$_3$ and xASW_R$_1$ to xASW_R$_3$ to the signal lines SWL$_1$ to SWL$_6$, respectively.

Because the period from timing t$_{47}$ to timing t$_{48}$ is a touch detection period, the first output circuits 81A to 86A and the second output circuits 81B to 86B do not output the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$ to the signal lines SWL$_1$ to SWL$_6$, respectively.

In the period from timing t$_{49}$ to timing t$_{50}$, the first output circuit 81A outputs the selector switch control signal ASW_L$_1$ represented by the waveform 92 to the first end of the signal line SWL$_1$ based on Tr2, Tf2, T_SEL_W2, and T_SEL_CYC2 stored in the register 65. The first output circuit 84A outputs the selector switch control signal xASW_L$_1$ at a low level resulting from logical inversion of the waveform 92 to the first end of the signal line SWL$_4$ based on Tr2, Tf2, T_SEL_W2, and T_SEL_CYC2 stored in the register 65. The second output circuit 81B outputs the selector switch control signal ASW_R$_1$ represented by the waveform 92 to the second end of the signal line SWL$_1$ based on Tr2, Tf2, T_SEL_W2, and T_SEL_CYC2 stored in the register 65. The second output circuit 84B outputs the selector switch control signal xASW_R$_1$ at a low level resulting from logical inversion of the waveform 92 to the second end of the signal line SWL$_4$ based on Tr2, Tf2, T_SEL_W2, and T_SEL_CYC2 stored in the register 65.

In the period from timing t$_{5i}$ to timing t$_{52}$, the first output circuit 82A outputs the selector switch control signal ASW_L$_2$ represented by the waveform 92 to the first end of the signal line SWL$_2$ based on Tr2, Tf2, T_SEL_W2, and T_SEL_CYC2 stored in the register 65. The first output circuit 85A outputs the selector switch control signal xASW_L$_2$ at a low level resulting from logical inversion of the waveform 92 to the first end of the signal line SWL$_5$ based on Tr2, Tf2, T_SEL_W2, and T_SEL_CYC2 stored in the register 65. The second output circuit 82B outputs the selector switch control signal ASW_R$_2$ represented by the waveform 92 to the second end of the signal line SWL$_2$ based on Tr2, Tf2, T_SEL_W2, and T_SEL_CYC2 stored in the register 65. The second output circuit 85B outputs the selector switch control signal xASW_R$_2$ at a low level resulting from logical inversion of the waveform 92 to the second end of the signal line SWL$_5$ based on Tr2, Tf2, T_SEL_W2, and T_SEL_CYC2 stored in the register 65.

In the period from timing t$_{53}$ to timing t$_{54}$, the first output circuit 83A outputs the selector switch control signal ASW_L$_3$ represented by the waveform 92 to the first end of the signal line SWL$_3$ based on Tr2, Tf2, T_SEL_W2, and T_SEL_CYC2 stored in the register 65. The first output circuit 86A outputs the selector switch control signal xASW_L$_3$ at a low level resulting from logical inversion of the waveform 92 to the first end of the signal line SWL$_6$ based on Tr2, Tf2, T_SEL_W2, and T_SEL_CYC2 stored in the register 65. The second output circuit 83B outputs the selector switch control signal ASW_R$_3$ represented by the waveform 92 to the second end of the signal line SWL$_3$ based on Tr2, Tf2, T_SEL_W2, and T_SEL_CYC2 stored in the register 65. The second output circuit 86B outputs the selector switch control signal xASW_R$_3$ at a low level resulting from logical inversion of the waveform 92 to the second end of the signal line SWL$_6$ based on Tr2, Tf2, T_SEL_W2, and T_SEL_CYC2 stored in the register 65.

In the period from timing t$_{54}$ to timing t$_{55}$, similarly to the period from timing t$_{49}$ to timing t$_{54}$, the first output circuits 81A to 86A and the second output circuits 81B to 86B output the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$ to the signal lines SWL$_1$ to SWL$_6$, respectively.

Because the period from timing t$_{55}$ to timing t$_{56}$ is a touch detection period, the first output circuits 81A to 86A and the second output circuits 81B to 86B do not output the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$ to the signal lines SWL$_1$ to SWL$_6$, respectively.

Figure 23:
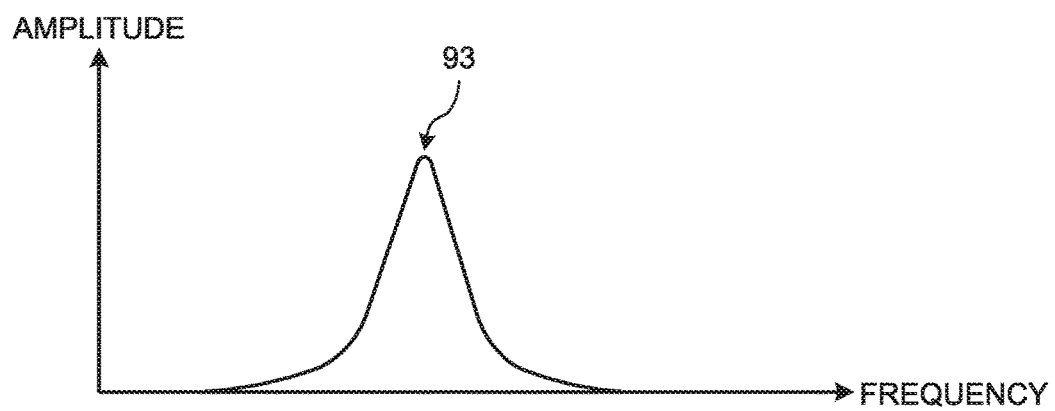
FIG. 23 is a graph of a frequency spectrum of radiation noise in the display apparatus with a touch detection function.

FIG. 23 is a graph of a frequency spectrum of radiation noise in the display apparatus with a touch detection function. FIG. 23 is a graph of a frequency spectrum of radiation noise in a case where the waveforms of the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$ are not changed. As illustrated in FIG. 23, the frequency spectrum has one extremum 93.

Figure 24:
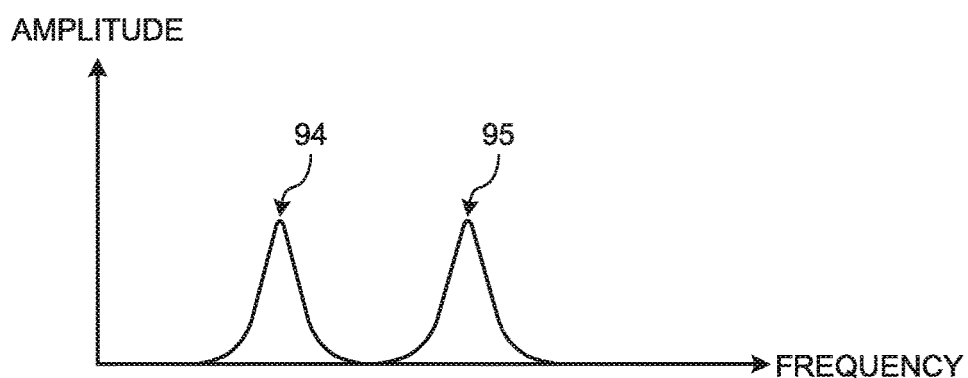
FIG. 24 is a graph of a frequency spectrum of radiation noise in the display apparatus with a touch detection function according to the second embodiment.

FIG. 24 is a graph of a frequency spectrum of radiation noise in the display apparatus with a touch detection function according to the second embodiment. The display apparatus with a touch detection function according to the second embodiment switches the inclination or the time constant of the rising edge and the falling edge of each of the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$ in each unit. As a result, as illustrated in FIG. 24, the frequency spectrum has two extrema 94 and 95. The extrema 94 and 95 are smaller than the extremum 93.

With this configuration, the display apparatus with a touch detection function according to the second embodiment can reduce the radiation noise and disperse the frequency of the radiation noise. Consequently, the display apparatus with a touch detection function according to the second embodiment can suppress interference with wireless communications performed by electronic apparatuses.

The panel control signal generation circuit 67a outputs the selector switch control signals ASW_L$_1$ to ASW_L$_3$ and xASW_L$_1$ to xASW_L$_3$ to the first ends of the signal lines SWL$_1$ to SWL$_6$. At the same time, the panel control signal generation circuit 67a outputs the selector switch control signals ASW_R$_1$ to ASW_R$_3$ and xASW_R$_1$ to xASW_R$_3$ to the second ends of the signal lines SWL$_1$ to SWL$_6$. With this configuration, the display apparatus with a touch detection function according to the second embodiment can reduce the possibility that the pixel signals Vpix may fail to be sufficiently supplied to the sub-pixels SPix. Consequently, the display apparatus with a touch detection function according to the second embodiment can reduce the possibility that a desired image may fail to be displayed.

2-2. Modifications

The second embodiment and the first embodiment can be combined. In other words, the panel control signal generation circuit 67 illustrated in FIG. 16 may have the following configuration. If the LSB of the number of the unit to be subjected to current display processing, which is supplied from the unit counter 71, is "1", the first output circuits 81A to 83A output the selector switch control signals ASW_L$_1$ to ASW_L$_3$ represented by the waveform 91 to the first ends of the signal lines SWL$_1$ to SWL$_3$, respectively, based on Tr1, Tf1, T_SEL_W1, and T_SEL_CYC1 stored in the register 65. If the LSB of the number of the unit to be subjected to current display processing, which is supplied from the unit counter 71, is "1", the first output circuits 84A to 86A output the selector switch control signals xASW_L$_1$ to xASW_L$_3$ resulting from logical inversion of the waveform 91 to the first ends of the signal lines SWL$_4$ to SWL$_6$, respectively, based on Tr1, Tf1, T_SEL_W1, and T_SEL_CYC1 stored in the register 65.

If the LSB of the number of the unit to be subjected to current display processing, which is supplied from the unit counter 71, is "0", the second output circuits 81B to 83B output the selector switch control signals ASW_R$_1$ to ASW_R$_3$ represented by the waveform 92 to the second ends of the signal lines SWL$_1$ to SWL$_3$, respectively, based on Tr2, Tf2, T_SEL_W2, and T_SEL_CYC2 stored in the register 65. If the LSB of the number of the unit to be subjected to current display processing, which is supplied from the unit counter 71, is "0", the second output circuits 84B to 86B output the selector switch control signals xASW_R$_1$ to xASW_R$_3$ resulting from logical inversion of the waveform 92 to the second ends of the signal lines SWL$_4$ to SWL$_6$, respectively, based on Tr2, Tf2, T_SEL_W2, and T_SEL_CYC2 stored in the register 65.

With this configuration, the display apparatus with a touch detection function can further suppress radiation noise. Consequently, the display apparatus with a touch detection function can further suppress interference with wireless communications performed by electronic apparatuses.

3. Third Embodiment

3-1. Principle of the Third Embodiment

As described above, radiation noise is generated in the source selector 13S mainly by harmonics caused by the high-frequency components in the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$.

If the COG 19 makes the inclination of the rising edge and the falling edge gentle or increases the time constant thereof in each of the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$, the high-frequency components in each of the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$ can be reduced.

If the high-frequency components in the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$ are reduced, the harmonics are also reduced. Consequently, the display apparatus with a touch detection function can suppress radiation noise mainly caused by the harmonics.

For the purpose described above, the COG 19 may perform control to make the inclination of the rising edge and the falling edge gentle or increase the time constant thereof in each of the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$.

If the COG 19 excessively makes the inclination of the rising edge and the falling edge gentle or increases the time constant thereof in each of the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$, however, the time in which each of the switches SW$_1$ to SW$_3$ is in an on state may possibly be insufficient. In this case, the pixel signals Vpix$_1$ to Vpix$_3$ may possibly fail to be sufficiently supplied to the sub-pixels SPix$_1$ to SPix$_3$, respectively.

The resistance R and the parasitic capacitance C vary with the signal lines SWL$_1$ to SWL$_6$. As a result, there is an individual difference in how much the COG 19 can make the inclination of the rising edge and the falling edge gentle or increase the time constant thereof in each of the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$.

Consequently, it is difficult to uniformly set the inclinations or the time constants of the rising edges and the falling edges of the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$ for a large number of mass-produced display apparatuses with a touch detection function.

To address this, a display apparatus with a touch detection function according to a third embodiment of the present invention sets the inclination or the time constant of the rising edge and the falling edge of each of the selector switch control signals ASW_L$_1$ to ASW_L$_3$, xASW_L$_1$ to xASW_L$_3$, ASW_R$_1$ to ASW_R$_3$, and xASW_R$_1$ to xASW_R$_3$ depending on the individual signal lines SWL.

Figure 25:
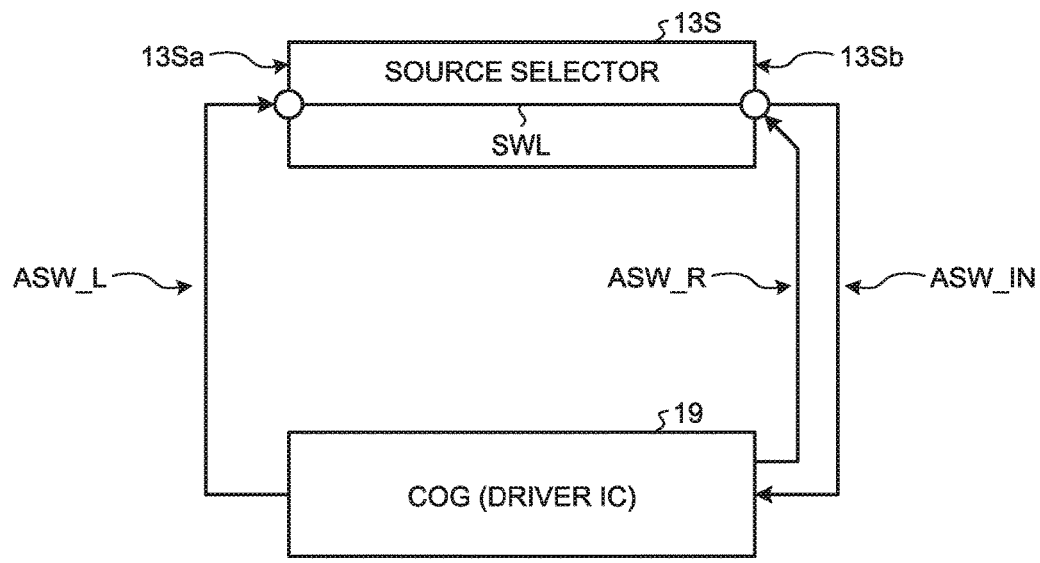
FIG. 25 is a diagram for explaining the principle of a display apparatus with a touch detection function according to a third embodiment of the present invention.

FIG. 25 is a diagram for explaining the principle of the display apparatus with a touch detection function according to the third embodiment. In a normal display operation, the COG 19 outputs the selector switch control signal ASW_L to the first end (end on the side 13Sa in FIG. 25) of the signal line SWL and outputs the selector switch control signal ASW_R to the second end (end on the side 13Sb in FIG. 25) of the signal line SWL.

In an operation for setting the inclination or the time constant of the rising edge and the falling edge of each of the selector switch control signals ASW_L and ASW_R, the COG 19 outputs the selector switch control signal ASW_L to the first end of the signal line SWL. The selector switch control signal ASW_L received by the first end of the signal line SWL is transmitted to the second end of the signal line SWL. The COG 19 detects a signal ASW_IN appearing at the second end of the signal line SWL.

Figure 26:
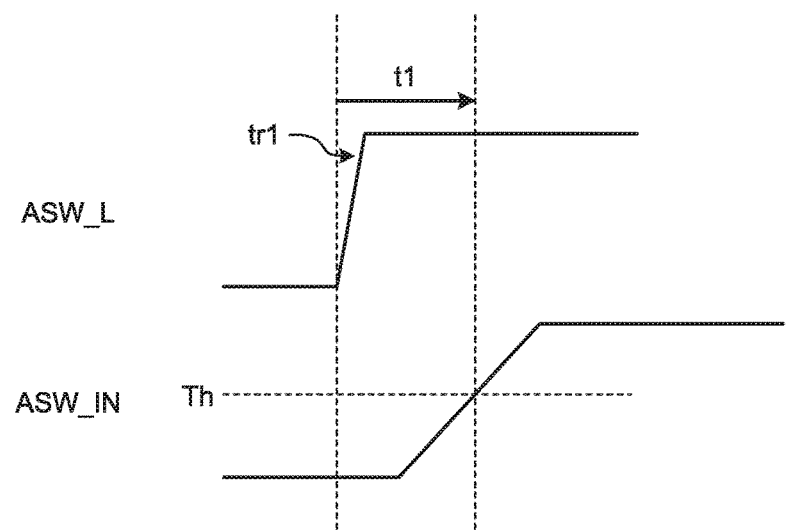
FIG. 26 is another diagram for explaining the principle of the display apparatus with a touch detection function according to the third embodiment.

FIG. 26 is another diagram for explaining the principle of the display apparatus with a touch detection function according to the third embodiment. In the operation for setting the inclination or the time constant of the rising edge and the falling edge of each of the selector switch control signals ASW_L and ASW_R, the COG 19 outputs, to the signal line SWL, the selector switch control signal ASW_L the rising edge and the falling edge of which have a predetermined reference inclination or a time constant tr1. The COG 19 measures delay time t1 from the start of outputting the selector switch control signal ASW_L to the time when the signal ASW_IN reaches a predetermined threshold voltage Th. The delay time t1 is a value corresponding to the time constant RC, which is the product of the resistance R and the parasitic capacitance C of the signal line SWL. Based on the delay time t1, the COG 19 can set the inclination or the time constant of the rising edge and the falling edge of each of the selector switch control signals ASW_L and ASW_R.

3-2. Configuration of the Third Embodiment

FIG. 27 is a block diagram of an exemplary configuration of the display apparatus with a touch detection function according to the third embodiment. FIG. 27 is a block diagram of the internal configuration of a panel control signal generation circuit 67b. The panel control signal generation circuit 67b includes signal generation circuits 101 to 106 and a look-up table (LUT) storage circuit 114.

The signal generation circuit 101 includes an $ASW_1$ generation circuit 81a, a switch 111, a comparator 112, and a delay measurement circuit 113. The $ASW_1$ generation circuit 81a includes a first output circuit 81A1, a second output circuit 81B1, and an input circuit 81C.

Explanation of the configuration of the signal generation circuits 102 to 106 is omitted because it is the same as the configuration of the signal generation circuit 101.

The first output circuit 81A1 and the second output circuit 81B1 are configured to change output impedance. By increasing an output bias current, the first output circuit 81A1 and the second output circuit 81B1 can increase an output current and reduce the output impedance. In other words, the output impedance is considered to indicate an output current driving capability. By increasing the output current, the first output circuit 81A1 and the second output circuit 81B1 can make the inclination of the rising edge and the falling edge steep or reduce the time constant thereof in the selector switch control signals ASW_L and ASW_R. By reducing the output bias current, the first output circuit 81A1 and the second output circuit 81B1 can reduce the output current and increase the output impedance. By reducing the output current, the first output circuit 81A1 and the second output circuit 81B1 can make the inclination of the rising edge and the falling edge gentle or increase the time constant thereof in each of the selector switch control signals ASW_L and ASW_R.

In the operation for setting the inclination or the time constant of the rising edge and the falling edge of each of the selector switch control signals ASW_L and ASW_R, the first output circuit 81A1 sets the output impedance to a predetermined reference value. The predetermined reference value is a variable minimum, for example.

A control end of the switch 111 receives a value of a mode register 65A set by the host HST (refer to FIG. 15). In the operation for setting the inclination or the time constant of the rising edge and the falling edge of each of the selector switch control signals ASW_L and ASW_R, the value of the mode register 65A is set to "0" by the host HST. In the normal display operation, the value of the mode register 65A is set to "1" by the host HST. If the value of the mode register 65A is "0", the switch 111 couples the signal line $SWL_1$ to the input circuit 81C. If the value of the mode register 65A is "1", the switch 111 couples the signal line $SWL_1$ to the second output circuit 81B1.

The input circuit 81C outputs a signal $ASW\_IN_1$ received from the signal line $SWL_1$ to a first input terminal of the comparator 112. A second input terminal of the comparator 112 receives the threshold voltage Th of a threshold register 65B set by the host HST. The comparator 112 outputs a signal obtained as a result of comparison between the signal $ASW\_IN_1$ and the threshold voltage Th to the delay measurement circuit 113.

The delay measurement circuit 113 measures the delay time t1 of the signal $ASW\_IN_1$ based on the signal received from the comparator 112. The delay measurement circuit 113 outputs the delay time t1 to the LUT storage circuit 114.

FIG. 28 is a diagram of a look-up table of the display apparatus with a touch detection function according to the third embodiment. A look-up table 115 illustrated in FIG. 28 is stored in the LUT storage circuit 114.

The look-up table 115 stores therein the values of the delay time and the values of the output impedance in association with each other. The output impedance is considered to indicate an output current driving capability. In other words, the look-up table 115 is considered to store therein the values of the delay time and the values of the output current driving capability in association with each other.

Delay time "T0" is associated with output impedance "R0". Delay time "T1" is associated with output impedance "R1". Delay time "Tn" is associated with output impedance "Rn".

$T0<T1<\ldots<Tn$ is satisfied, and $R0>R1>\ldots>Rn$ is satisfied. In other words, if the delay time t1 measured by the delay measurement circuit 113 is short, that is, if the time constant RC, which is the product of the resistance R and the parasitic capacitance C of the signal line $SWL_1$, is short, the first output circuit 81A1 and the second output circuit 81B1 increase the output impedance, that is, reduce the output current. The first output circuit 81A1 and the second output circuit 81B1 thus can make the inclination of the rising edge and the falling edge gentle or increase the time constant thereof in each of the selector switch control signals ASW_L and ASW_R.

If the delay time t1 measured by the delay measurement circuit 113 is long, that is, if the time constant RC, which is the product of the resistance R and the parasitic capacitance C of the signal line $SWL_1$, is long, the first output circuit 81A1 and the second output circuit 81B1 need to reduce the output impedance, that is, increase the output current. The first output circuit 81A1 and the second output circuit 81B1 thus make the inclination of the rising edge and the falling edge steep or reduce the time constant thereof in each of the selector switch control signals ASW_L and ASW_R.

Referring back to FIG. 27, the LUT storage circuit 114 outputs, to the first output circuit 81A1 and the second output circuit 81B1, the value of the output impedance associated with the delay time t1 received from the delay measurement circuit 113. The first output circuit 81A1 and the second output circuit 81B1 set the output impedance to the value received from the LUT storage circuit 114.

In the normal image display operation, the first output circuit 81A1 outputs the selector switch control signal $ASW\_L_1$ to the first end of the signal line $SWL_1$ at a timing based on the timing generation signal St received from the timing generation circuit 66. The second output circuit 81B1 outputs the selector switch control signal $ASW\_R_1$ to the second end of the signal line $SWL_1$ via the switch 111 at the same timing as the timing when the first output circuit 81A1 outputs the selector switch control signal $ASW\_L_1$ to the first end of the signal line $SWL_1$, based on the timing generation signal St received from the timing generation circuit 66.

The display apparatus with a touch detection function according to the third embodiment can set the inclination or the time constant of the rising edge and the falling edge of each of the selector switch control signals $ASW\_L_1$ to $ASW\_L_3$, $xASW\_L_1$ to $xASW\_L_3$, $ASW\_R_1$ to $ASW\_R_3$, and $xASW\_R_1$ to $xASW\_R_3$ depending on the individual signal lines. With this configuration, the display apparatus with a touch detection function according to the third embodiment can reduce high-frequency components in the selector switch control signals $ASW\_L_1$ to $ASW\_L_3$, $xASW\_L_1$ to $xASW\_L_3$, $ASW\_R_1$ to $ASW\_R_3$, and $xASW\_R_1$ to $xASW\_R_3$. As a result, the display apparatus with a touch detection function according to the third embodiment can suppress harmonics caused by the high-frequency components in the selector switch control signals $ASW\_L_1$ to $ASW\_L_3$, $xASW\_L_1$ to $xASW\_L_3$, $ASW\_R_1$ to $ASW\_R_3$, and $xASW\_R_1$ to $xASW\_R_3$. The display apparatus with a touch detection function thus can suppress radiation noise mainly caused by the harmonics. Consequently, the display apparatus with a touch detection function according to the third embodiment can reduce interference with wireless communications performed by electronic apparatuses.

The panel control signal generation circuit 67b outputs the selector switch control signals ASW_L$_1$ to ASW_L$_3$ and xASW_L$_1$ to xASW_L$_3$ to both ends of the signal lines SWL$_1$ to SWL$_6$ at the same timing. With this configuration, the display apparatus with a touch detection function according to the third embodiment can reduce the possibility that the pixel signals Vpix may fail to be sufficiently supplied to the sub-pixels SPix. Consequently, the display apparatus with a touch detection function according to the third embodiment can reduce the possibility that a desired image may fail to be displayed.

3-3. Modifications

The third embodiment and the first embodiment can be combined. In other words, the panel control signal generation circuit 67 illustrated in FIG. 16 may include the signal generation circuits 101 to 106 and the LUT storage circuit 114 instead of the ASW$_1$ generation circuit 81 to the xASW$_3$ generation circuit 86. In the normal display operation, if the LSB of the number of the unit to be subjected to current display processing, which is supplied from the unit counter 71, is "1", the signal generation circuits 101 to 106 may output the selector switch control signals ASW_L$_1$ to xASW_L$_3$ to the first ends of the signal lines SWL$_1$ to SWL$_6$, respectively. In the normal display operation, if the LSB of the number of the unit to be subjected to current display processing, which is supplied from the unit counter 71, is "0", the signal generation circuits 101 to 106 may output the selector switch control signals ASW_R$_1$ to xASW_R$_3$ to the second ends of the signal lines SWL$_1$ to SWL$_6$, respectively.

FIG. 29 is a flowchart of an operation performed by a display apparatus with a touch detection function according to a modification of the third embodiment. FIG. 29 is a flowchart of the operation for setting the inclination or the time constant of the rising edge and the falling edge of each of the selector switch control signals ASW_L and ASW_R performed by the display apparatus with a touch detection function according to a modification of the third embodiment.

At Step S100, the first output circuit 81A1 sets the output impedance to a predetermined reference value and outputs the selector switch control signal ASW_L$_1$ to the first end of the signal line SWL$_1$. The input circuit 81C receives the signal ASW_IN$_1$ from the second end of the signal line SWL$_1$ and outputs it to the comparator 112. The comparator 112 outputs a signal obtained as a result of comparison between the signal ASW_IN$_1$ and the threshold voltage Th to the delay measurement circuit 113. The delay measurement circuit 113 measures the delay time t1 of the signal ASW_IN$_1$ based on the signal received from the comparator 112.

At Step S102, the LUT storage circuit 114 determines whether the first output circuit 81A1 and the second output circuit 81B1 drive the signal lines SWL$_1$ to SWL$_6$ from both sides at the same timing. In other words, the LUT storage circuit 114 determines whether the first output circuit 81A1 and the second output circuit 81B1 output the selector switch control signals ASW_L$_1$ and ASW_R$_1$ to both sides of the signal line SWL$_1$ at the same timing. If the LUT storage circuit 114 determines that the first output circuit 81A1 and the second output circuit 81B1 do not drive the signal lines SWL$_1$ to SWL$_6$ from both sides at the same timing (No at Step S102), the LUT storage circuit 114 performs processing at Step S104. If the LUT storage circuit 114 determines that the first output circuit 81A1 and the second output circuit 81B1 drive the signal lines SWL$_1$ to SWL$_6$ from both sides at the same timing (Yes at Step S102), the LUT storage circuit 114 performs processing at Step S106.

At Step S104, the LUT storage circuit 114 outputs the value of the output impedance associated with the delay time t1 to the first output circuit 81A1 and the second output circuit 81B1. The first output circuit 81A1 and the second output circuit 81B1 set the output impedance to the value received from the LUT storage circuit 114.

At Step S106, the LUT storage circuit 114 outputs the value of the output impedance associated with a half of the delay time t1 to the first output circuit 81A1 and the second output circuit 81B1. When the first output circuit 81A1 and the second output circuit 81B1 drive the signal lines SWL$_1$ to SWL$_6$ from both sides at the same timing, the position having largest delay in the signal line SWL$_1$ is the middle portion of the signal line SWL$_1$. The delay time at the middle portion of the signal line SWL$_1$ is a half of the delay time t1. The first output circuit 81A1 and the second output circuit 81B1 set the output impedance to the value received from the LUT storage circuit 114.

The signal generation circuits 101 to 106 can be used in both of the following cases: a case where the first output circuit 81A1 and the second output circuit 81B1 output the selector switch control signals ASW_L$_1$ and ASW_R$_1$ to both sides of the signal line SWL$_1$ at the same timing (refer to the first embodiment), and a case where the first output circuit 81A1 and the second output circuit 81B1 output the selector switch control signals ASW_L$_1$ and ASW_R$_1$ to one side of the signal line SWL$_1$ alternately (refer to the third embodiment).

While exemplary embodiments according to the present invention have been described, the embodiments are not intended to limit the invention. The contents disclosed in the embodiments are given by way of example only, and various modifications may be made without departing from the spirit of the invention. Appropriate changes made without departing from the spirit of the invention naturally fall within the technical scope of the invention.

What is claimed is:
1. A display apparatus comprising:
    a plurality of pixels arranged in a row-column configuration and divided into a plurality of units each including a plurality of rows;
    a plurality of scanning signal lines configured to select one row out of the pixels;
    a plurality of pixel signal lines configured to supply a plurality of pixel signals to the one row;
    a control circuit configured to output an image signal in which the pixel signals are time-division multiplexed and a plurality of separation control signals for separating the pixel signals from the image signal; and
    a separation circuit including a plurality of separation control signal lines supplied with the separation control signals and configured to separate the pixel signals from the image signal and output the pixel signals to the pixel signal lines based on the separation control signals,
    wherein the control circuit switches ends to be supplied with the separation control signals between first ends and second ends of the separation control signal lines.

2. The display apparatus according to claim 1,
wherein the control circuit further switches the ends to be supplied with the separation control signals between the first ends and the second ends of the separation control signal lines in every one frame or a plurality of frames.

3. The display apparatus according to claim 1,
wherein the control circuit switches an inclination or a time constant of a rising edge and a falling edge of each of the separation control signals in each of the units.

4. The display apparatus according to claim 1,
wherein the control circuit outputs the separation control signals to the first ends of the separation control signal lines, measures a delay time of the separation control signal appearing at each of the second ends of the separation control signal lines, and sets an inclination or a time constant of a rising edge and a falling edge of each of the separation control signals based on the delay time.

5. The display apparatus according to claim 1,
wherein the control circuit is coupled with both the first end and the second end of each of the separation control signal lines, and
wherein the control circuit switches ends to be supplied with the separation control signals between first ends and second ends of the separation control signal lines at a predetermined timing.

6. A display apparatus comprising:
a plurality of pixels arranged in a row-column configuration and divided into a plurality of units each including a plurality of rows;
a plurality of scanning signal lines configured to select one row out of the pixels;
a plurality of pixel signal lines configured to supply a plurality of pixel signals to the one row;
a control circuit configured to output an image signal in which the pixel signals are time-division multiplexed and a plurality of separation control signals for separating the pixel signals from the image signal; and
a separation circuit including a plurality of signal lines supplied with the separation control signals and configured to separate the pixel signals from the image signal and output the pixel signals to the pixel signal lines based on the separation control signals,
wherein the control circuit switches an inclination or a time constant of a rising edge and a falling edge of each of the separation control signals in each of the units, and outputs the separation control signals to both ends of the signal lines.

7. A display apparatus comprising:
a plurality of pixels arranged in a row-column configuration and divided into a plurality of units each including a plurality of rows;
a plurality of scanning signal lines configured to select one row out of the pixels;
a plurality of pixel signal lines configured to supply a plurality of pixel signals to the one row;
a control circuit configured to output an image signal in which the pixel signals are time-division multiplexed and a plurality of separation control signals for separating the pixel signals from the image signal; and
a separation circuit including a plurality of signal lines supplied with the separation control signals and configured to separate the pixel signals from the image signal and output the pixel signals to the pixel signal lines based on the separation control signals,
wherein the control circuit outputs the separation control signals to first ends of the signal lines, measures a delay time of the separation control signal appearing at a second end of each of the signal lines, and sets an inclination or a time constant of a rising edge and a falling edge of each of the separation control signals based on the delay time.

8. The display apparatus according to claim 7,
wherein the control circuit refers to a table in which the delay time and an output current driving capability are associated with each other to set the output current driving capability corresponding to the delay time, thereby setting the inclination or the time constant of the rising edge and the falling edge of each of the separation control signals, and outputs the separation control signals to both ends of the signal lines.

9. The display apparatus according to claim 7,
wherein the control circuit refers to a table in which the delay time and an output current driving capability are associated with each other to set the output current driving capability corresponding to a half of the delay time, thereby setting the inclination or the time constant of the rising edge and the falling edge of each of the separation control signals, and outputs the separation control signals to the first end or the second end of the signal lines.

10. A display apparatus comprising:
a plurality of pixels including a plurality of rows;
a plurality of scanning signal lines configured to select one row out of the pixels;
a plurality of pixel signal lines configured to supply a plurality of pixel signals to the one row;
a control circuit configured to output an image signal in which the pixel signals are time-division multiplexed and a plurality of separation control signals for separating the pixel signals from the image signal; and
a separation circuit including a plurality of signal lines supplied with the separation control signals and configured to separate the pixel signals from the image signal and output the pixel signals to the pixel signal lines based on the separation control signals,
wherein the control circuit switches an inclination or a time constant of a rising edge and a falling edge of each of the separation control signals on a predetermined number of rows basis.

11. A display apparatus comprising:
a plurality of pixels including a plurality of rows;
a plurality of scanning signal lines configured to select one row out of the pixels;
a plurality of pixel signal lines configured to supply a plurality of pixel signals to the one row;
a control circuit configured to output an image signal in which the pixel signals are time-division multiplexed and a plurality of separation control signals for separating the pixel signals from the image signal; and
a separation circuit including a plurality of signal lines supplied with the separation control signals and configured to separate the pixel signals from the image signal and output the pixel signals to the pixel signal lines based on the separation control signals,
wherein the control circuit outputs the separation control signals to the first ends of the signal lines, measures a delay time of the separation control signal appearing at each of the second ends of the signal lines, and sets an inclination or a time constant of a rising edge and a falling edge of each of the separation control signals based on the delay time.

* * * * *